(12) United States Patent
Kawahara

(10) Patent No.: US 7,373,521 B1
(45) Date of Patent: May 13, 2008

(54) SEMICONDUCTOR IC, INFORMATION PROCESSING METHOD, INFORMATION PROCESSING DEVICE, AND PROGRAM STORAGE MEDIUM

(75) Inventor: Hirokazu Kawahara, Kanagawa (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/647,825

(22) PCT Filed: Feb. 17, 2000

(86) PCT No.: PCT/JP00/00906

§ 371 (c)(1),
(2), (4) Date: Nov. 3, 2000

(87) PCT Pub. No.: WO00/49511

PCT Pub. Date: Aug. 24, 2000

(30) Foreign Application Priority Data

Feb. 17, 1999 (JP) ................................. 11-039224

(51) Int. Cl.
| | |
|---|---|
| G06F 11/30 | (2006.01) |
| G06F 12/14 | (2006.01) |
| H04L 9/32 | (2006.01) |
| H04L 9/30 | (2006.01) |
| H04N 7/167 | (2006.01) |
| H04K 1/00 | (2006.01) |
| H04L 9/00 | (2006.01) |
| G06Q 40/00 | (2006.01) |
| G07D 11/00 | (2006.01) |
| G07F 19/00 | (2006.01) |
| G06K 5/00 | (2006.01) |

(52) U.S. Cl. .................... 713/193; 713/189; 713/191; 380/201; 380/203; 380/30; 705/57; 705/51; 235/379; 235/380

(58) Field of Classification Search ................ 713/193, 713/189, 191; 380/201, 203, 50, 30, 25; 705/57, 51; 704/500, 201; 235/379, 380; 257/725, 665, 666, 532, 724
See application file for complete search history.

(56) References Cited

U.S. PATENT DOCUMENTS 5,252,812 A * 10/1993 Nakamura .................. 235/380
5,835,588 A * 11/1998 Zell .......................... 713/193

(Continued)

FOREIGN PATENT DOCUMENTS

JP          9-063179         3/1997

(Continued)

OTHER PUBLICATIONS

Schneier, Applied Cryptography, 1996, John Wiley & Sons, Inc., 2nd edition, 30-31.*

*Primary Examiner*—Ayaz Sheikh
*Assistant Examiner*—Shin-Hon Chen
(74) *Attorney, Agent, or Firm*—Oblon, Spivak, McClelland, Maier & Neustadt, P.C.

(57) ABSTRACT

A program supplied from a personal computer via an interface 31 is processed according to a program stored in a ROM 36, developed in a RAM 33, and executed by a CPU 32. Data resulted from the program execution is stored into a nonvolatile memory 34. The interface 31, CPU 32, RAM 33, nonvolatile memory 34 and ROM 36 are housed in an adaptor 26 formed integrally as a semiconductor IC.

5 Claims, 36 Drawing Sheets

U.S. PATENT DOCUMENTS

| | | | | |
|---|---|---|---|---|
| 5,857,024 A | * | 1/1999 | Nishino et al. | 713/172 |
| 5,870,710 A | * | 2/1999 | Ozawa et al. | 704/500 |
| 6,091,823 A | * | 7/2000 | Hosomi et al. | 380/211 |
| 6,107,684 A | * | 8/2000 | Busking et al. | 257/725 |
| 6,126,070 A | * | 10/2000 | Fukuzumi | 235/380 |
| 6,128,605 A | * | 10/2000 | Saito et al. | 705/57 |
| 2002/0054096 A1 | * | 5/2002 | Thomas | 345/762 |
| 2002/0084999 A1 | * | 7/2002 | Shiga | 345/418 |

FOREIGN PATENT DOCUMENTS

| | | |
|---|---|---|
| JP | 9-182052 | 7/1997 |
| JP | 9-265731 | 10/1997 |
| JP | 10-269289 | 10/1998 |
| JP | 10-283270 | 10/1998 |
| JP | 10-302008 | 11/1998 |

* cited by examiner

TIME LIMIT DATA BASE

|  | ITEM 1 | ITEM 2 | ITEM 3 |  |
|---|---|---|---|---|
| ISRC | JP-Z90-98-12345 | US-Z90-99-12346 | JP-Z90-98-12347 |  |
| DATE OF COPY | 1998.11.23.08:04 | 2004.03.06.16:09 | 2004.03.06.16.15 |  |

| HASH VALUE | 0xf3352e125934 |
|---|---|

MUSIC DATA BASE

| | ITEM 1 | ITEM 2 | ITEM 3 |
|---|---|---|---|
| FILE NAME | Xd000110. at2 | px92341234. at2 | aa0234287034. at2 |
| ENCRYPTED ENCRYPTION KEY | 0xabababababab | 0x9898989898989 | 0x123456789012 |
| MUSIC PIECE NAME | HARU-NO-OGAWA | UNMEI(DESTINY) | KOUJOU-NO-TSUKI |
| PLAY TIME LENGTH | 180 | 190 | 200 |
| PLAYBACK CONDITION : START DATE | - | 2001.01.01.00:00 | - |
| PLAYBACK CONDITION : END DATE | 1999.07.31.23:59 | - | - |
| PLAYBACK CONDITION : PLAYBACK LIMIT | - | 20 | - |
| PLAYBACK COUNTER | - | 12 | - |
| PLAYBACK ACCOUNTING CONDITION | - | - | ¥5 |
| COPYING CONDITION : COPIES | 2 | 0 | 0 |
| COPY COUNTER | 1 | 0 | 0 |
| COPYING CONDITION : SCMS | 0b01 | 0b10 | 0b00 |

| HASH VALUE | 0xf9951e566321 |
|---|---|

FIG.11

PLAYBACK CONDITIONS MANAGED BY PORTABLE DEVICE

|  | ITEM 1 | ITEM 2 | ITEM 3 |
|---|---|---|---|
| CONTENT ID | 00001 | 00002 | 00003 |
| PLAY START DATE | 1999.07.31.23:59 | 1999.07.31.23:59 | 1999.07.31.23:59 |
| PLAY END DATE | 2001.01.01.00:00 | 2001.01.01.00:00 | 2001.01.01.00:00 |
| PLAYBACK LIMIT | - | 15 | - |

FIG.16

ACCOUNTING LOG

|  | ITEM 1 | ITEM 2 | ITEM 3 |  |
|---|---|---|---|---|
| FEE | 50 | 50 | 60 |  |

| HASH VALUE | 0xf8783e263517 |
|---|---|

SEMICONDUCTOR IC, INFORMATION PROCESSING METHOD, INFORMATION PROCESSING DEVICE, AND PROGRAM STORAGE MEDIUM

TECHNICAL FIELD

The present invention relates to a semiconductor IC, an information processing method and apparatus, and to a program storage medium, and more specifically, to a semiconductor IC, an information processing method and apparatus adapted to prevent data from fraudulently being read, and a program storage medium having recorded therein the information processing program for the prevention of the fraudulent data read.

BACKGROUND ART

Recently, apparatuses capable of digitally recording or playing back music data, such as CD (compact disc) player and MD (mini disc) player have been more and more popular. As a result, by combining such a device which can digitally record and playback music data with a personal computer or the like, it has become possible to fraudulently copy digital music data relatively easily. To prevent such fraudulent copy of music data as copyrighted works, various methods have been proposed.

For example, it has been proposed to make a software controlling a music data source device do a mutual authentication with a destination device, encrypt the music data when an appropriate authentication is acquired, transfer it to the destination device, and decrypt the encrypted music data at the destination device for use of the data.

Also it has been proposed to use, in the software controlling the music data source device, an ID stored in a predetermined hardware in order to make a mutual authentication with a destination device Further, it has been proposed to execute such an authentication, encryption and decryption by a wired-logic hardware.

However, in case the authentication, encryption and decryption are done by only the software, the music data may possibly be copied fraudulently by analyzing and falsifying the software.

Also, if a predetermined ID is stored in the hardware and read by the software in the personal computer for use, the read ID may possibly be read in the course of being transferred to the software, analyzed and falsified.

Furthermore, if the authentication, encryption and decryption are effected by the wired-logic hardware, the above analysis and falsification can be prevented. However, for a new authentication, encryption and decryption, it will be necessary to replace the existing hardware with a new one and add a new hardware.

DISCLOSURE OF THE INVENTION

The present invention has been made in view of this situation, and has an object to prevent more positively any fraudulent read of data.

The semiconductor IC according to the present invention comprises means for interfacing with an information processor, means for holding a program which processes a program transferred from the information processor, means for developing the program processed based on the program held in the program holding means, means for executing the program developed by the program developing means and a nonvolatile storage means for storing data resulted from the program execution by the program executing means and used by the information processor. The above semiconductor IC may further include a time-keeping means. Also, in the semiconductor IC, the program holding means is an ROM, the program developing means is a RAM, the program executing means is a CPU, and the data storage means is a RAM backed up by a battery.

Also, the semiconductor IC according to the present invention comprises means for receiving an encrypted first program transferred from an information processor, means for holding a second program which decrypts the encrypted first program received by the program receiving means, means for executing the first program decrypted based on the second program held in the program holding means and means for transferring the result of the program execution to the information processor. The semiconductor IC may further include a nonvolatile storage means for storing data the information processor is to use. Also, the semiconductor IC may further include a time-keeping means.

Also, the information processing method according to the present invention comprises a step of receiving an encrypted first program transferred from an information processor, a step of holding a second program which decrypts the encrypted first program received at the program receiving step, a step of executing the first program decrypted based on the second program held at the program holding step and a step of transferring the result of the program execution made at the program executing step to the information processor.

Also the program storage medium according to the present invention comprises a step of receiving an encrypted first program transferred from an information processor, a step of holding a second program which decrypts the encrypted first program received at the program receiving step, a step of executing the first program decrypted based on the second program held at the program holding step and a step of transferring the result of the program execution made at the program executing step to the information processor.

Also the a semiconductor IC according to the present invention comprises means for receiving an encrypted first program transferred from an information processor, means for holding a second program which processes the encrypted first program received by the program receiving means, means for executing the first program processed based on the second program held in the program holding means, means for transferring the result of the program execution to the information processor and means for time-keeping and correcting the present time based on time information from the information processor. The semiconductor IC may further include a nonvolatile storage means for storing data the information processor is to use.

Also the information processing method according to the present invention comprises a step of receiving a first program transferred from an information processor, a step of holding a second program which processes the first program received at the program receiving step, a step of executing the first program processed based on the second program held at the program holding step, a step of transferring the result of the program execution made at the program executing step and a step of time-keeping and correcting the present time based on time information from the information processor.

Also the program of program storage medium according to the present invention comprises a step of receiving an encrypted first program transferred from an information processor, a step of holding a second program which processes the encrypted first program received at the program receiving step, a step of executing the first program processed based on the second program held at the program holding step, a step of transferring the result of the program execution made at the program executing step to the information processor and a step of time-keeping and correcting the present time based on time information from the information processor.

Also the information processor according to the present invention comprises means for transmitting a program to a semiconductor IC; a first means for receiving output data resulted from processing of the program by the semiconductor IC, a second means for receiving data and time information from other device, means for storing the data received by the second data receiving means and means for correcting the time information for the semiconductor IC based on the time information received by the second data receiving means.

Also the information processing method according to the present invention comprise a step of transmitting a program to a semiconductor IC, a step of firstly receiving output data resulted from processing of the program by the semiconductor IC, a step of secondly receiving data and time information from other device, a step of storing the data received at the second data receiving step and a step of correcting the time information for the semiconductor IC based on the time information received at the second data receiving step.

Also the program of program storage medium according to the present invention comprises a step of transmitting a program to a semiconductor IC, a step of firstly receiving output data resulted from processing of the program by the semiconductor IC, a step of secondly receiving data and time information from other device, a step of storing the data received at the second data receiving step and a step of correcting the time information for the semiconductor IC based on the time information received at the second data receiving step.

Also the semiconductor IC according to the present invention comprises means for processing data transferred to an information processor, means for storing the data processed by the data processing means, means for protecting the data storage means and means formed nearly flush with the protecting means for supplying a backup power to the data storage means. The semiconductor IC may further include means for receiving a first program transferred from the information processor and means for holding a second program which processes the first program, the program processing means processing based on the first program processed by the second program.

Also the semiconductor IC according to the present invention comprises means for processing data transferred from an information processor, a nonvolatile storage means for storing the data processed by the data processing means and a plurality of transferring means for transferring data stored in the nonvolatile storage means, wherein the plurality of transferring means is laminated in overlapping positions in the direction of depth. The semiconductor IC may further include means for receiving a first program transferred from the information processor and means for holding a second program which processes the first program.

BRIEF DESCRIPTION OF THE DRAWINGS

FIG. 11 shows an example of music data base.

FIG. 16 explains the playback conditions managed by the portable device.

FIG. 25 explains a accounting log.

BEST MODE FOR CARRYING OUT THE INVENTION

The best mode for carrying out the present invention will be described in further detail herebelow with reference to the accompanying drawings.

Figure 1:
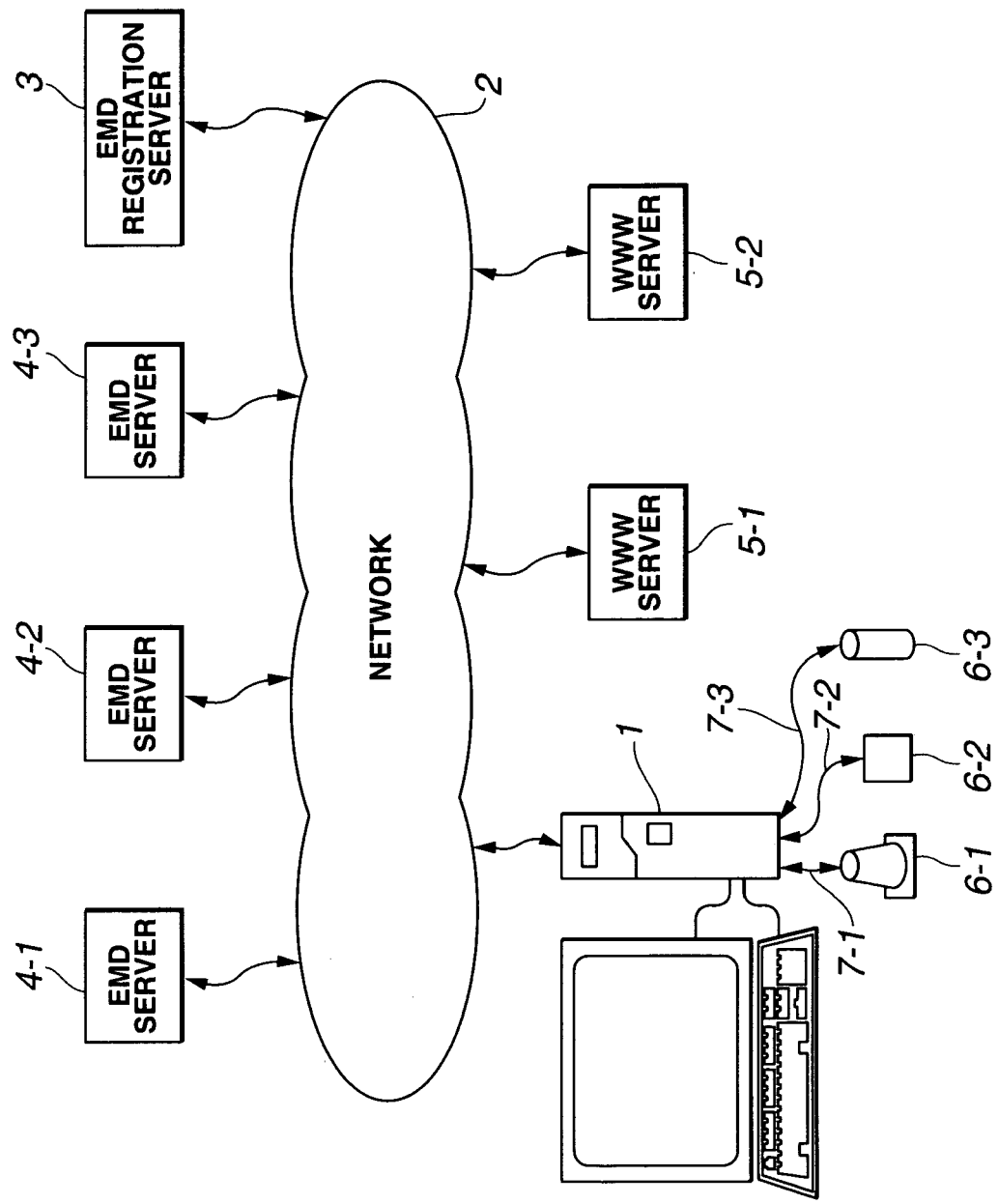
FIG. 1 shows an embodiment of a content data management system according to the present invention.

FIG. 1 shows an embodiment of the content data management system according to the present invention. The content data management system includes a personal computer 1 connected to a network 2 composed of a local area network or Internet. The personal computer 1 compresses a music data (will be referred to as "content" hereinafter) received from EMD (Electrical Music Distribution) servers 4-1 to 4-3 or read from a CD (Compact Disc) which will further be described later in a predetermined manner (ATRAC3 (trademark) for example), and encrypts the compressed content, for recording, by an encrypting method such as DES (Data Encryption Standard) or the like.

The personal computer 1 records also, for an encrypted and recorded content, a usage rule according to which the content is to be used.

The usage rule shows, for example, a number of portable devices (abbreviated as "PD" as the case may be) which can simultaneously use the content following the usage rule. The number of PDs referred to herein is a number of PDs which can check out the content as will further described later. Even after a number of contents included in the usage rule has been checked out, the personal computer 1 can play back the content.

Otherwise, the usage rule may show that the content can be copied. When the content is copied to portable devices 6-1 to 6-3, the personal computer 1 can play back the recorded content. The content can be stored into the portable devices 6-1 to 6-3 a number of times which is limited as the case may be. In this case, the content can be copied a number of times which will not be increased.

Alternatively, the usage rule may show that the content can be moved to other personal computer. After the content is moved to the portable devices 6-1 to 6-3, the content recorded in the personal computer 1 cannot be used (the content is deleted or the usage rule are changed).

The usage rule will be described in detail later.

The personal computer 1 will store the encrypted and recorded content along with the content-related data (e.g., title of, or playback condition for, each music piece) into the connected portable device 6-1 via a USB (Universal Serial Bus) cable 7-1, and update the usage rule for the stored content in response to the content storage into the portable device 6-1 (which operations will be referred to as "check-out" hereinafter). More specifically, when the content is checked out, the number of times a content can be checked out, included in the usage rule for the content and recorded in the personal computer 1, is decreased by one. Therefore, when the number of times a content can be checked out becomes zero, the content following the usage rule cannot be checked out any longer.

Also, the personal computer 1 will store the encrypted and recorded content along with the content-related data into the connected portable device 6-2 via a USB cable 7-2, and update the usage rule for the stored content in response to the content storage into the portable device 6-2. Further, the personal computer 1 will store the encrypted and recorded content along with the content-related data into the connected portable device 6-3 via a USB (Universal Serial Bus) cable 7-3, and update the usage rule for the stored content in response to the content storage into the portable device 6-3.

Also, the computer 1 will make the portable device 6-1 connected thereto by the USB cable 7-1 delete, or disable the portable device 6-1 to use, the content the personal computer 1 has checked out, thereby updating the usage rule for the deleted content (which operation will be referred to as "check-in" hereinafter). More specifically, when the content has been checked in, the number of times a content can be checked out, included in the usage rule for the content and recorded in the personal computer 1, is increased by one.

Also, the computer 1 will make the portable device 6-2 connected thereto by the USB cable 7-2 delete, or disable the portable device 6-2 to use, the content the personal computer 1 has checked out, thereby updating the usage rule for the deleted content. Further, the computer 1 will make the portable device 6-3 connected thereto by the USB cable 7-3 delete, or disable the portable device 6-3 to use, the content the personal computer 1 has checked out, thereby updating the usage rule for the deleted content.

The personal computer 1 cannot check in a content which other personal computer (not shown) has checked out to the portable device 6-1. Also, The personal computer 1 cannot check in a content which the other personal computer has checked out to the portable device 6-2. Further, the personal computer 1 cannot check in a content which the other personal computer has checked out to the portable device 6-3.

As shown, the content data management system according to the present invention includes also an EMD registration server 3. When the personal computer 1 starts acquiring the content from the EMD servers 4-1 to 4-3, the EMD registration server 3 responds to a request from the personal computer 1 to transmit to the personal computer 1 via the network 2 an authenticate key necessary for mutual authentication between the personal computer 1 and EMD servers 4-1 to 4-3, and to the personal computer 1 a program for connection to the EMD servers 4-1 to 4-3.

In response to the request from the personal computer 1, the EMD server 4-1 will supply a content along with a content-related data (e.g., title or playback limit of each music piece) to the personal computer 1 via the network 2. Also, the EMD server 4-2 will respond to the request from the personal computer 1 to supply a content along with a content-related data to the personal computer 1 via the network 2. Further, in response to the request from the personal computer 1, the EMD server 4-3 will supply a content along with a content-related data to the personal computer 1 via the network 2.

The contents supplied from the EMD servers 4-1 to 4-3 are compressed in the same manner or in different manners, respectively. Also, the contents supplied from the EMD servers 4-1 to 4-3 are encrypted in the same manner or different manners, respectively.

The WWW server 5-1 responds to the request from the personal computer 1 to supply the personal computer 1 via the network 2 with a CD from which a content has been read (e.g., CD album name or CD supplier) and data corresponding to the read content (e.g., title or composer's name of each music piece). In response to the request from the personal computer 1, the WWW server 5-2 supplies the personal computer 1 via the network 2 with a CD from which a content has been read and data corresponding to the read content.

The portable device 6-1 stores the content supplied from the personal computer 1 (i.e., a checked-out content) along with data related with the content (e.g., title or playback limit of each music piece). Based on the content-related data, the portable device 6-1 will play back and output the stored content to a headphone or the like (not shown).

For example, when it is tried to play back a content a larger number of times than a playback limit stored as the content-related data, the portable device 6-1 will stop playback of the corresponding content. Also, when it is tried to play back after a playback time limit stored as the content-related data has passed, the portable device 6-1 will stop playback of the corresponding content.

The user will be able to disconnect, for carrying, the portable device 6-1 having a content stored therein from the personal computer 1, and play back the content stored in the portable device 6-1 for listening to a music piece corresponding to the content through the headphone or the like.

The portable device 6-2 stores the content supplied from the personal computer 1 along with data related with the content. Based on the content-related data, the portable device 6-2 will play back and output the stored content to a headphone or the like (not shown). The user will be able to disconnect, for carrying, the portable device 6-2 having a content stored therein from the personal computer 1, and play back the content stored in the portable device 6-2 for listening to a music piece corresponding to the content through the headphone or the like.

The portable device 6-3 stores the content supplied from the personal computer 1 along with data related with the content. Based on the content-related data, the portable device 6-3 will play back and output the stored content to a headphone or the like (not shown). The user will be able to disconnect, for carrying, the portable device 6-3 having a content stored therein from the personal computer 1, and play back the content stored in the portable device 6-3 for listening to a music piece corresponding to the content through the headphone or the like.

The portable devices 6-1 to 6-3 will be referred to simply as "portable device 6" hereafter wherever they may not be referred to individually.

Figure 2:
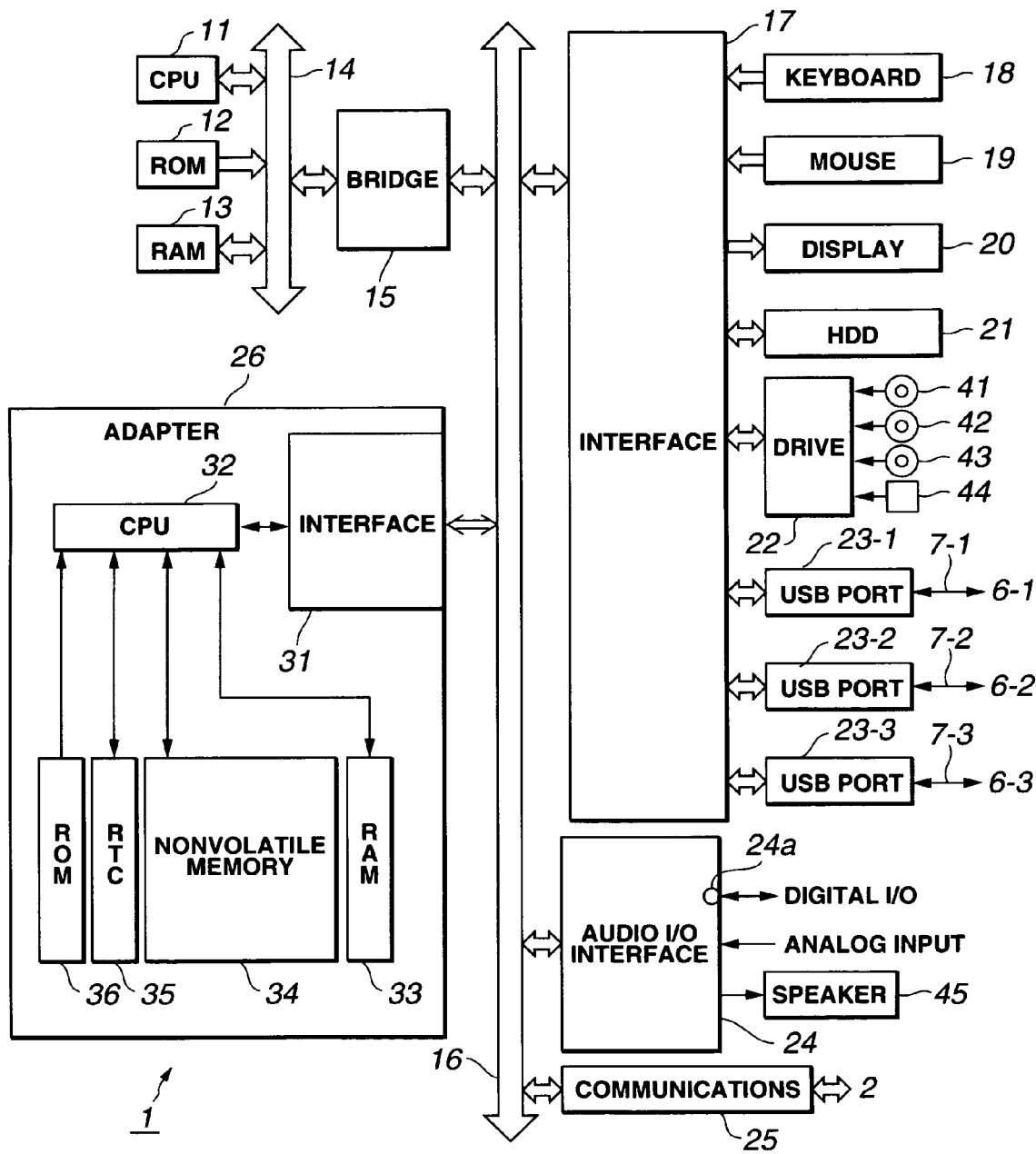
FIG. 2 explains the configuration of a personal computer used in the content data management system.

FIG. 2 is an explanatory illustration of the configuration of the personal computer 1. As shown, the personal computer 1 comprises a CPU (central processing unit) 11. The CPU 11 actually executes a variety of applications (will further be described later) and OS (operating system). A ROM (read-only memory) 12 is also provided in the personal computer 1, and generally stores basically fixed data of programs and computational parameters used in the CPU 11. Also, a RAM (random-access memory) 13 is included in the personal computer 1 to store programs used for execution of the applications and OS by the CPU 11 and parameters which are appropriately variable in the execution of the applications and OS. The CPU 11, ROM 12 and RAM 13 are mutually connected to each other by a host bus 14 composed of a CPU bus, etc.

The host bus 14 is connected to an external bus 16 such as PCI (peripheral component interconnect/interface) by a bridge 15.

A keyboard 18 is operated by the user to input various commands to the CPU 11. A mouse 19 which is used by the user to point and select a point on the screen of a display unit 20. The display unit 20 is a liquid crystal display or CRT (cathode-ray tube) to display a variety of information in the form of a text and/or image. Further, an HDD (hard disc drive) 21 drives a hard disc to write or read a program to be executed by the CPU 11 and information to or from the hard disc.

The drive 22 reads data or program recorded in any of a magnetic disc 41, optical disc 42 (including CD), magneto-optical disc 43 and semiconductor memory 44, whichever is connected to the drive 22, and supplies the read data or program to the RAM 13 connected thereto by an interface 17, external bus 16, bridge 15 and host bus 14.

The USB port 23-1 has the portable device 6-1 connected thereto by the USB cable 7-1, and outputs data (including a content or a command to the portable device 6-1, for example) supplied from the HDD 21, CPU 11 or RAM 13 to the portable device 6-1 via the interface 17, external bus 16, bridge 15 or host bus 14.

The USB port 23-2 has the portable device 6-2 connected thereto by the USB cable 7-2, and outputs data (including a content or a command to the portable device 6-2, for example) supplied from the HDD 21, CPU 11 or RAM 13 to the portable device 6-2 via the interface 17, external bus 16, bridge 15 or host bus 14.

The USB port 23-3 has the portable device 6-3 connected thereto by the USB cable 7-3, and outputs data (including a content or a command to the portable device 6-3, for example) supplied from the HDD 21, CPU 11 or RAM 13 to the portable device 6-3 via the interface 17, external bus 16, bridge 15 or host bus 14.

An audio input/output interface 24 having an IEC (International Electrotechnical Commission) 60958 terminal 24 interfaces a digital audio input/output or an analog audio input/output. A speaker 45 provides a predetermined sound corresponding to each content based on an audio signal supplied from the audio input/output interface 24.

The accessories including the keyboard 18 to audio input/output interface 24 are connected to the interface 17 which in turn is connected to the CPU 11 by the external bus 16, bridge 15 and host bus 14.

A communications block 25 connected to the network 2, and transmit, as stored in packets in a predetermined manner, data (e.g., request for registration or request for sending a content) supplied from the CPU 11 or HDD 21 via the network 2 while outputting data (e.g., authenticate key or content) stored in received packets to the CPU 11, RAM 13 or HDD 21 via the network 2.

The CPU 32 of an adaptor 26 formed integrally as a semiconductor IC, and connected to the personal computer 1 is connected to the CPU 11 by the external bus 16, bridge 15 and host bus 14 and thus cooperates with the CPU 11 to effect various processes. The RAM 33 stores data and programs necessary for execution of the various processes by the CPU 32. The nonvolatile memory 34 stores data which have to be held still after the personal computer 1 is turned off. The ROM 36 stores a program for decryption of an encrypted program transferred from the personal computer 1. The RTC (Real Time Clock) 35 keeps time to provide time information.

The communications block 25 and adaptor 26 are connected to the CPU 11 by the external bus 16, bridge 15 and host bus 14.

The USB ports 23-1 to 23-3 will be referred to simply as "USB port 23" hereafter wherever they have not to be referred to individually. Also, the USB cables 7-1 to 7-3 will be referred to simply as "USB cable 7" hereafter wherever they have not to be referred to individually.

Figure 3:
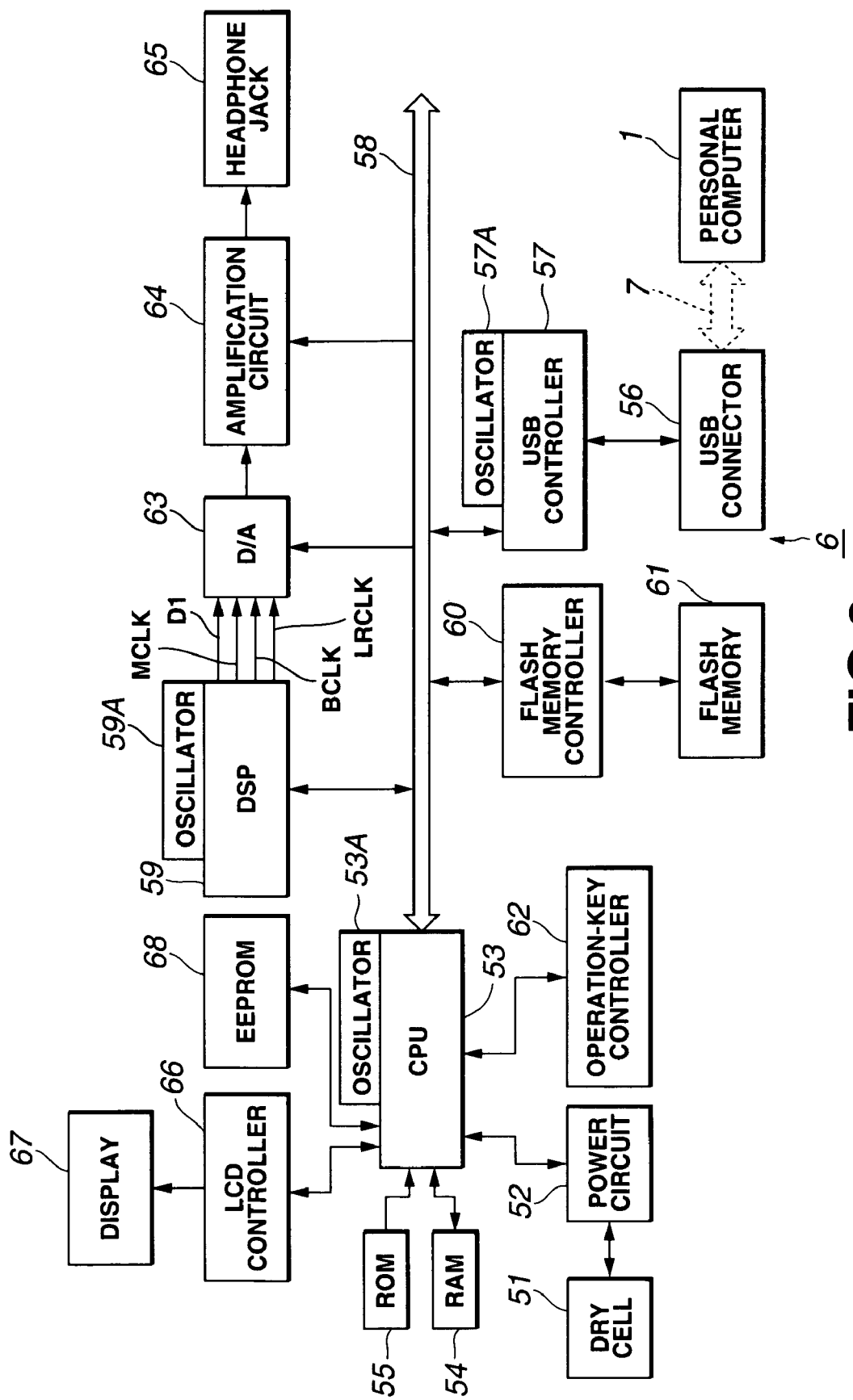
FIG. 3 explains the configuration of a portable device included in the content data management system.

Referring now to FIG. 3, the portable device 6 is schematically illustrated in the form of a block diagram. A power circuit 52 converts a voltage supplied from a dry cell 51 to an internal power of a predetermined voltage. Supplying the power to components from a CPU 53 to display unit 67, the power circuit 52 will thus drive the entire portable device 6.

When connected to the personal computer 1 by a USB connector 56 and USB cable 7, the USB controller 57 will supply data including a content transferred from the personal computer 1 to the CPU 53 via an internal bus 58.

A data to be transferred from the personal computer 1 is composed of data of 64 bytes per packet, and transferred from the personal computer 1 at a transfer rate of 12 Mbits/sec.

A data to be transferred to the portable device 6 is composed of a header and content. The header stores a content ID, file name, header size, content key, file size, codec ID, file information, etc. and also a playback limitation data, start date, end date, playback limit, playback counter, etc., necessary for the playback limitation. It should be noted here that the term "date" used herein refers to a date and time. The content is coded by the encoding method such as ATRAC3 and encrypted.

The header size indicates a data length of a header (e.g., 33 bytes), and the file size indicates a data length of the content (e.g., 33,636,138 bytes).

The content key is a key for decryption of an encrypted content, and transmitted from the personal computer 1 to the portable device 6 in a format encrypted based on a session key (provisional) generated via a mutual authentication between the personal computer 1 and portable device 6.

When the portable device 6 is connected to the USB port 23 of the personal computer 1 by the USB cable 7, there will be made a mutual authentication between the portable device 6 and personal computer 1. This mutual authentication is of a challenge-response type for example. Note that a DSP (digital signal processor) 59 is also provided in the portable device 6 to decrypt an encrypted content when the challenge-response type authentication is done.

The above-mentioned challenge-response type mutual authentication is such that in response to a certain value (challenge) generated by the personal computer, for example, there is generated a value (response) by the portable device 6 by using a private key common to both the portable device 6 and personal computer 1. In the challenge-response type mutual authentication, the value generated by the personal computer 1 varies at every authentication. So, even when for example a value generated using the private key and outputted from the portable device 6 is read, that is, a so-called disguised attack takes place, the personal computer 1 can detect a fraudulence since a next mutual authentication is done using a different value.

The content ID is an ID for a content to identify the content.

The codec ID is an ID corresponding to an encoding method for a content. For example, a codec ID of "1" corresponds to ATRAC3 while a codec ID of "0" corresponds to MP3 (MPEG (Moving Picture Experts Group) Audio Layer-3).

The file name is a data resulted from conversion of a content file (will further be described later) corresponding to a content and recorded in the personal computer 1 to an ASCII (American National Standard Code for Information Interchange) code. The file information is a data resulted from conversion of a music piece title (content name), name of the artist playing the music piece, name of the songwriter of the music piece or name of the composer of the music piece to an ASCII code.

The playback limitation data is to indicate whether there is set a playback period for which a content can be played back (i.e., start date or end date) or a playback limit (a limited number of times) a content can be played back. When a playback limit is set, the playback limitation data is assigned "1". When a period for which a content can be played back is set, the playback limitation data is assigned "2". When there is neither a playback limit nor a playback period (namely, when the content is purchased), the playback limitation data is assigned "0".

The start date and end date are data indicating a range of a period for which a content can be played back when the playback limitation data is assigned "2". For example, when the start date is "00040F" while the end date is "00070F", a corresponding content can be played back for a period from Apr. 15, 2000 until Jul. 15, 2000.

Similarly, the playback limit and playback counter are as follows. Namely, when the playback limitation data is assigned "1" or "2", the playback limit is a predetermined number of times a content can be played back, and the playback counter is a number of times the content has been played back and which is updated by the CPU 53 upon completion of that playback. For example, when the playback limit is "02", the content can be played back two times. When the playback counter is "01", it means that the content has been played back once.

When the playback limitation data is assigned "2", the start date is "00040F", end date is "00070F" and the playback limit is "02", for example, the portable device 6 will be permitted to play back a corresponding content twice a day for a period from Apr. 15, 2000 until Jul. 15, 2000.

Also, when the playback limitation data is assigned "1", start date is "000000", end date is "000000", playback limit is "0" and playback counter is "05", for example, a corresponding content can be played back for an unlimited period, can be played back 10 times, and has been played back 5 times.

When the portable device 6 receives a content and a content write command from the personal computer 1, the CPU 53 which executes a main program read from a ROM 55 to RAM 54, will receive the write command, control a flash memory controller 60 and write to a flash memory 61 the content received from the personal computer 1.

The flash memory 61 has a storage capacity of about 64 Mbytes to store the content. Also, the flash memory has stored therein in advance a playback code for expansion of a content having been compressed in a predetermined manner.

Note that the flash memory 61 may be formed as a memory card which is connectable to, and removable from, the portable device 6.

When the CPU 53 is supplied with a playback command corresponding to a push-down operation of a play/stop button (not shown) via an operation key controller 62, it will make the flash memory controller 60 read the playback code and content from the flash memory 61 and transfer them to the DSP 59 of the portable device 6.

After detecting error in the content in the CRC (cyclic redundancy check) method according to the playback code transferred from the flash memory 61, the DSP 59 will play back the content and the played-back data (indicated with a reference D1 in FIG. 3) to a digital/analog conversion circuit 63.

The DSP 59 is formed integrally with a transmission circuit (not shown) provided inside the portable device 6 to play back a content based on a master clock MCLK from an external crystal oscillator 59A, and supplies the digital/analog conversion circuit 63 with the master clock MCLK, a bit clock BCLK generated by an internal oscillation circuit based on the master clock MCLK and having a predetermined frequency, and an operating clock LRCLK composed of an L-channel clock LCLK and R-channel clock RCLK in the units of frames.

For playing back a content, the DSP 59 will supply the above-mentioned operating clock to the digital/analog conversion circuit 63 according to the playback code. When playing back no content, the DSP 59 will stop supplying the operating clock according to the playback code to turn off the digital/analog conversion circuit 63, thereby reducing the power consumption of the entire portable device 6.

Similarly, the CPU 53 and USB controller 57 have external crystal oscillators 53A and 57A connected thereto, respectively, and effect predetermined operations on the basis of master clocks MCLK supplied from the oscillators 53A and 57A, respectively.

Because of the above-mentioned construction, the portable device 6 needs no clock generation module to supply a clock to each of the CPU 53, DSP 59 and USB controller 57 and thus can be designed to have a simpler and more compact circuit construction.

The digital/analog conversion circuit 63 converts a played-back content to an analog audio signal and supplies it to an amplification circuit 64. The amplification circuit 64 amplifies the audio signal and supplies it to headphone (not shown) via a headphone jack 65.

Thus, when the play/stop button (not shown) is pressed, the portable device 6 plays back a content stored in the flash memory 61 under the control of the CPU 53. When the play/stop button is pressed in the course of playing back a content, the portable device 6 will stop playing back the content.

When the play/stop button is pressed after stopping the content playback operation, the portable device 6 will resume the content playback at the position where the playback operation has been stopped under the control of the CPU 53. When a time of a few seconds has passed with no additional operation effected after the playback operation is stopped by pressing the play/stop button, the portable device 6 will automatically shut off the power supply, thereby reducing the power consumption.

It should be noted here that when the play/stop button is pressed after the power supply is turned off, the portable device 6 will resume the playback at the first music piece or music piece No. 1 without playing back the content at the position where the playback operation has previously been stopped.

Also, the CPU 53 of the portable device 6 makes an LCD controller 68 display on a display unit 67 a playback mode (e.g., repeated play, introducing play, etc), equalization adjustment (i.e., gain adjustment for a frequency band of the audio signal), number for music piece, playing time, operation modes such as play, stop, fast forward and fast rewind, and information such as sound volume and voltage level in the dry cell 51.

Further, the portable device 6 stores into an EEPROM 68 a number of contents written in a flash memory 80, locations of blocks of the flash memory 61 in which contents are written, respectively, and a so-called FAT (file allocation table) for various information stored in the memory.

It should be noted that in this embodiment, a content is taken as one block of 64 kbytes and a location of the block for the content of each music piece is stored in the FAT.

In case a FAT is stored into the flash memory 61, when the content of a first music piece is written into the flash memory 61 under the control of the CPU 53, the location of a block corresponding to the content of the first music piece will be written as FAT into the flash memory, and then when the content of a second music piece is written into the flash memory 61, the location of a block corresponding to the content of the second music piece will be written as FAT into the flash memory 61 (in the same area as that in which the first music piece has already been written).

In this way, a FAT is rewritten each time the content is written into the flash memory 61 and further the same data will be written again for reservation to protect the data.

When FAT is written into the flash memory 61, the same area in the flash memory will be rewritten twice correspondingly to the write of the first content. For this reason, when content write has been made a small number of times, a specified number of times for rewrite of the flash memory 61 will be reached, so that the flash memory 61 will not be rewritable any longer.

To avoid the above, the portable device 6 makes the EEPROM 68 store FAT so that FAT will be rewritten a reduced number of times in the flash memory 61 at write of each content.

By storing into the EEPROM 68 a FAT which is rewritten a large number of times, the portable device 6 can be adapted such that content can be written into the flash memory 61 at a frequency tens times larger than that at which FAT is stored into the flash memory 61. Further, since the CPU 53 makes the EEPROM 68 additionally store FAT, the same area in the EEPROM 68 is rewritten at a reduced frequency to prevent the EEPROM 68 from early becoming not rewritable.

When the portable device 6 is connected to the personal computer 1 by the USB cable 7 (which will be referred to as "USB connection" hereinafter), it is recognized based on an interrupt signal supplied from the USB controller 57 to the CPU 53 that the USB connection has been made.

When the portable device 6 recognizes the USB connection, it is supplied with an external power of a specified current value from the personal computer 1 via the USB cable 7, and makes a power circuit 52 stop the power supply from the dry cell 51.

When the USB connection is established, the CPU 53 will stop the DSP 59 from playing back a content. Thus, the CPU 53 will prevent the external power supplied from the personal computer 1 from exceeding the specified current value so that the external power of the specified current value can always be supplied.

Thus, when the USB connection is established, the CPU 53 makes a selection between the power supplied from the dry cell 51 and the power supplied from the personal computer 1. That is, the inexpensive external power from the personal computer 1 can be used, and so the costly power supplied from the dry cell 51 and which costs high is less consumed. Thus, the dry cell 51 can be used for a longer service life.

Note that when supplied with the external power from the personal computer 1 via the USB cable 7, the CPU 53 stops the DSP 59 from playing back a content to reduce the radiation from the DSP 59, so that the radiation of the entire system including the personal computer 1 can further be reduced.

Figure 4:
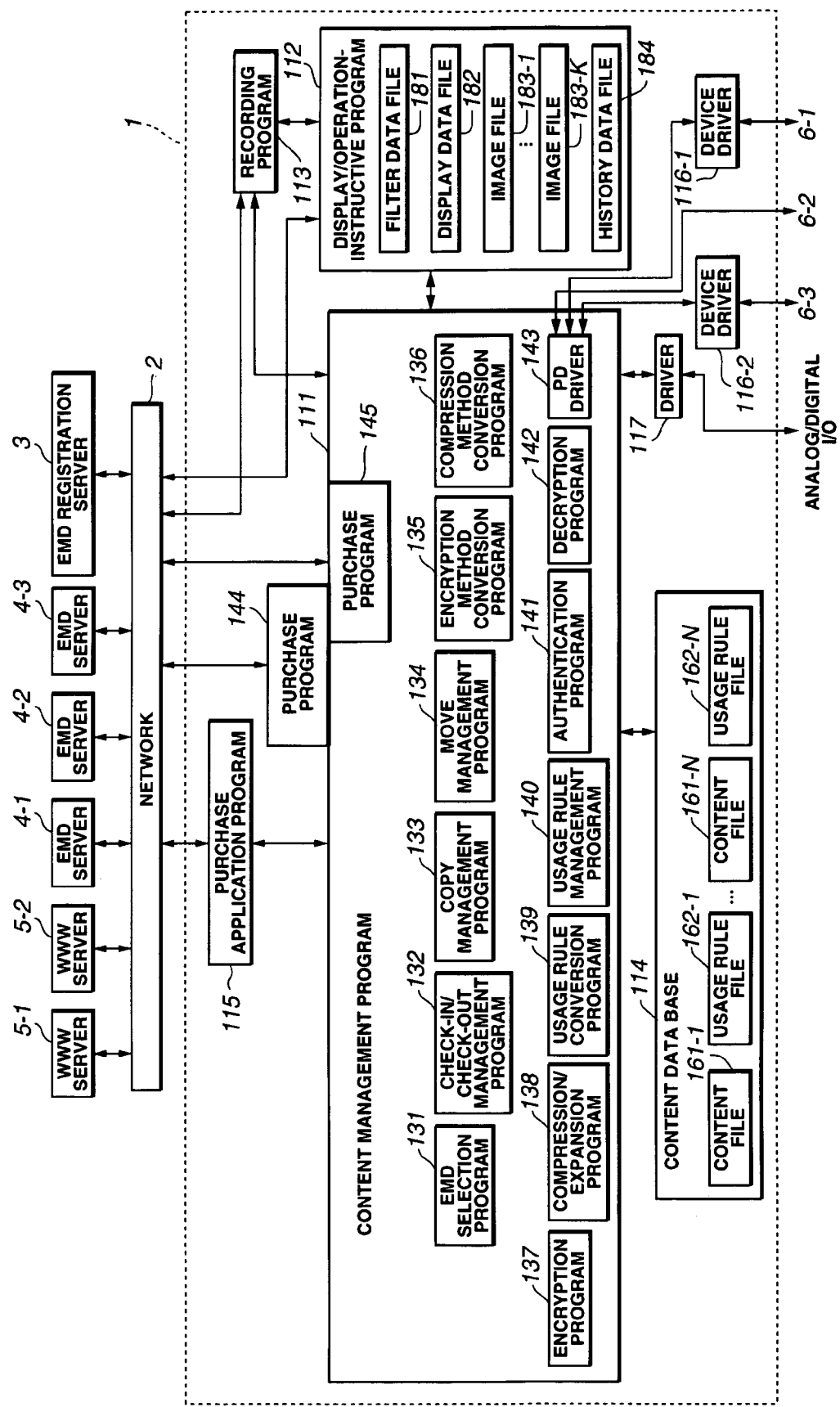
FIG. 4 is a block diagram of the personal computer for explanation of the functions of the personal computer.

Referring now to FIG. 4, there is illustrated a block diagram of the personal computer 1, explaining the functions of the personal computer 1, implemented by execution of predetermined programs by the CPU 11. As shown, the personal computer 1 uses a content management program 111 which is composed of a plurality of programs including an EMD selection program 131, check-in/check-out management program 132, copy management program 133, move management program 134, encryption method conversion program 135, compression method conversion program 136, encryption program 137, compression/expansion program 138, usage rule conversion program 139, usage rule management program 140, authentication program 141, decryption program 142, PD driver 143, purchase programs 144 and 145.

Of the above programs, the content management program 111 is composed of shuffled or encrypted instructions, for example, to conceal the instructed operations from outside to make it difficult to interpret the instructions (for example, even if the user can read directly the content management program 111, he or she cannot identify the instructions.

The EMD selection program 131 is not included in the content management program 111 when the latter is installed in the personal computer 1 but it is received from the EMD registration server 3 via the network 2 at the time of EMD registration which will further be described later. The EMD selection program 131 selects a connection with any of the EMD servers 4-1 to 4-3 to enable a purchase application program 115, purchase program 144 or 142 to have a communication with any of the EMD servers 4-1 to 4-3 (e.g., download of a content for purchase).

Based on a setting of either check-in or check-out and usage rule files 162-1 to 162-N recorded in a content data base 114, the check-in/check-out management program 132 checks out contents stored in content files 161-1 to 161-N to any of the portable devices 6-1 to 6-3, or checks in contents stored in the portable devices 6-1 to 6-3.

In response to the check-in or check-out having been done, the check-in/check-out management program 132 updates the usage rule stored in the usage rule files 162-1 to 162-N recorded in the content data base 114.

Based on the usage rule files 162-1 to 162-N recorded in the content data base 114, the copy management program 133 copies contents stored in the content files 161-1 to 161-N to any of the portable devices 6-1 to 6-3, or copies contents from the portable devices 6-1 to 6-3 to the content data base 114.

Also based on the usage rule files 162-1 to 162-N recorded in the content data base 114, the move management program 134 moves contents stored in the content files 161-1 to 161-N to any of the portable devices 6-1 to 6-3, or contents from the portable devices 6-1 to 6-3 to the content data base 114.

The encryption method conversion program 135 converts, to the same encryption method as that used with the contents stored in the content files 161-1 to 161-N recorded in the content data base 114, the encryption method used with a content the purchase application program 115 receives from the EMD server 4-1 via the network 2, a content the purchase program 144 receives from the EMD server 4-2 via the network 3 or a content the purchase program 145 receives from the EMD server 4-3 via the network 2.

In addition, to check out a content to the portable device 6-1 or 6-3, the encryption method conversion program 135 converts the encryption method used with the content to be checked out to a one used in the portable device 6-1 or 6-3.

The compression method conversion program 136 converts, to the same compression method as that used with the contents stored in the content files 161-1 to 161-N recorded in the content data base 114, the compression method used with a content the purchase application program 115 receives from the EMD server 4-1 via the network 2, a content the purchase program 144 receives from the EMD server 4-2 via the network 2 or a content the purchase program 145 receives from the EMD server 4-3 via the network 2.

Also, to check out a content to the portable device 6-1 or 6-3, the compression method conversion program 136 converts the compression method used with the content to be checked out to a one used in the portable device 6-1 or 6-3.

The encryption program 137 is used to encrypt a content (not encrypted) read from a CD and supplied from a recording program 113 for example to the same encryption method as that used with contents stored in the content files 161-1 to 161-N recorded in the content data base 114.

The compression/expansion program 138 encodes a content (not compressed) read from a CD and supplied from the recording program 113 by the same encoding method as that used with contents stored in the content files 161-1 to 161-N recorded in the content data base 114. In addition, the compression/expansion program 138 will expand (decrypt) a coded content.

The usage rule conversion program 139 converts, to the same format as that of the usage rule stored in the usage rule files 162-1 to 162-N recorded in the content data base 114, a usage rule for a content the purchase application program 115 receives from the EMD server 4-1 via the network 2, a content the purchase program 144 receives from the EMD sever 4-2 via the network 2, or a content the purchase program 145 receives from the EMD server 4-3 via the network.

Also, to check out a content to the portable device 6-1 or 6-3, the usage rule conversion program 139 converts the usage rule for the content to be checked out to a one used in the portable device 6-1 or 6-3.

Before execution of content copy, move, check-in or check-out, the usage rule management program 140 detects a falsification or alteration of the usage rules based on hash values (which will further be described later) meeting the usage rules stored in the usage rule files 162-1 to 162-N recorded in the content data base 114. As the usage rules stored in the usage rule files 162-1 to 162-N recorded in the content data base 114 are updated along with a content copy, move, check-in or check-out, the usage rule management program 140 updates the hash values meeting the usage rules.

The authentication program 141 executes a mutual authentication between the content management program 111 and purchase application program 111, and a mutual authentication between the content management program 115 and purchase program 144. Also, the authentication program 141 will store an authenticate key used in the mutual authentication between the EMD server 4-1 and purchase application program 115, a one used in the mutual authentication between the EMD server 4-2 and purchase program 144, and a one used in the mutual authentication between the EMD server 4-3 and purchase program 145.

It should be noted that when the content management program 111 is installed in the personal computer 1, the authenticate key the authentication program 141 used in the mutual authentication is not yet stored in the authentication program 141 but when a display/operation-instructive program 112 has successfully registered the authenticate key, the key will be supplied from the EMD registration server 3 and stored in the authentication program 141.

The decryption program 142 decrypts a content when the personal computer 1 plays back the content stored in the content files 161-1 to 161-N recorded in the content data base 114.

When checking put a predetermine content to the portable device 6-2 or checking in a predetermined content from the portable device 6-2, the PD driver 143 supplies the portable device 6-2 with the content or a command making the portable device 6-2 do a predetermined operation.

When checking put a predetermine content to the portable device 6-1 or checking in a predetermined content from the portable device 6-1, the PD driver 143 supplies the device driver 116-1 with the content or a command making the device driver 116-1 do a predetermined operation.

When checking put a predetermine content to the portable device 6-3 or checking in a predetermined content from the portable device 6-3, the PD driver 143 supplies the device driver 116-2 with the content or a command making the device driver 116-2 do a predetermined operation.

The purchase program 144 is a so-called plug-in program. It is installed along with the content management program 111 into the personal computer 1, supplied from the EMD registration server 3 via the network 2, or supplied as recorded in a predetermined CD. When installed in the personal computer 1, the purchase program 144 will transmit or receive the content management program 111 and data via an interface of a predetermined form the content management program 111 has.

The purchase program 144 is composed of shuffled or encrypted instructions, for example, to conceal the instructed operations from outside to make it difficult to interpret the instructions (for example, even if the user can read directly the purchase program 144, he cannot identify the instructions.

The purchase program 144 requests, via the network 2, the EMD server 4-2 to send a predetermined content and thus receives the content from the EMD server 4-2. Upon reception of the content from the EMD server 4-2, the purchase program 144 will account for the content.

The purchase program 145 is to be installed along with the content management program 111. It requests, via the network 2, the EMD server 4-3 to send a predetermined content and thus receives the content from the EMD server 4-3. Upon reception of the content from the EMD server 4-3, the purchase program 145 will account for the content.

Based on a filtering data file 181, display data file 182, image files 183-1 to 183-K or a history data file 184, the display/operation-instructive program 112 displays an image of a predetermined window on the display unit 20, and gives a check-in or check-out instruction to the content management program 111 in response to an operation of the keyboard 18 or mouse 19 by the user.

The filtering data file 181 stores data for weighting contents stored in the content files 161-1 to 161-N recorded in the content data base 114, and is recorded in the HDD 21.

The display data file 182 stores data corresponding to the contents stored in the content files 161-1 to 161-N recorded in the content data base 114, and is recorded in the HDD 21.

The image files 183-1 to 183-N store images corresponding to the content files 161-1 to 161-N recorded in the content data base 114 or images corresponding to packages which will further be described later, and are recorded in the HDD 21.

The image files 183-1 to 183-K will be referred to simply as "image file 183" hereafter wherever they have not be referred to individually.

The history data file 184 stores history data including a number of times the contents stored in the content files 161-1 to 161-N recorded in the content data base 114 have been checked out, a number of times the contents have been checked in, and the dates on which the check-out an check-in were made. The history data file 184 is recorded in the HDD 21.

For the registration, the display/operation-instructive program 112 transmits, via the network, an ID of the pre-stored content management program 111 to the EMD registration server 3, while receiving, via the network 2, the authenticate key and EMD selection program 131 from the EMD registration server 3 and supplying them to the content management program 111.

The recording program 113 is used to display an image of a predetermined window, and read data such as a recording time of a content from a CD being the optical disc 42 set in the drive 22 in this embodiment in response to an operation of the keyboard 18 or mouse 19 by the user.

Based on a recording time of a content recorded in a CD, the recording program 113 requests, via the network 2, the WWW server 5-1 or 5-2 to send data corresponding to the CD such as album name or artist's name or data corresponding to a content recorded in the CD such as a music piece title, and thus receives, via the network 2, the data corresponding to the CD or the content recorded in the CD from the WWW server 5-1 or 5-2.

Also, the recording program 113 supplies the display/operation-instructive program 112 with the received data corresponding to the CD or data corresponding to the content recorded in the CD.

Further, when supplied with a recording instruction, the recording program 113 reads and outputs to the content management program 111 a content from a CD being the optical disc 42 set in the drive 22 in this embodiment.

The content data base 114 stores into any of the content files 161-1 to 161-N a content supplied from the content management program 111 and having been compressed in a predetermined manner and encrypted in a predetermined manner (records the content into the HDD 21). The content data base 114 stores usage rules for contents stored in the content files 161-1 to 161-N into any of the usage rule files 162-1 to 162-N corresponding to the content files 161-1 to 161-N in which the contents are stored (records the usage rules into the HDD 21).

The content data base 114 may record the content files 161-1 to 161-N or usage rule files 162-1 to 162-N as records.

A usage rule for a content stored in the content file 161-1 for example is stored in the usage rule file 162-1. A usage rule for a content stored in the content file 161-N is stored in the usage rule file 162-N.

Note that data recorded in the usage rule files 162-1 to 162-N correspond to those recorded in a time limit data base or music data base which will further be described later. Namely, the content data base 114 includes the time limit data base and music data base.

The content files 161-1 to 161-N will be referred to simply as "content file 161" hereinafter wherever they have not be referred to individually. Also, the usage rule files 162-1 to 162-N will be referred to simply as "usage rule file 162" hereafter wherever they have not to be referred to individually.

The purchase application program 115 is supplied from the EMD registration server 3 via the network 2 or as recorded in a predetermined CD-ROM. The purchase application program 115 requests, via the network 2, the EMD server 4-1 to send a predetermined content, while thus receiving the content from the EMD server 4-1 and supplying it to the content management program 111. Also, upon reception of the content from the EMD server 4-1, the purchase application program 115 will account for the content.

Next, the correspondence between data stored in the display data file 82 and the content files 161-1 to 161-N stored in the content data base 114 will be described herebelow:

Firstly, a content stored in any of the content files 161-1 to 161-N belongs to a predetermined package. More specifically, the package is any of an original package, my selected package and filtering package.

Of the above packages, the original package has more than one content belonging thereto. This package corresponds to the content classification (namely, so-called album) in the EMD servers 4-1 to 4-3 or to one CD. A content belongs to any original package and cannot belong to a plurality of original packages. Also, an original package to which a content belongs cannot be modified. The user can edit a part of information corresponding to an original package (for example, addition of information or change of added information).

More than one content freely selected by the user belong to the my selected package. The user can arbitrarily edit contents for assignment to my selected packages, respectively. A content can belong to more than one my selected package at a time. Also, a content may not belong to any my selected package.

Contents selected based on a filtering data stored in a filtering data file 181 belong to the filtering package. The filtering data is supplied from the EMD server 4-1 to 4-3 or WWW server 5-1 or 5-2 via the network 2 or as recorded in a predetermined CD. The user can edit the filtering data stored in the filtering data file 181.

The filtering data is a reference for selection of a predetermined content or for calculation of a weight corresponding to the content. For example, filtering data corresponding to top tens of the weekly J-POP (Japanese pops) can be used by the personal computer 1 to identify contents of the weekly Japan Pops Nos. 1 to 10.

The filtering data file 181 includes a filtering data for selection of contents in the descending order of the lengths of period for which they have been checked out for the past one month, a filtering data for selection of contents in the descending order of the numbers of times they have been checked out for the past half year, or a filtering data for selection of contents in which a character "AI (love)" is included in the music piece titles (content name).

Thus, contents in the filtering package are selected by comparing a filtering data with a content display data 221 (including data the user has set), a history data 184 or the like.

The driver 117 drives the audio input/output interface 24 under the control of the content management program 111 or the like to input a content being a digital data supplied from outside and supply it to the content management program 111, output as a digital data a content supplied from the content data base 114 via the content management program 111, or output an analog signal corresponding to a content supplied from the content data base 114 via the content management program 111.

Figure 5:
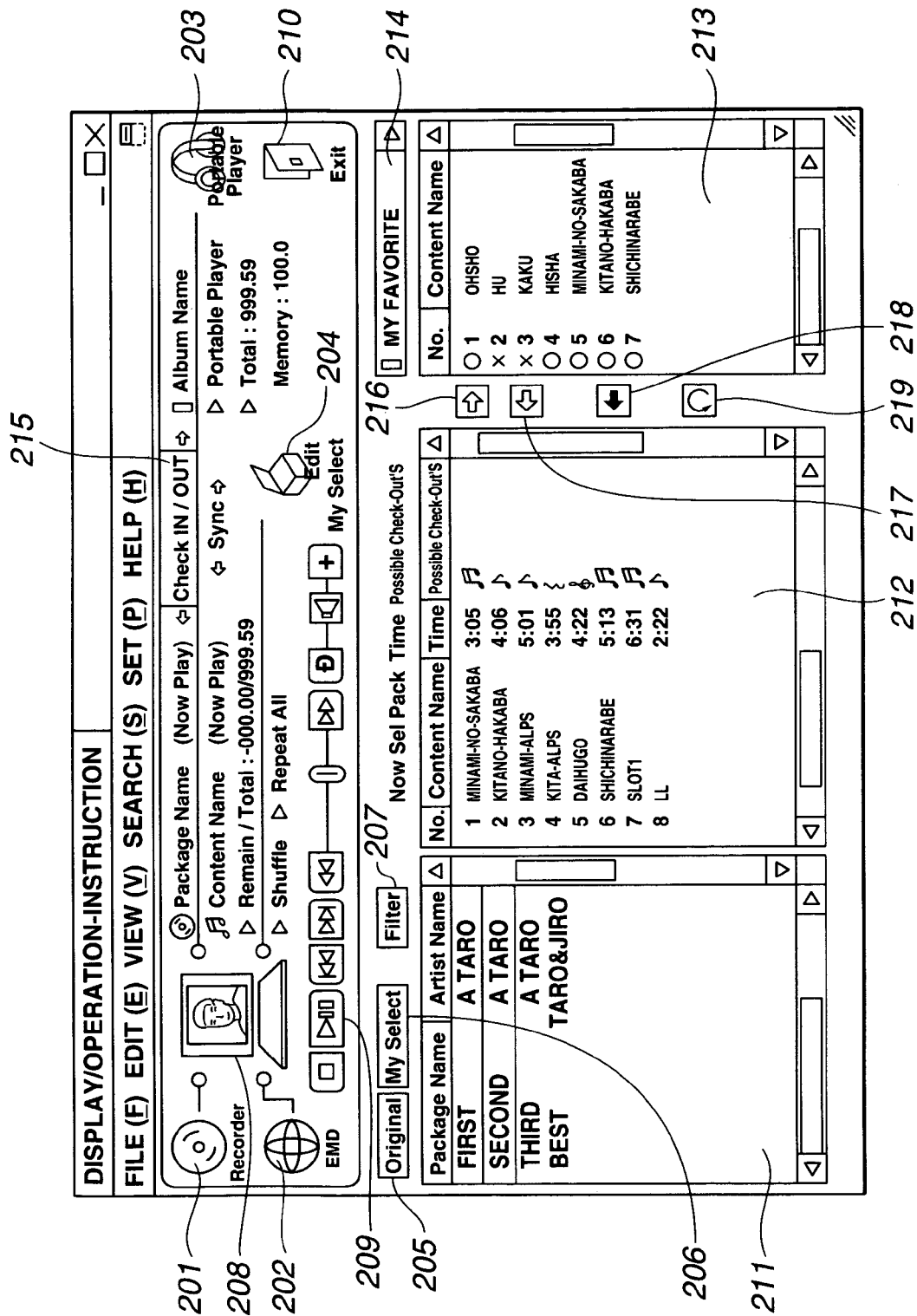
FIG. 5 shows an example of display/operation-instructive window.

FIG. 5 shows an example of the display/operation-instructive window the display/operation-instructive program 112 makes the display unit 20 display.

There are displayed in the display/operation-instructive window a button 201 for starting up the recording program 113, a button 202 for starting up the EMD selection program 131, a button 203 for displaying a field in which check-in or check-out is set, a button 204 for displaying a field in which a my selected package is to be edited, etc.

When a button 205 is selected, data corresponding to an original package is displayed in a field 211 of the window. When a button 206 is selected, data corresponding to a my selected package is displayed in the field 211. When a button 207 is selected, data corresponding to a filtering package is displayed in the field 211.

Data displayed in the field 211 concerns a package. For example, it is a package name or an artist's name.

As shown in FIG. 5, there are displayed in the field 211 a package name "FIRST" and artist's name "A TARO", a package name "SECOND" and artist's name "A TARO", etc.

The display/operation-instructive window has also a field 212 in which there is displayed data corresponding to a content belonging to a packet selected in the field 211. Data displayed in the field is a music piece title, playing time or a number of times the content can be checked out.

In FIG. 5, a package corresponding to the package name "SECOND" is selected. So, there are displayed in the field 212 the music piece title (content name) "MINAMI-NO-SAKABA" corresponding to the content belonging to the package corresponding to the package name "SECOND", a number of times the content can be checked out (for example, one eighth note is for one check-out and two eighth notes are for two check-out's), and music piece title (content name) "KITA-NO-HAKABA" and number of times the content can be checked (for example, one eighth note corresponds to one check-out).

Thus, one eighth note as a number of times a content can be checked out, displayed in the field 212, indicates that a corresponding content can be checked out once.

A rest as a number of times a content can be checked out, displayed in the field 212, indicates that a corresponding content cannot be checked out (the number of check-out's is zero; however, the personal computer 1 can play back that content). A C clef as a number of times a content can be checked out, displayed in the field 212, indicates that the number of check-out's for a corresponding content is limitless (the content can be checked out any number of times).

Note that the number of times a content can be checked out may be indicated with a corresponding number of pieces of a predetermined figure (for example, it may be a circle, star, crescent or the like) as shown in FIG. 5 as well as a number.

Also there is displayed in the display/operation-instructive window a field 208 in which an image or the like corresponding to a selected package or content (corresponding to any of the image files 183-1 to 183-K in FIG. 4) is displayed. In this field, a button 209 is clicked when playing back a selected content (outputting a sound corresponding to the content to the speaker 45).

When a music piece title of a predetermined content (content name) displayed in the field 212 is selected and a deleting operation is made while the button 205 is selected and data corresponding to an original package is being displayed in the field 211, the display/operation-instructive program 112 will make the content management program 111 delete the predetermined content stored in the content data base 114, corresponding to the selected music piece title.

When a content read from a CD is recorded into the content data base 114 while a button 255 (which will further be described later) in the window displayed under the control of the recording program 113 is being selected (made active), the display/operation-instructive program 112 will make the display/operation-instructive window display a field 213 in which there is displayed a music piece title of a content (content name) stored in any pre-designated one of the portable devices 6-1 to 6-3.

When a content read from a CD is recorded into the content data base 114 while a button 255 (which will further be described later) in the window displayed under the control of the recording program 113 is being selected (made active), the display/operation-instructive program 112 will make the content management program 111 check out the content recorded in the content data base 114 and read from the CD to any pre-designated one of the portable devices 6-1 to 6-3.

There is displayed in the field 213 at the leftmost position thereof corresponding to the music piece title of a content (content name) a symbol indicating whether the content can be checked in to the personal computer 1. For example, a symbol "○" at the leftmost position of the field 213 indicates that a content corresponding to a music piece title of a content can be checked in to the personal computer 1 (that is, it has been checked out from the personal computer 1). A symbol "x" at the leftmost position of the field 213 indicates that a content corresponding to a music piece title of a content cannot be checked in to the personal computer 1 (that is, it has not been checked out from the personal computer 1; for example, it has been checked out from any other personal computer).

When the display/operation-instructive program 112 has displayed the field 213 in the display/operation-instructive window, the display/operation-instructive program 112 will display in the display/operation-instructive window a field 214 in which the name of a portable package (to which a content stored in any pre-designated one of the portable devices 6-1 to 6-3 belongs) is displayed, a button 210 to close the field 213, and a button 215 to execute a check-in or check-out operation.

Further, when the display/operation-instructive program 112 has displayed the field 213 in the display/operation-instructive window, the display/operation-instructive program 112 will display in the display/operation-instructive window a button 216 to set a check-out operation for a content corresponding to a music piece title selected in the field 212, a button 217 to set a check-in operation for a content corresponding to a music piece title selected in the field 213, a button 218 to set a check-in operation for all contents corresponding to content names displayed in the field 213, and a button 219 to cancel the check-in or check-out setting.

Even with the check-in or check-out setting made by using the buttons 216 to 219, however, the personal computer 1 will not execute the check-in or check-out operation.

When the button 215 is clicked after a check-in or check-out is set by using the buttons 216 to 219, the display/operation-instructive program 112 will make the content management program 111 execute the check-in or check-out. That is to say, when the button 215 is clicked, the display/operation-instructive program 112 will make, based on the check-in or check-out setting, the content management program 111 transmit a content, or a command to erase a predetermined content corresponding to the check-in setting (e.g., a command to erase a predetermined content stored in any of the portable devices 6-1 to 6-3), to any of the portable devices 6-1 to 6-3, and to update the usage rule stored in the usage rule file 162 corresponding to the content or command thus transmitted.

When the check-in or check-out is executed, the display/operation-instructive program 112 will respond to the transmitted content or command to update the history data stored in the history data file 184. The history data includes information for identification of a content having been checked in or out or a date when the content has been checked in or out, and the name of a one of the portable devices 6-1 to 6-3 from which the content has been checked out.

Since the check-in or check-out can be set in a short time, the user can quickly know the status after execution of a check-in or check-out operation, whereby the number of times a time-taking check-in or check-out operation is done can be reduced to minimize the total time (including the setting and execution of a check-in or check-out operation) taken for the check-in or check-out procedure.

Figure 6:
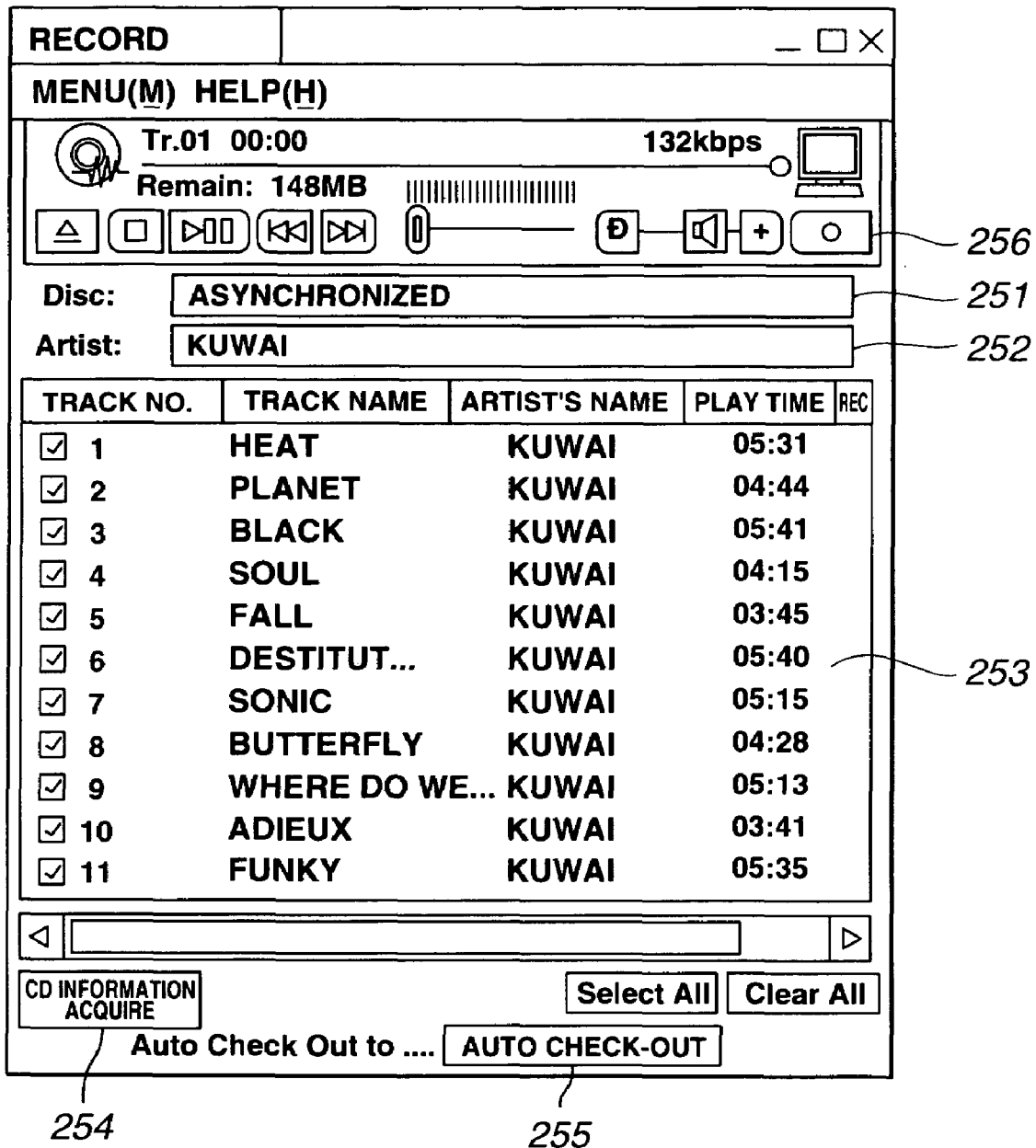
FIG. 6 shows an example of the window which the recording program makes the display unit display.

FIG. 6 shows an example of the window which the recording program 113 makes the display unit 20 display. Based on CD information received from the WWW server 5-2 for example, the recording program 113 will display a CD title such as "ACYNCHRONIZED" in a field 251. Also, based on CD information received from the WWW server 5-2, the recording program 113 will display an artist's name such as "KUWAI" in a field 252.

Based on CD information received from the WWW server 5-2, the recording program 113 will display titles of music pieces such as "HEAT", "PLANET", "BLACK", "SOUL", etc. in a region of a field 253 where music piece titles are to be displayed. Similarly, the recording program 113 will display an artist's name such as "KUWAI" is a region of the field 253 where artists' names are to be displayed.

After receiving a predetermined CD information, the recording program 113 will store it into a predetermined directory in the HDD 21.

Upon reception of an instruction for acquisition of CD information via clicking of a button 254, the recording program 113 will first search the predetermined directory in the HDD 21. When the CD information is found stored in the directory, the recording program 113 will display a dialogue box (not shown) to prompt the user for selection of whether he or she is going to use the CD information stored in the directory.

When a button 256 displayed in the window displayed by the recording program 113 and which instructs to start recording of a content, is clicked, the recording program 113 will read a content from a CD set in the drive 22, and supply it along with the CD information to the content management program 111. The compression/expansion program 138 of the content management program 111 compresses the content supplied from the recording program 113 in a predetermined manner, and the encryption program 137 encrypts the compressed content. Also, the usage rule conversion program 139 generates a usage rule for the compressed and encrypted content.

The content management program 111 will supply the compressed and encrypted content along with the usage rule to the content data base 114.

The content data base 114 will generate a content file 161 and usage rule file 162 for the content received from the content management program 111, and store the content into the content file 161 and the usage rule into the usage rule file 162.

When the content and usage rule for the content are stored into the content data base 114, the content management program 111 will supply the CD information and usage rule received from the recording program 113 to the display/operation-instructive program 112.

The display/operation-instructive program 112 will a display data for storage into the display data file 182 according to the usage rule for the content stored in the content data base 114 by the recording and the CD information.

The window displayed by the recording program 113 has displayed therein a button 255 to automatically set whether any of the portable devices 6-1 to 6-3 is made to check out a content read from the CD when the content read from the CD is recorded into the content data base 114.

For example, when the button 255 is clicked, the recording program 113 will display a pull-down menu showing a list of the portable devices 6-1 to 6-3. When the user selects any of the portable devices 6-1 to 6-3 from the pull-down menu, the personal computer 1 will automatically check out the content recorded from the CD to any selected one of the portable devices 6-1 to 6-3. When the user selects "NOT CHECK OUT" from the pull-down menu, the personal computer 1 will not check out the content recorded from the CD.

Thus, when the content read from the CD is recorded into the content data base 114 with only the button 255 in the window displayed by the recording program 113 being set active, the personal computer 1 can make any pre-designated one of the portable devices 6-1 to 6-3 check out the content read from the CD.

Figure 7:
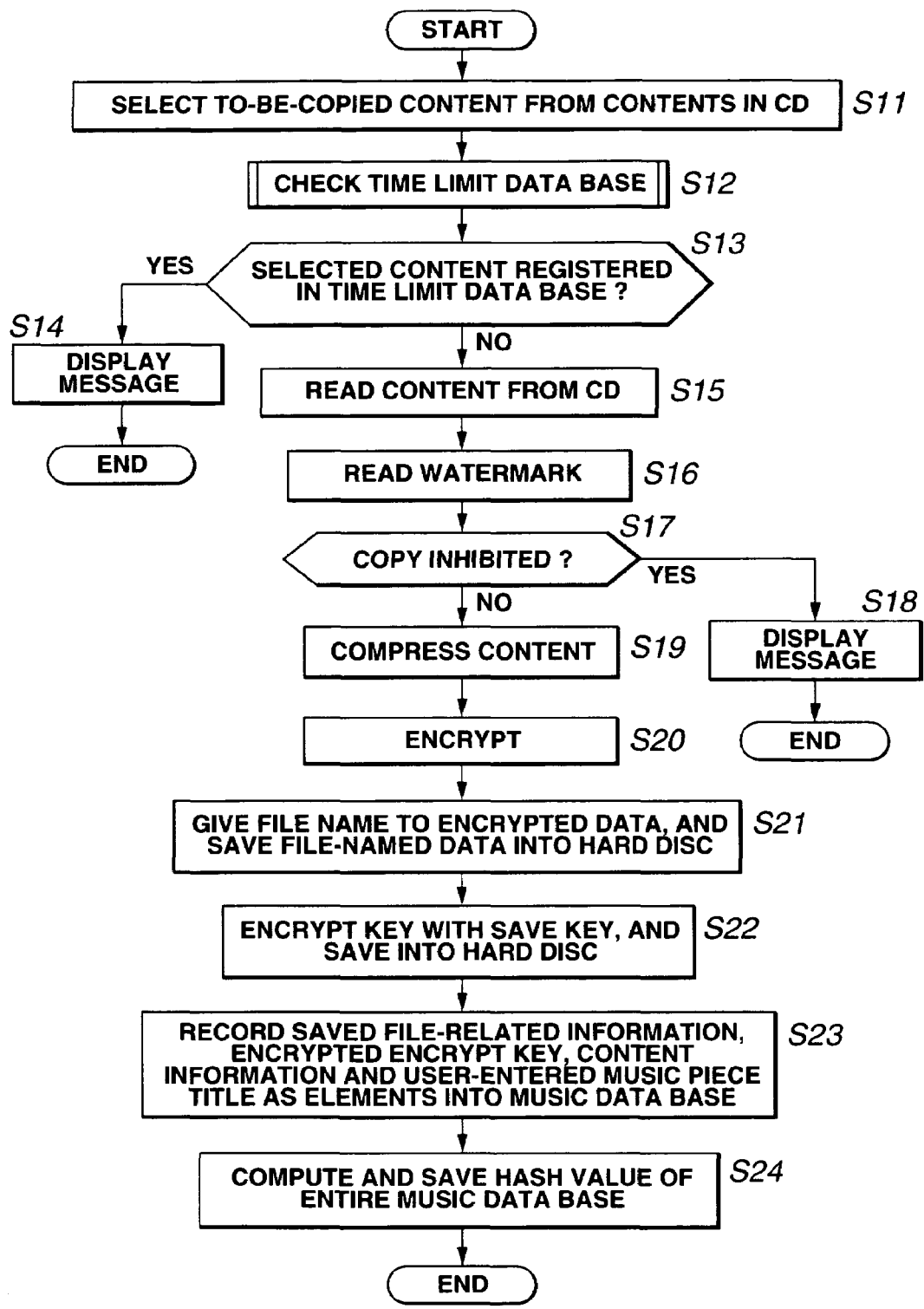
FIG. 7 is a flow chart of operations effected in copying a content from a compact disc to an HDD.

Referring now to FIG. 7, there is shown a flow chart of operations effected by the CPU 11 which executes the content management program 111, display/operation-instructive program 112, recording program 113 and content data base 114 in transferring a content played back from a CD set in the drive 22 to the HDD 21 and thus copying the content from the CD to the HDD 21. When the user operates the keyboard 18 or mouse 19 to supply to the CPU 11 via the interface 17, a command to transfer, for copying, a content played back from a CD (not shown) set in the drive 22, the recording program 113 will display, at step S11, a GUI (graphical user interface) shown in FIG. 6 for example, for selection of a content which is to be copied into the display unit 20 via the interface 17.

More specifically, the recording program 113 will read TOC (table of contents) of a CD set in the drive 22, acquire content information from the CD, and display it on the display unit 20. Alternatively, the recording program 113 will read ISRC (International Standard Recording Code) for each content included in the CD, acquire the content information, and display it on the display unit 20. Still alternatively, when the button 254 is clicked, the recording program 113 will access the WWW server 5-1 or 5-2 via the network 2, acquire the content information from the CD by the use of TOC, and display music piece titles corresponding to the content in the field 253.

Using GUI displayed on the display unit 20, the user operates the keyboard 18 or mouse 19, and clicks a check box for each of the music piece titles displayed in the field 253 to select a content to be copied.

Figure 8:
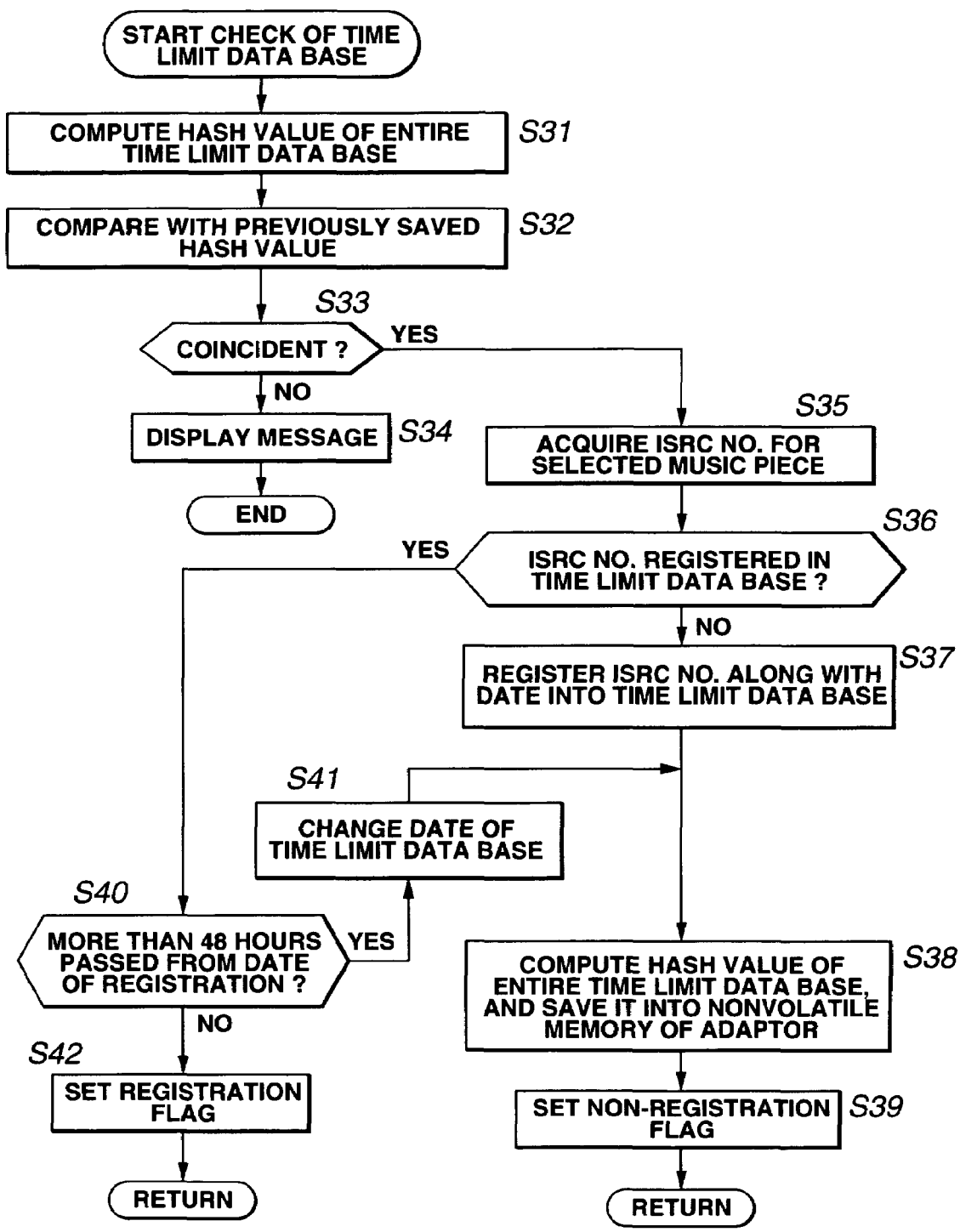
FIG. 8 is a flow chart of operations effected in checking the time limit data base at step S12 in the flow chart shown in FIG. 7.

Next at step S12, the recording program 113 makes the usage rule management program 140 check the time limit data base stored in the HDD 21 (corresponding to the usage rule files 162-1 to 162-N in the content data base 114 shown in FIG. 4). The detail of this checking of the time limit data base will further be described later with reference to the flow chart shown in FIG. 8.

At step S31, the usage rule management program 140 cooperates with the CPU 32 of the adaptor 26 to compute a hash value of the entire time limit data base, and at step S32, it will compare the computed hash value with a previously saved one.

Note that when no data is recorded in the time limit data base, the usage rule management program 140 will not compute any hash value.

Figures 9, 10:
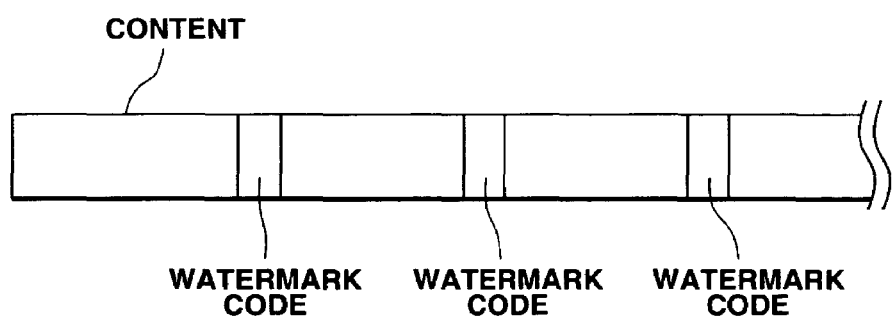
FIG. 9 shows an example of the time limit data base.
FIG. 10 explains a water mark.

More particularly, the time limit data base is formed in the HDD 21, and stores, as information for management of contents recorded in the HDD 21, pairs of ISRC and copying date of a content having been recorded, as shown in FIG. 9. In the example shown in FIG. 9, ISRC and copying date area stored for each of three items 1 to 3. At step S38, a hash value of the entire time limit data base, based on the ISRCs and copying dates of all contents recorded in the time limit data base, is computed by the CPU 32 of the adaptor 26 and stored in the nonvolatile memory 34. The hash value is a value obtained by applying a hash function to the data. The hash function is generally a unidirectional function to map long data of a variable length with shot data of a fixed length, and has such a nature that hash values will not easily conflict with each other. The hash functions include SHA (secure hash algorithm), MD (message digest) 5, etc. At step S31, the usage rule management program 140 compute a hash value as in the computation by the CPU 32. Then at step S32, the usage rule management program 140 will request the CPU 32 to read a hash value stored in the nonvolatile memory 34, and at step S31, it will compare the transferred hash value with the one it has computed.

At step S33, the usage rule management program 140 judges whether the hash value computed at step S31 coincides the hash value of the previous time limit data base stored in the nonvolatile memory 34. When no coincidence is found between the hash values, the usage rule management program 140 will determine that the time limit data base has been falsified or altered, and make the recording program 113 generate a message like "since time limit data base has been altered, no copying is possible" for example, and output the message to the display unit 20 via the interface 17 on which the message will be displayed. Hereafter, copying is inhibited. Namely, in this case, it is inhibited to play back the content recorded in the CD for copying to the HDD 21.

When the hash value computed at step S31 is found coincident with the preceding has value, the usage rule management program 140 goes to step S35 where it will make the recording program 113 acquire from the CD ISRC of a content designated at step S11 and selected as a one to be copied. If no ISRC is recorded in the CD, the usage rule management program 140 will make the recording program 113 read TOC data from the CD, and apply the hash function to the data to acquire a data of an appropriate length such as 58 bits which is to be used for ISRC.

At step S36, the usage rule management program 140 judges whether the ISRC (selected content) acquired at step S35 is registered in the time limit data base (in FIG. 9). If the ISRC is not registered in the time limit data base, it means that the content has not yet been recorded in the HDD 21. So, the usage rule management program 140 goes to step S37 where it will register the ISRC of the content and present data into the time limit data base. Note that the usage rule management program 140 uses, as the present date, a value transferred from the CPU 32 and outputted from the RTC 35 of the adaptor 26. At step S38, the usage rule management program 140 reads data from the time limit data base at the time and transfer it to the CPU 32 of the adapter 26. The CPU 32 computes a hash value of transferred data and saves it in the nonvolatile memory 34. As in the above, the hash value this saved will be used as a previously saved hash value at step S32.

Next at step S39, the usage rule management program 140 will set a non-registration flag indicating that the selected content is snot registered in the time limit data base. This flag is used at step S13 in FIG. 7 to judge whether the selected content is registered in the time limit data base.

If it has been determined at step S36 that the ISRC of the selected content is registered in the time limit data base, it means that the selected content is a one having been registered in the HDD 21 at least once. In this case, the usage rule management program 140 goes to step S40 where it will judge whether the present date (output from the RTC 35 of the adaptor 26) is more than 48 hours from the date of the past registration of the selected content, registered in the time limit data base. When the present time is already more than 48 hours from the registration date, it means that the content has been recorded at least once in the HDD 21. However, since the present time is more than 48 hours from the date at the content was recorded, the content cannot substantially be copied in a large volume even if it is copied again. In this case, it is permitted to copy the content into the HDD 21. Then, the usage rule management program 140 will go to step S41 where it will change the date in the time limit data base from the date of the past registration to the present data (output from the RTC 35). Then, the usage rule management program 140 will return to step S38 where it will make the CPU 32 compute a hash value of the entire time limit data base and save it into the nonvolatile memory 34. At step S39, the usage rule management memory 140 will set a non-registration flag for that content.

On the other hand, if it is determined at step S40 that the present date is not more than 48 hours from the registration date, it is inhibited to copy the selected content into the HDD 21. In this case, the usage rule management program 140 will go to step S42 where it will set a registration flag for the selected content.

If the predetermined time is not judged at step S40 to have not elapsed, the content cannot newly be copied, so that copying the content in a large volume required for fraudulent sales or distribution for example is substantially disabled without unreasonable inhibition of the copying of the content for an ordinary, legal use. Note that the criterion for the judgement, taken at step S40, is a time elapse of more than 48 hours but it is not limited to 48 hours. The criterion may be any time within a range of 12 hours to 168 hours for example.

As in the above, a flag indicating whether the selected content is registered in the HDD 21 is set through checking of the time limit data base.

Referring to FIG. 7 again, the description will further be made. At step S13, the copy management program 133 judges, based on the above-mentioned flag, that the selected content has been registered in the time limit data base. If the selected content has already been registered, the copy management program 133 will go to step S14 where it will make the recording program 113 display, on the display unit 20, a message like "This music piece cannot be copied since not more than 48 hours has elapsed since the music piece has been copied once" for example. Thus, the user can know the reason why the content cannot be copied to the HDD 21.

If it is determined at step S13 that the selected content has not yet been registered in the time limit data base, the copy management program 133 goes to step S15 where the recording program 113 will make the drive 22 read a content from the CD set in the drive 22. This content has a watermark code inserted therein at a predetermined position as shown in FIG. 10. The recording program 113 will extract the watermark code included in the content at step S16 and judge, at step S17, whether the watermark code indicates an inhibition of the content from being copied. If the watermark code indicates the copy inhibition, the copy management program 133 will go to step S18 where it will make the recording program 113 display a message like "copying is inhibited" for example on the display unit 20 via the interface 17, and terminate the copying operation.

On the other hand, if it is judged at step S17 that the watermark code indicates no copy inhibition, the copy management program 133 goes to step S19 where the recording program 113 will make the compression/expansion program 138 compress the content by a software operation using a method such as ATRAC (Adaptive Transform Acoustic Coding) 3 (trade mark). At step S20, the recording program 113 will make the encryption program 137 encrypt the content by a method such as DES (Data Encryption Standard), FEAL (Fast Encipherment Algorithm) or the like using an encryption key having been preset and stored in the memory 13. The encryption key may be a one formed based on a random number generated by a software operation or a random number generated by the CPU 32 of the adaptor 26. By encrypting the encryption key using the personal computer 1 and CPU 32 of the adaptor 26 as a hardware associated with the personal computer 1 in a cooperative combination, an encryption can be attained which will make it more difficult to decrypt the encrypted encryption key.

Next at step S21, the recording program 113 transfers an encrypted data to the content data base 114, gives a file name to the data and makes the HDD 21 save it as one file (as content file 161). Alternatively, the recording program 113 may give position information (e.g., a number of byes from the top) as a part of one file to the encrypted data before save into the HDD 21.

The data save may be done separately from or simultaneously with the aforementioned compression and encryption.

Further at step S22, the recording program 113 will make the encryption program 137 encrypt the encryption key with which the content has been encrypted, using a predetermined save key stored in the nonvolatile memory 34 and by the aforementioned DES method, FEAL method or the like, save the encrypted encryption key in the music data base in the HDD 21 (corresponding to the usage rule files 162-1 to 162-N of the content data base 114 shown in FIG. 4).

At step S23, the recording program 113 makes a set of saved information on the file, encrypted encryption key, information of the content, and elements of music piece title information supplied by the user via the GUI, and register it in the music data base in the HDD 21 (as the usage rule files 162-1 to 162-N). At step S24, the recording program 113 will make the CPU 32 compute a hash value of the entire music data base and save it into the nonvolatile memory 34.

In this way, the music data base as shown in FIG. 11 for example is registered into the HDD 21. In this example music data base, there are recorded a file name, encrypted encryption key, music piece title, play time length, playback conditions (start date, end date and playback limit), playback counter, playback accounting condition, copying condition (copies), copy counter and copying condition (SCMS) for each of items 1 to 3.

In the method defined by SDMI (Secure Digital Music Initiative) for example, a number of times a content copied from a CD can be checked out (check-out limit) is set to 3.

Since it is arranged that when a predetermined period of time elapses from copying of a content from a CD to the HDD 21, the content can be copied again, the content can be copied several times allowed only for private use by the user. On the other hand, if it is tried to copy the content a larger number of times than the allowed number for the private use by the user, for example, in a large volume, the copying will take a very long time and actually be impossible. Also even if the personal computer 1 has failed and the content recorded in the HDD 21 has been erased, the erased content can be copied again and recorded into the HDD 21 when a predetermined time elapses.

Also, the content of the time limit data base recorded into the HDD 21 can commonly be shared via the network 2.

In the above, there has been explained the example in which a copying date is stored correspondingly to ISRC. In addition to the ISRC, however, any other information (such as music piece title, album name or their combination) with which a content and CD can be identified may be used.

Figure 13:
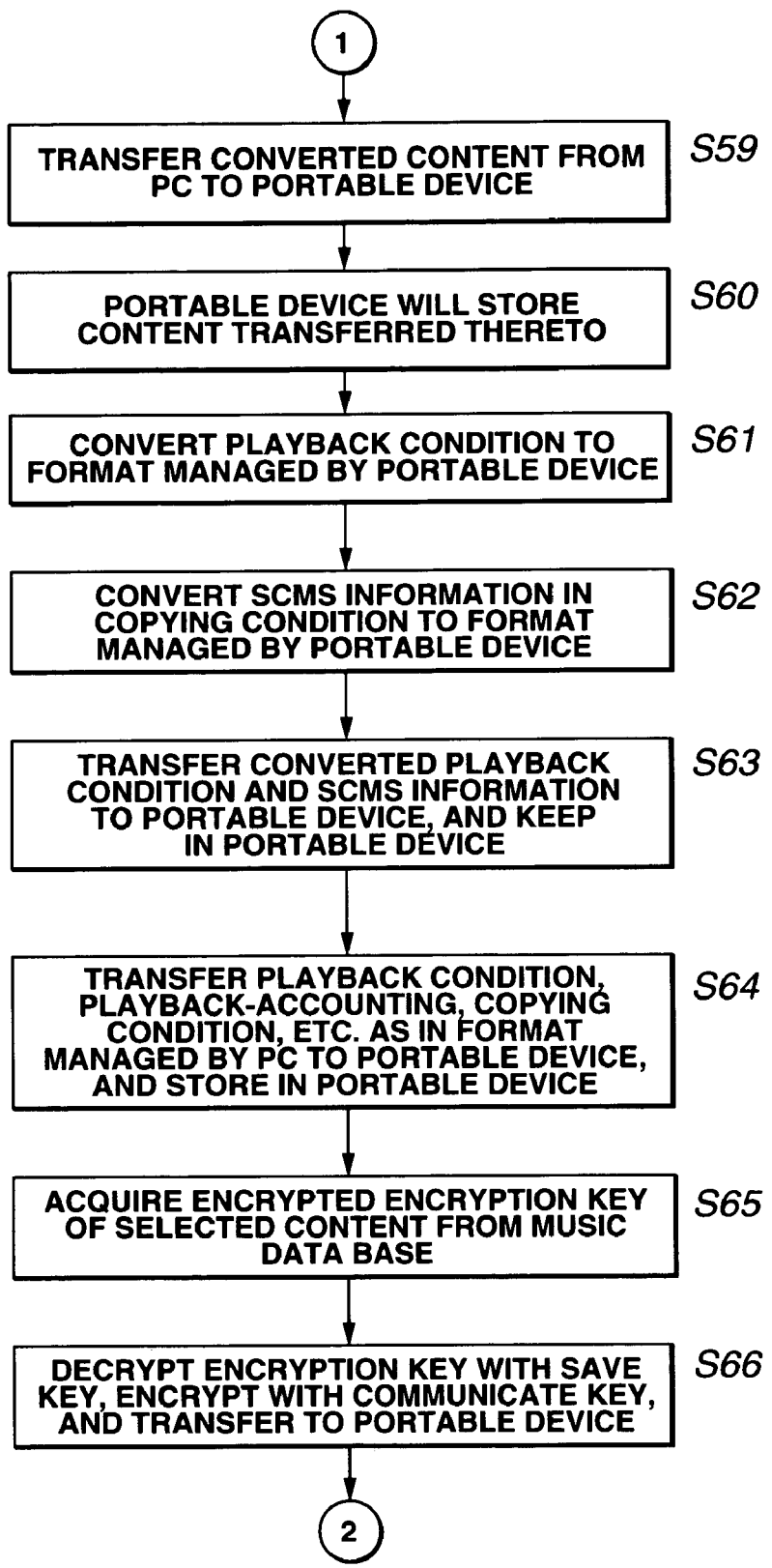
FIG. 13 is a flow chart of operations effected in moving a content from the HDD to portable device.
Figure 14:
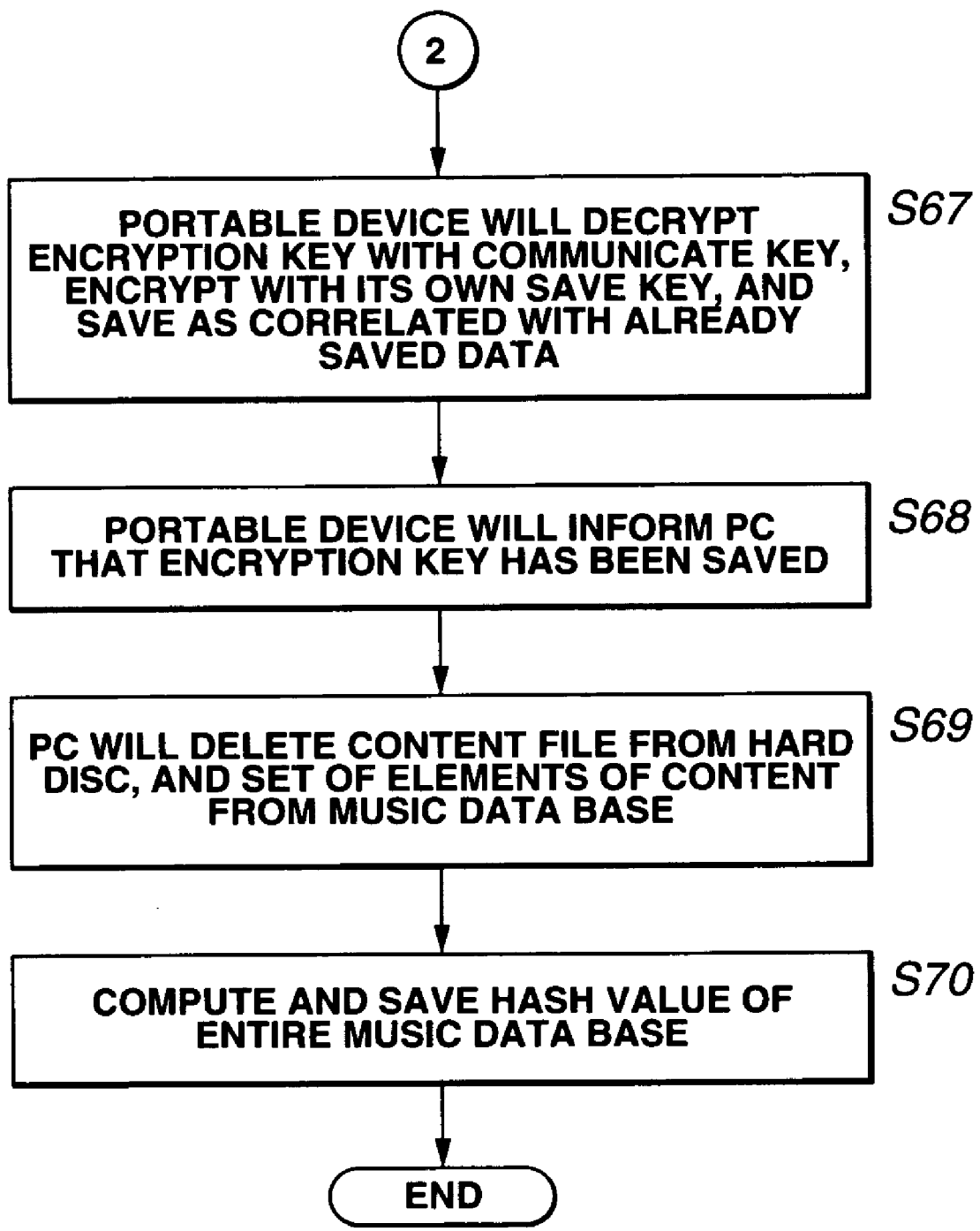
FIG. 14 is a flow chart of operations effected in moving a content from the HDD to portable device.

Next, move of a content from the HDD 21 to the flash memory 61 (e.g., memory stick (trade mark)) in the portable device 6 and content check-out, effected by the CPU 11 which executes the display/operation-instructive program 112 and content management program 111 and CPU 52 which executes the main program, will be described herebelow with reference to the flow chart shown in FIGS. 12 to 14.

First, the content move will be described herebelow. At step S51, the move management program 134 makes the usage rule management program 140 compute the hash value of the entire music data base, and at step S52, it compares the computed hash value with a hash value having previously been computed by the CPU 32 and saved in the nonvolatile memory 34. When there is no coincidence between these hash values, the move management program 134 goes to step S53 where it will make the display/operation-instructive program 112 display a message like "Possibly music data base has been falsified or altered" on the display unit 20, and terminate the operation. These operations are similar to those effected at steps S31 to S34 in FIG. 8. In this case, the content move from the HDD 21 to the portable device 6 will not be done.

Figure 15:
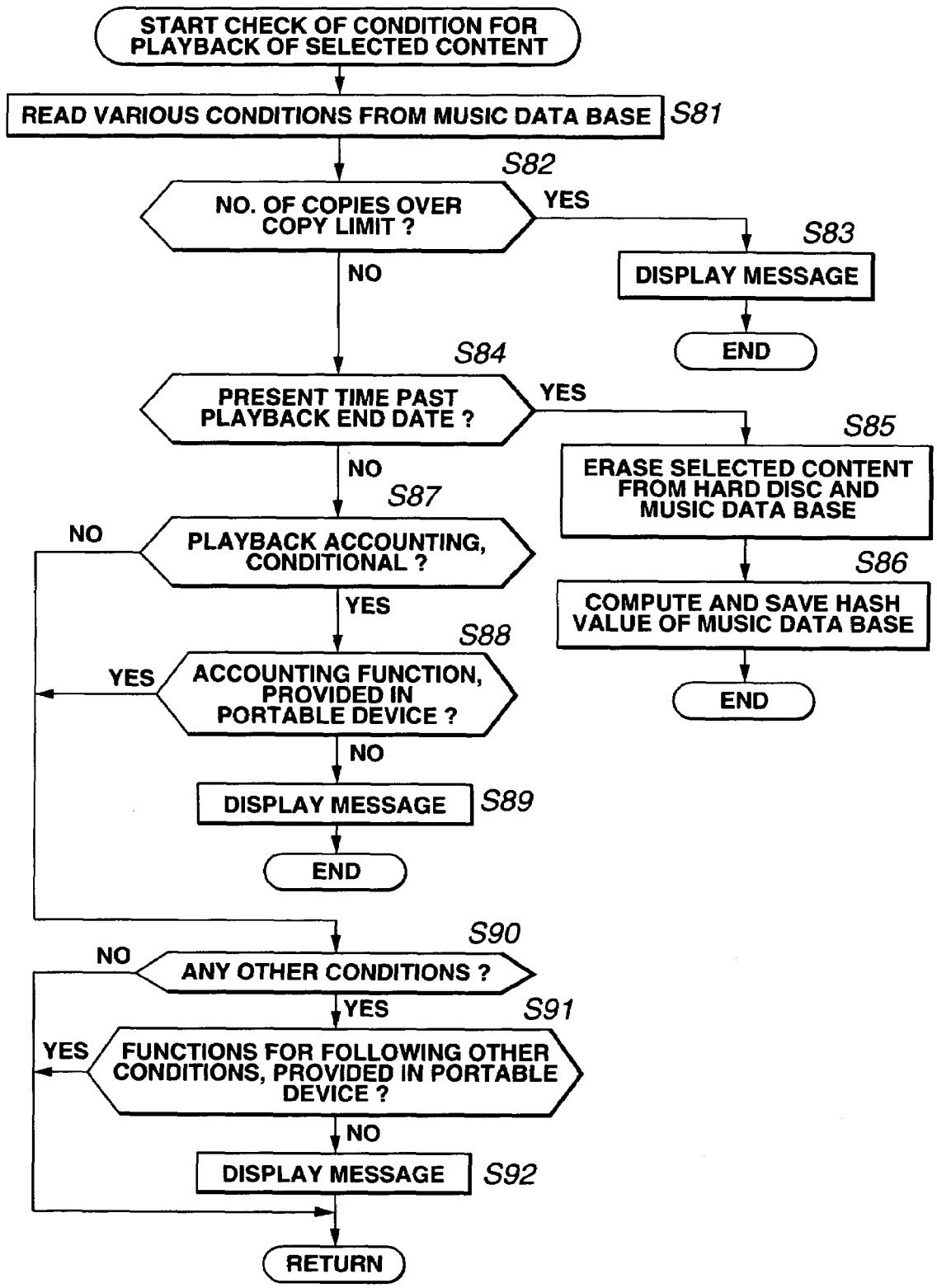
FIG. 15 is a flow chart of operations effected in checking conditions for playback of a selected content at step S55 in the flow chart shown in FIG. 12.

Next at step S54, the move management program 134 reads information on a content recorded in the music data base (included in the content data base 114) formed in the HDD 21, and makes the display/operation-instructive program 112 display the information as a selecting GUI on the display unit 20. The user clicks a music piece title (content name) and button 216 displayed in the field 212 in FIG. 5 to select the content to be moved from the HDD 21 to the portable device 6. Next at step S55, the move management program 134 examines the playback condition, copying condition, playback accounting condition, etc. for the content having been selected at step S54. This operation will further be described later with reference to the flow chart in FIG. 15.

Next at step S56, mutual authentication is made between the authentication program 141 of the personal computer 1 and CPU 53 of the portable device 6 and a communication key is shared between them.

For example, it is assumed here that the flash memory 61 (or EEPROM 68) of the portable device 6 has a master key KM stored in advance and the RAM 13 of the personal computer 1 (or a predetermined file in the HDD 21) has an individual key KP and ID stored in advance. The CPU 53 is supplied with the ID previously stored in the RAM 13 from the authentication program 141 and applies the hash function to that ID and its own master key MK to generate the same key as the individual key of the personal computer 1, stored in the RAM 13. Thus, the personal computer 1 and portable device 6 will share a common individual key which is used to generate a provisional communication key.

Alternately, an ID and master key KMP are stored in advance in the RAM 13 of the personal computer 1 and an ID and master key KMM are stored in advance in the flash memory 61 of the portable device 6. The RAM 13 sends its ID and master key to the flash memory 61 which will also send its ID and master key to the RAM 13, and the RAM 13 applies the hash function to the ID and master key received from the flash memory 61 while the latter will apply the hash function to the ID and master key received from the RAM 13. Thus, the RAM 13 generates an individual key for the flash memory 61 while the latter generates an individual key for the RAM 13. A provisional communication key will further be generated from the individual key.

It should be noted that for the authentication method, the IOS (International Organization for Standardization) 9798-2 can be used for example.

When the mutual authentication is not correctly done, the operation is terminated. When the mutual authentication has successfully be done, the move management program 134 will make the content data base 114 read the file name of the selected content from the music data base at step S57, and reads a content having the file name (for example, the file name has been encrypted at step S20 in FIG. 7) from the HDD 21. At step S58, the move management program 134 converts the compression method (for the compression effected at step S19), encryption method (for the encryption effected at step S20), format (for example, that for the header), etc. having been used for the content being a digital data read at step S57 to those used in the portable device 6. The conversion will further be described later with reference to the flow chart in FIG. 17.

At step S59, the move management program 134 will make the PD driver 143 transfer the content converted at step S58 to the portable device 6 via the USB port 23. At step S60, the CPU 53 of the portable device 6 receives the transmitted content via the USB connector 56 and stores it as it is into the flash memory 61.

At step S61, the move management program 134 will further make the usage rule conversion program 139 convert the playback conditions (start date, end date, playback limit, etc.) for the selected content, registered in the music data base, to those used in the portable device 6. At step S62, the move management program 134 will further make the usage rule conversion program 139 convert the SCMS information in the copying condition for the selected content, registered in the music data base, to a format managed by the portable device 6. Then at step S63, the move management program 134 makes the PD driver 143 transfer to the portable device 6 the playback condition having been converted at step S61 and SCMS information having converted at step S62. The CPU 53 of the portable device 6 saves the transferred playback condition and SCMS information into the flash memory 61.

At step S64, the move management program 134 makes the PD driver 143 transfer to the portable device 6 the playback condition, playback accounting condition, copying condition, etc. for the selected content, registered in the music data base, as in the format dealt with in the music data base by the CPU 11, and save them into the flash memory 61.

At step S65, the move management program 134 makes the content data base 114 reads the encrypted encryption key for the selected content from the music data base, and then at step S66, it will make the decryption program 142 decrypt the encryption key with the save key saved in the RAM 13, and the encryption program 137 encrypt the decrypted encryption key with the communication key. Then the move management program 134 will make the PD driver 143 transfer the encryption key encrypted with the communication key to the portable device 6.

At step S67, the CPU 53 of the portable device 6 will decrypt the encryption key transferred from the personal computer 1 by the use of the common communication key generated by the mutual authentication, encrypt it using its own save key, correlate it with the already saved data, and save it into the flash memory 61.

Upon completion of the saving of the encryption key, the CPU 53 will inform, at step S68, the personal computer 1 that the encryption key has been saved. When receiving this information from the portable device 6 from the portable device 6, the move management program 134 of the personal computer 1 will make, at step S69, the content data base 114 delete the content file 161 corresponding to the content, and the set of the elements of the content (i.e., usage rule file 162) from the music data base. Thus, the content will be moved, not copied. At step S70, the move management program 134 transfers data in the music data a base to the CPU 32 of the adaptor 26 and makes the CPU 32 compute the hash value of the entire music data base and save it into the nonvolatile memory 34. The hash value will be used as a previously saved one at step S52 having been described above.

Next, check-out of a content from the personal computer 1 to the portable device 6 will be described below. This operation is similar to the content move from the personal computer 1 to the portable device 6 as having been described in the above with reference to FIGS. 12 to 14. That is, the check-out operation is basically similar to the content move operation except that the check-out operation is executed in the personal computer 1 by the check-in/check-out management program 132, and that at step S69 in FIG. 14, the number of times the content checked out and recorded in the music data base has been checked out (or can be checked out) is updated (in the content move, the content is deleted). Therefore, the check-out operation will not be described any longer.

Figure 12:
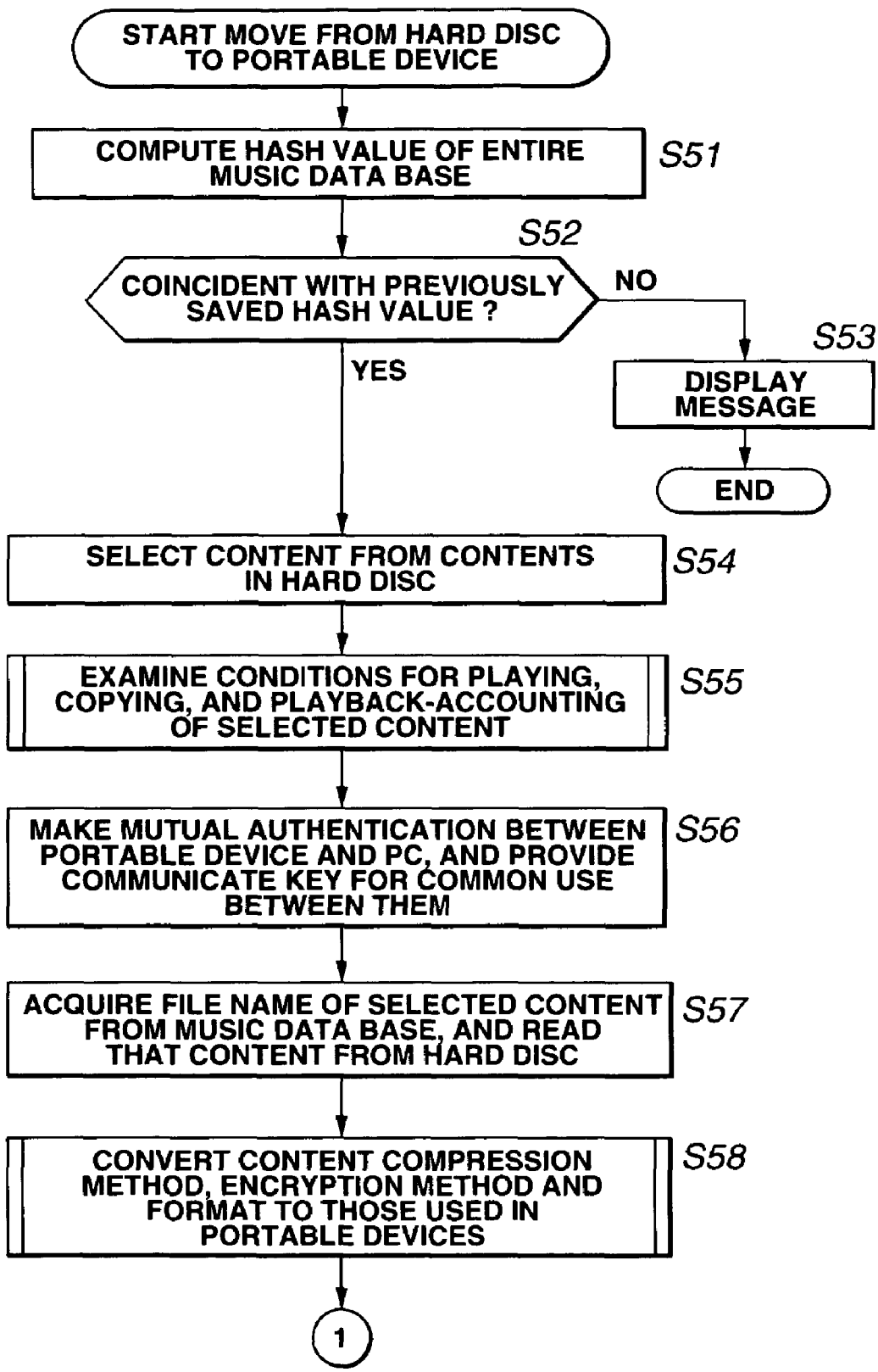
FIG. 12 is a flow chart of operations effected in moving a content from the HDD to portable device.

The CPU 11 which executes the content management program 111 checks the playback conditions, etc. for a content selected at step S55 in FIG. 12. This checking operation will be described below with reference to the flow chart in FIG. 15. At step S81, the movement management program 134 makes the content data base 114 read various conditions from the music data base. Then at step S82, the move management program 134 judges whether the copy counter in the conditions read at step S81 has already exceeded the copy limit. When the copy counter has already exceeded the copy limit, no further copy can be permitted, so the move management program 134 will go to step S83 where it will make the display/operation-instructive program 112 display a message like "Copy counter has already exceeded copy limit" on the display unit 20, and terminate the operation. If it is determined at step S82 that the copy counter has not exceeded the copy limit, the move management program 134 goes to step S84 where it will judge whether the present date is past the playback end date. The present date is a one outputted from the RTC 35 of the adaptor 26. With this operation, the user will not be able to use any present time of the personal computer 1, which is obtainable by intentionally correcting to a past one. The move management program 134 is supplied with the present time from the CPU 32, and makes by itself the judgement at step S84 or supplies, at step S81, the playback conditions read from the music data base to the CPU 32 of the adaptor 26 and thus makes the CPU 32 do the judgement at step S84.

If the present date is past the playback end date, the move management program 134 goes to step S85 where it will make the content data base 114 erase the selected content from the HDD 21 and information on the selected content from the music data base. At step S86, the move management program 134 makes the CPU 32 compute the hash value of the entire music data base and save it into the nonvolatile memory 34. Here the operation is terminated. Therefore, no content will be moved in this case.

If it is determined at step S84 that the present date is not yet past the playback end data, the move management program 134 will go to step S87 where it will judge whether the playback-accounting condition (e.g., fee per playback) for the selected content is registered in the music data base. If the playback-accounting condition is found registered, the move management program 134 will make, at step S88, the PD driver 143 communicate with the portable device 6 to judge whether the portable device 6 has an accounting function. If the portable device 6 has no accounting function, the selected content cannot be transferred to the portable device 6. Therefore, the move management program 134 will make, at step S89, the display/operation-instructive program 112 display a message like "Destination has no accounting function" on the display unit 20, and terminate the operation.

If it is determined at step S87 that no playback-accounting condition is registered or at step S88 that the portable device 6 has the accounting function, the move management program 134 goes to step S90 where it will judge whether other playback conditions such as playback limit are registered for the selected content. If the other playback conditions are found register, the move management program 134 goes to step S91 where it will judge whether the portable device 6 has a function to follow the playback conditions. If the portable device 6 has no such a function, the move management program 134 goes to step S92 where it will make the display/operation-instructive program 112 display a message like "Destination has no function to follow playback conditions" on the display unit 20, and terminate the operation.

If it is determined at step S90 that no playback conditions are registered, or if it is determined at step S91 that the portable device 6 has a function to follow the playback conditions, the checking of the playback conditions will be terminated, and the move management program 134 will return to step S56 in FIG. 12.

FIG. 16 shows an example of the playback condition managed (which can be followed) by the portable device 6. The playback conditions shown in FIG. 16 are stored in the EEPROM 68. In this example, a playback start date and end dat are registered for each of contents for items 1 to 3. However, a playback limit is registered only for the item 2, not for the items 1 and 3. Therefore, when the content for the item 2 is taken as the selected content, it is possible to follow the playback limit as playback condition (a number of times a content can be played back), but when content for the item 1 or 3 is taken as the selected content, it is not possible to follow the playback limit.

Figure 17:
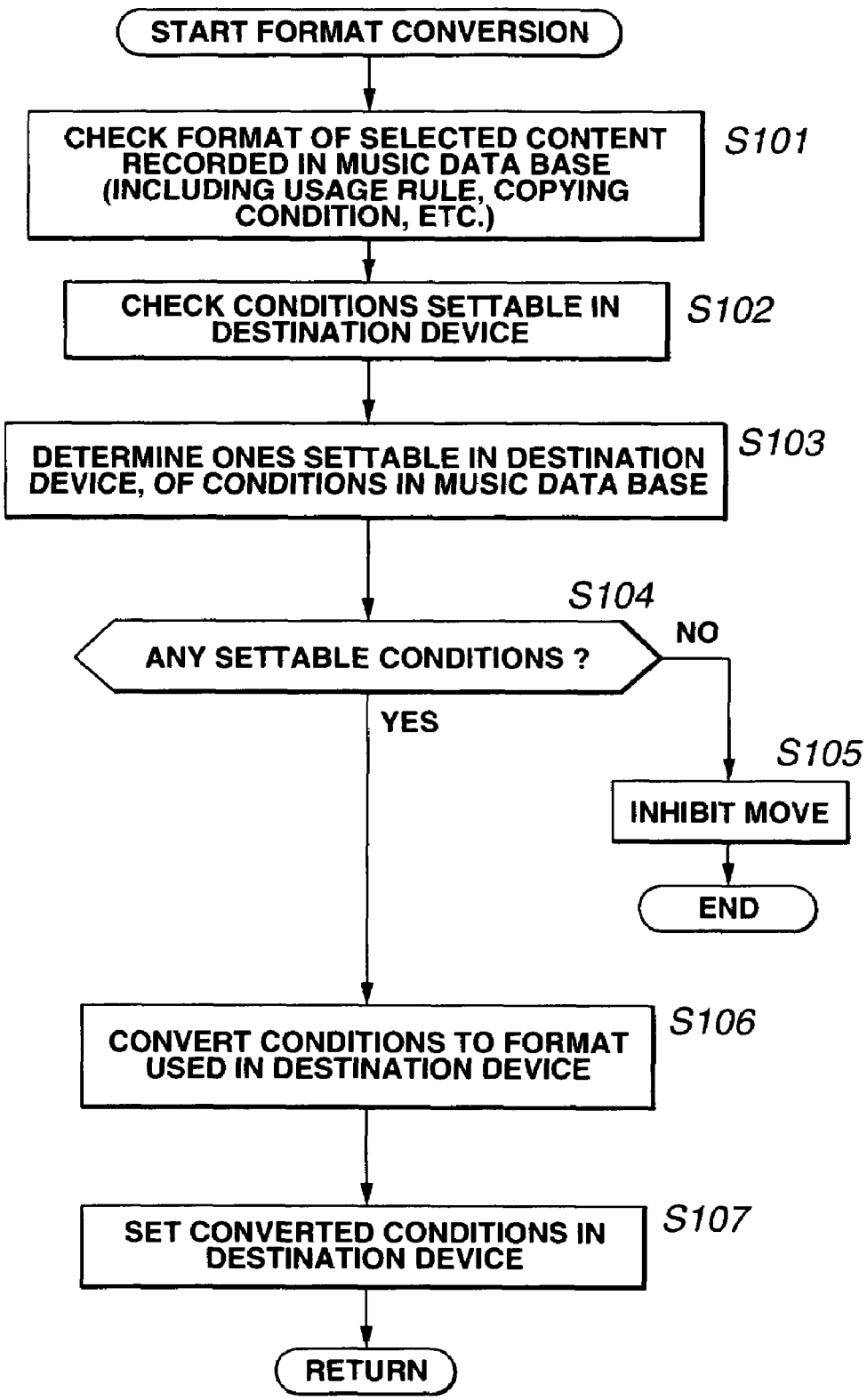
FIG. 17 is a flow chart of operations effected in format conversion at step S58 in the flow chart in FIG. 12.

Next, format conversion effected at step S58 in FIG. 12 by the CPU 11 which executes the content management program 111, will be described in detail herebelow with reference to the flow chart shown in FIG. 17. At step S101, the move management program 134 checks the format of the selected content (e.g., a header including playback conditions, usage rule, copying conditions), recorded in the content data base 114. At step S102, the move management program 134 will check conditions settable in the destination (the portable device 6 in this case). Namely, the move management program 134 inquires the CPU 53 of the portable device 6 of such settable conditions and acquires a reply from the CPU 53. At step S103, the move management program 134 will determine, based on the conditions checked at step S102, ones, settable in the destination, of the conditions in the format registered in the music data base.

At step S104, the move management program 134 judges whether there are conditions settable in the destination. If there are no such conditions, the move management program 134 goes to step S105 where it will inhibit move of a content to the portable device 6. That is, in this case, since the conditions registered in the music data base cannot be followed by the portable device 6, content move to the portable device 6 is inhibited.

If it is determined at step S104 that such settable conditions exist, the move management program 134 goes to step S106 where it will make the usage rule conversion program 139 convert the conditions to those in the function format of the destination (for example, conditions which are stored in the header when the selected content is transferred to the portable device 6). Then at step S107, the move management program 134 will set the converted conditions in the destination. As a result, the portable device 6 will be able to play back the content according to the set conditions (or following the conditions).

Figure 18:
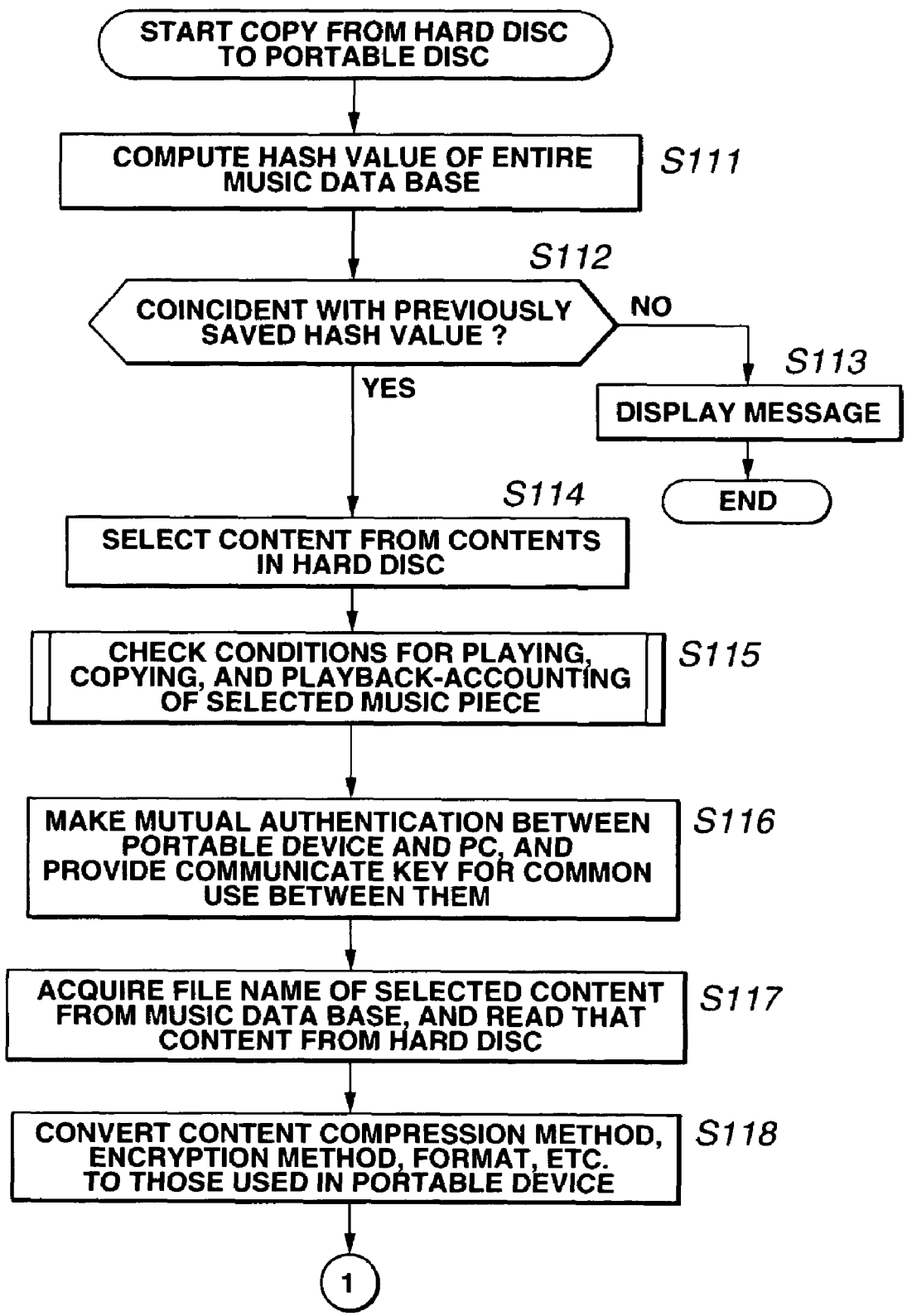
FIG. 18 is a flow chart of operations effected in copying a content from the HDD to portable device.
Figure 19:
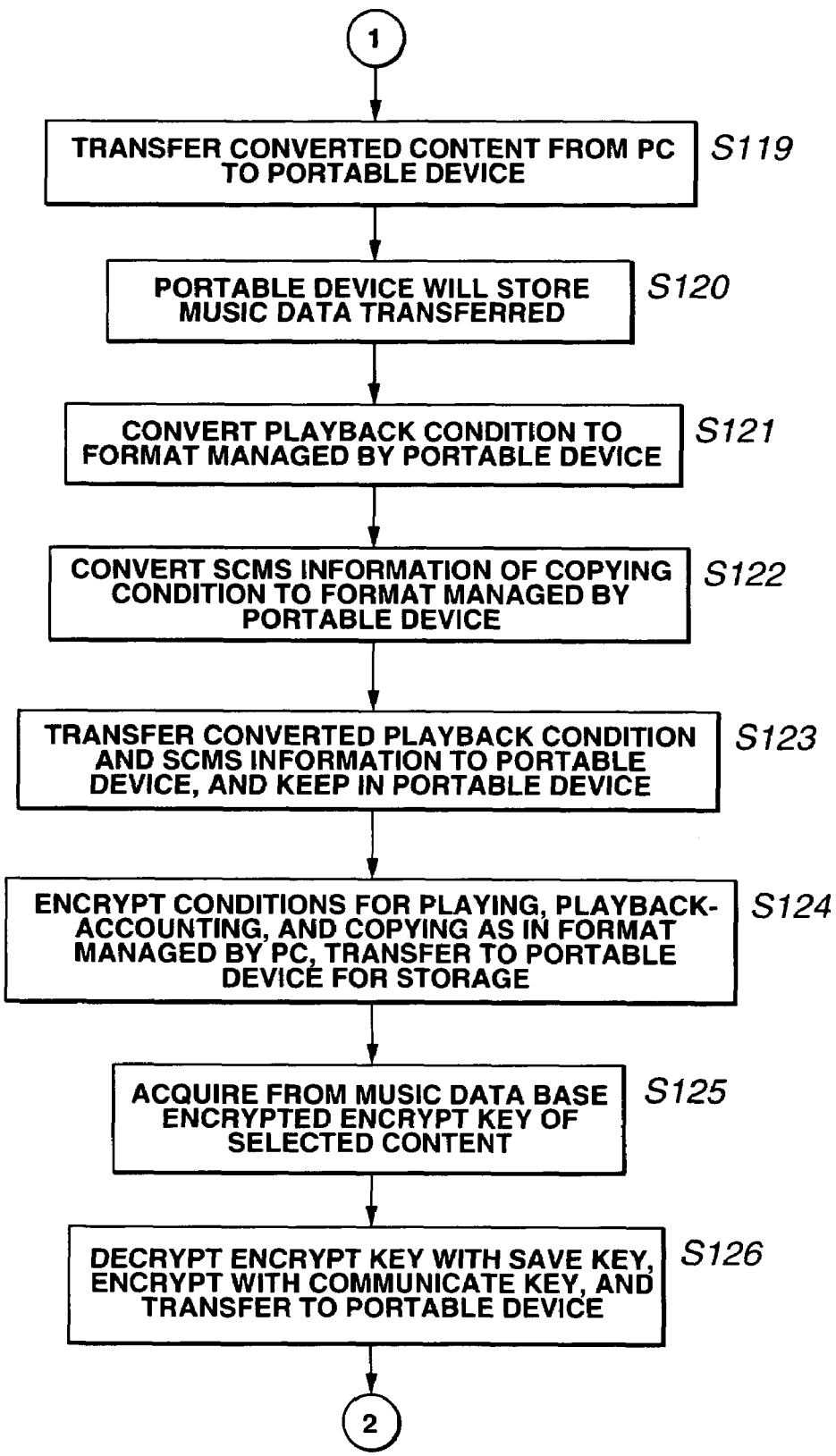
FIG. 19 is a flow chart of operations effected in copying a content from the HDD to portable device.
Figure 20:
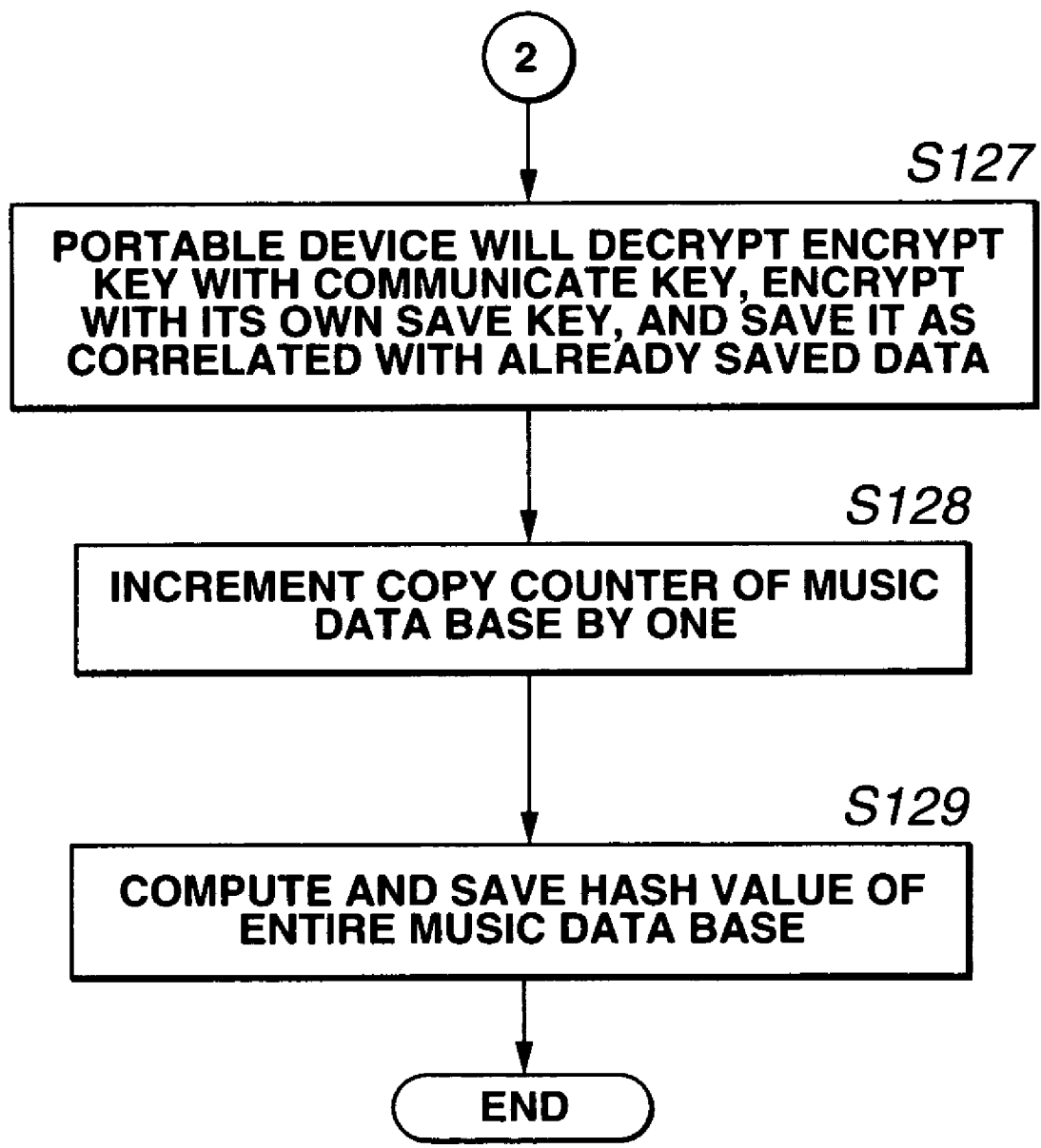
FIG. 20 is a flow chart of operations effected in copying a content from the HDD to portable device.

Next, copying of a content from the HDD 21 to the portable device 6, effected by the CPU 11 which executes the content management program 111 and CPU 53 which executes the main program, will be described herebelow with reference to the flow chart in FIGS. 18 to 20. The operations at steps S111 to S127 in FIGS. 18 to 20 are effected by the copy management program 133. These operations are similar to those at steps 51 to 67 for the content move from the HDD 21 to the portable device 6 as in FIGS. 12 to 14. Also in this case, the music data base is checked to see if it has been falsified or altered, and then the playback conditions for the selected content are checked with those recorded in the music data base. Further, after mutual authentication is made between the portable device 6 and personal computer 1, the content is transferred from the HDD 21 of the personal computer 1 to the flash memory 61 of the portable device 6, where it is saved. Thereafter at step S128, the copy management program 133 will increment the copy counter in the music data base by one. At step S129, the copy management program 133 makes the CPU 32 compute the hash value of the entire music data base, and save it into the nonvolatile memory 34.

Next, content move from the portable device 6 to HDD 21 and check-in operation, effected by the CPU 11 which executes the content management program 111 and CPU 53 which executes the main program, will be described herebelow with reference to the flow chart in FIG. 21.

First, the content move will be explained. At step S161, the move management program 134 requests the CPU 53 of the portable device 6 to read content information stored in the flash memory 61. Upon reception of the request from the move management program 134, the CPU 53 will transmit to the personal computer 1 the content information stored in the flash memory 61. Based on the information, the move management program 134 makes the display unit 20 display GUI for selection of the contents stored in the flash memory 61. According to the GUI displayed on the display unit 20, the user will operate the keyboard 18 or mouse 19 to designate a content which is to be moved from the portable device 6 to the HDD 21 (content data base 114).

At step S162, the move management program 134 makes the authentication program 141 execute a mutual authentication with the CPU 53 to generate a communication key for common use between them. This operation is similar to that at step S56 in FIG. 12.

Next at step S163, the CPU 53 will read the encrypted selected content stored in the flash memory 61, and transfers it to the personal computer 1. At step S1164, the move management program 134 takes, as one file, the content transferred from the portable device 6 and gives a file name to it, and saves it into the content data base 114 (in the HDD 21). This save may be done with position information of the file (e.g., number of bytes from the top) given as a part of one file.

At step S165, the CPU 53 will read the encrypted encryption key for the selected content, recorded in the flash memory 61, decrypt it with its own save key, further encrypt it with the communication key, and then transfers it to the personal computer 1. The encryption key is a one having been saved in the flash memory 61 in the operation at step S67 in FIG. 14 for example.

Receiving the encryption key transferred from the portable device 6, the move management program 134 makes, at step S166, the decrypting program 142 decrypt the encryption key with the communication key, and the encryption key 137 encrypt it with its own save key. At step S167, the move management program 134 will make the content data base 114 register, into the music data base in the HDD 21, the content file name and content information saved at step S164, music piece name (content name) entered by the user via the GUI, the encryption key encrypted at step S166, etc. Then at step S168, the move management program 134 makes, via the CPU 32, the usage rule management program 140 compute the hash value of the entire music data base, and the nonvolatile memory 34 save it.

At step S169, the move management program 134 informs the portable device 6 that the encryption key has been saved, and requests it to delete the content. When requested from the personal computer 1 to delete the content, the CPU 53 will delete, at step S170, the content stored in the flash memory 61.

Next, the check-in of a content from the portable device 6 to the personal computer 1 will be described herebelow. The operations of content check-in from the portable device 6 to the personal computer is similar to the content move from the portable device 6 to the personal computer 1 as in FIG. 21. That is, the check-in operation is effected by the check-in/check-out management program 132 in the personal computer 1, and the operations at steps S162 to S166 in FIG. 21 are omitted. Also, the personal computer 1 will update, at step S167 in FIG. 21, the check-out limit, namely, a number of times the checked-in content can be checked out, recorded in the music data base, and after completion of the operation at step S170, operations basically similar to those in the content move except for the confirmation of the content file deletion will be effected. Therefore, the operations will not further be described.

Figure 21:
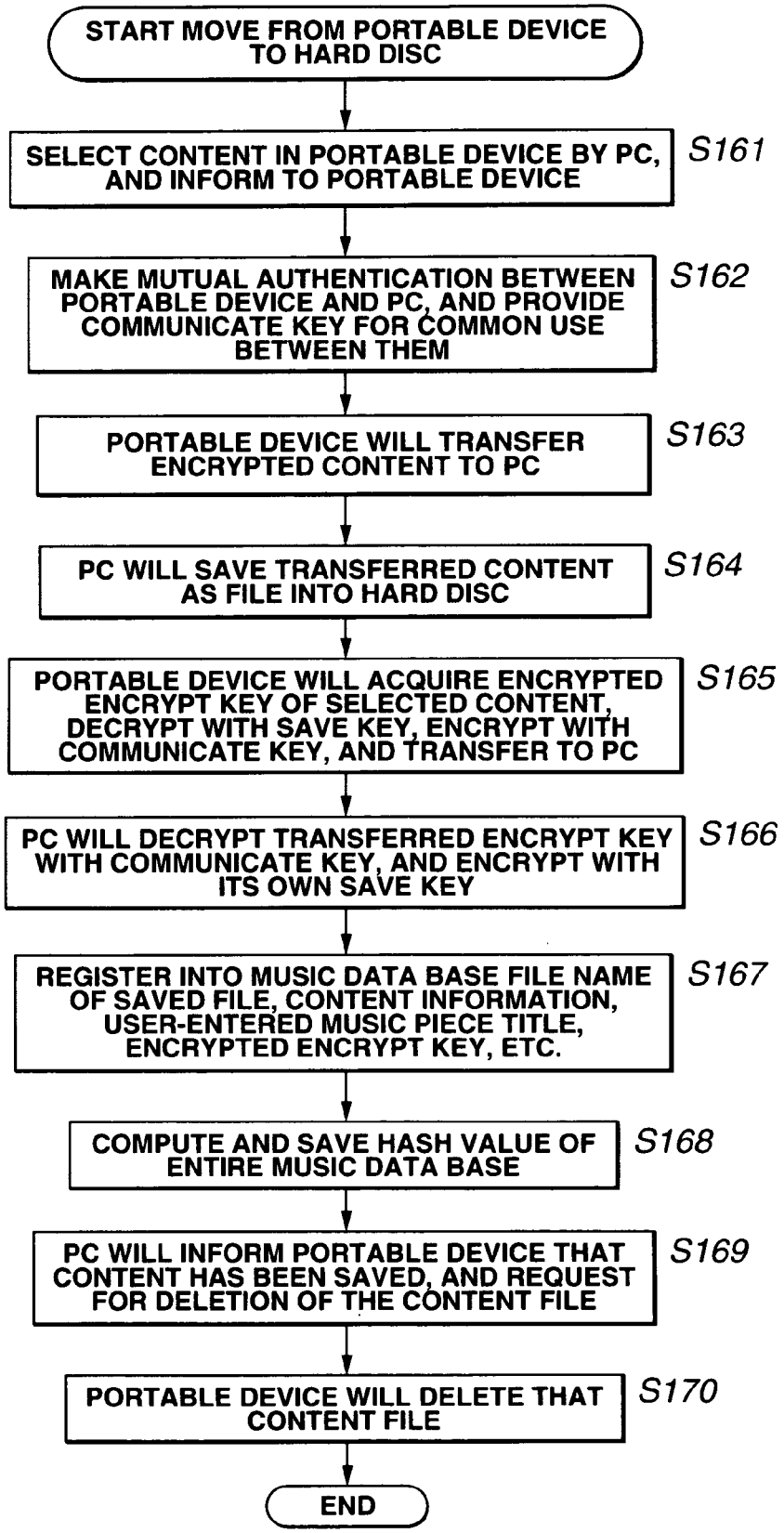
FIG. 21 is a flow chart of operations effected in copying a content from the portable device to HDD.

Note that when the flash memory 61 of the portable device 6 is removable as a memory card, the personal computer 1 will effect the mutual authentication at step S162 in FIG. 21 in the check-in procedure.

Figure 22:
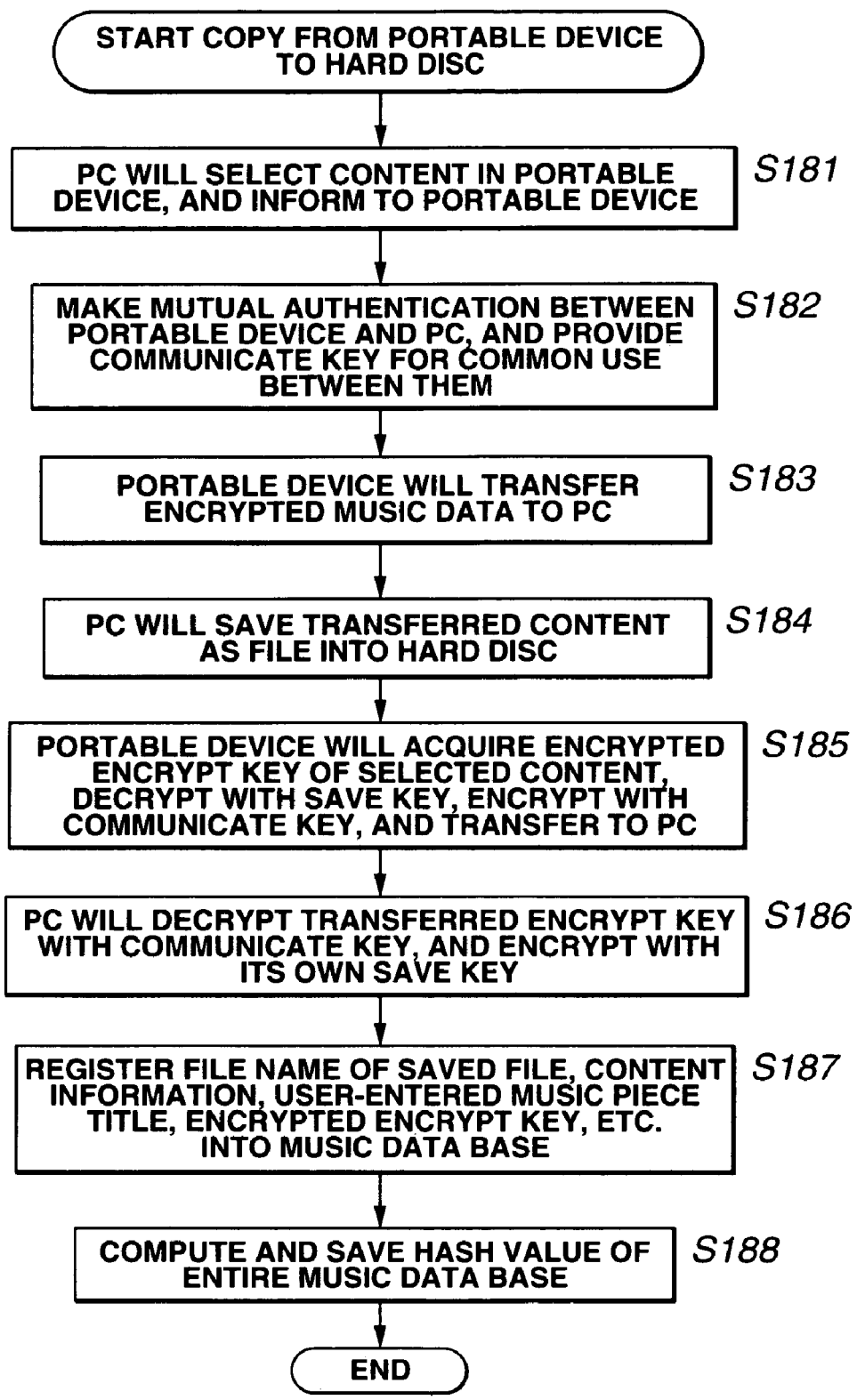
FIG. 22 is a flow chart of operations effected in copying a content from the portable device to HDD.

Next, content copy from the portable device 6 to the HDD 21, effected by the CPU 11 which executes the content management program 111 and CPU 53 which executes the main program, will be described herebelow with reference to the flow chart in FIG. 22. Operations at steps S181 to S188 in FIG. 22 are similar to those at steps S161 to S168 (in FIG. 21) in the content move from the portable device 6 to the HDD 21. That is, the copy is effected by the copy management program 133, and the copy operation is basically similar to the move operation except for the omission of the operations at steps S169 and S170 in FIG. 21. Therefore, the copy operation will not be described any further.

Figure 23:
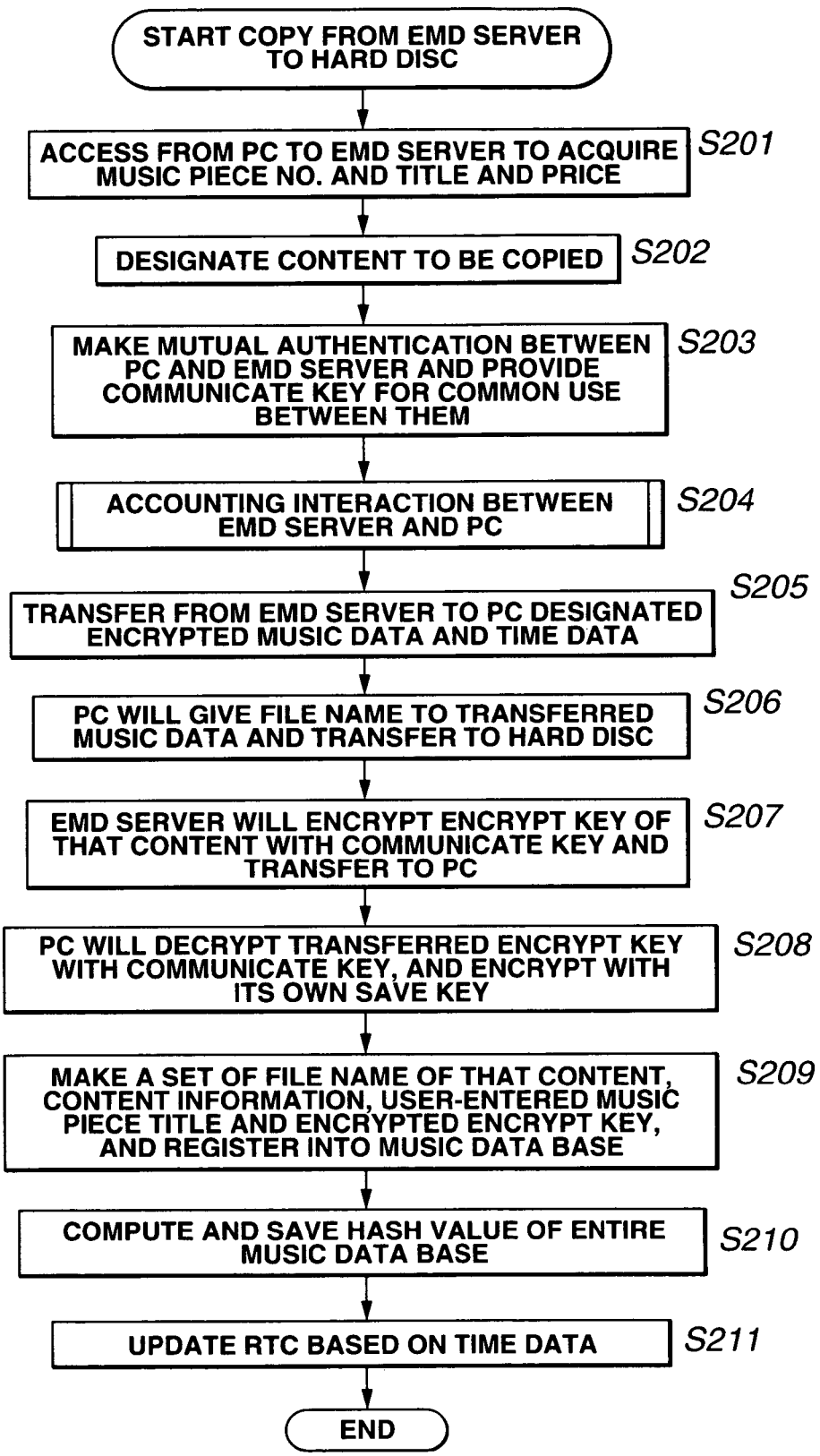
FIG. 23 is a flow chart of operations effected in copying a content from an EMD server to HDD.

Next, copy of the content transferred from the EMD server 4 to the HDD 21, effected by the EMD server 4 and CPU 11 which executes the content management program 111, will be described below with reference to the flow chart in FIG. 23. When the user clicks the button 202 in FIG. 5 to make an instruction for access to the EMD server 4, the purchase program 144 makes, at step S201, the communications block 25 access the EMD server 4 via the network 2. In response to the access, the EMD server 4 will transfer information such as music piece number, title, information of a content held therein to the personal computer 1 via the network 2. Upon acquisition of the information, the purchase program 144 makes the display/operation-instructive program 112 display the information on the display unit 20 via the interface 17. Using the GUI displayed on the display unit 20, the user will designate, at step S202, a content he wants to copy. The designated information is transferred to the EMD server 4 via the network 2. At step S203, the purchase program 144 will effect a mutual authentication between itself and EMD server 4 via the network 2 to generate a communication key for common use between them.

The mutual authentication effected between the personal computer 1 and EMD server 4 may be done using a public key and private key defined in ISO 9798-3 for example. In this case, the personal computer 1 has its own private key and a public key for the EMD server 4 in advance, and the EMD server 4 has its own private key. The mutual authentication between the personal computer 1 and EMD server 4 is effected using these keys. The public key of the personal computer 1 may be made available to the personal computer 1 by transferring it from the EMD server 4 or a certificate having previously been distributed to the personal computer 1 for confirmation of the certificate by the EMD server 4. Further, at step S204, the purchase program 114 will make an accounting operation between itself and EMD server 4. The accounting operation will further be described later with reference to the flow chart in FIG. 24.

Next at step S205, the EMD server 4 transfers the encrypted content designated at step S202 to the personal computer 1 via the network 2. At this time, it transfers a time information at any time to the personal computer 1. At step S206, the purchase program 144 will give a file name to the transferred content and make the content data base 114 save it as one content file 161 into the HDD 21. At step S207, the EMD server 4 will further encrypt the encryption key for the content using the communication key common to itself and personal computer 1, generated at step S203, and transfer the encrypted encryption key to the personal computer 1.

At step S208, the purchase program 144 makes the decryption program 142 to decrypt the encryption key transferred from the EMD server 4 using the communication key independently or in cooperation with the CPU 32 of the adaptor 26, and makes the encryption program 137 encrypt the decrypted encryption key with its own save key. At step S209, the purchase program 144 will make the content data base 114 register into the music data base in the HDD 21 a set of the file name of the content, content information, music piece title entered by the user, and encrypted encryption key. Further at step S210, the purchase program 144 makes the CPU 32 compute the hash value of the entire music data base, and save it into the nonvolatile memory 34.

Note that at step S205, the EMD server 4 will transmit the content along with the time data to the personal computer 1. The time data is transferred from the personal computer 1 to the adaptor 26. Upon reception of the time data transferred from the personal computer 1, the CPU 32 of the adaptor 26 corrects the time of the RTC 35 at step S211. Thus, based on the time information provided from an external device having been recognized as a correct device as the result of the mutual authentication, the time information of the RTC 35 of the adaptor 26 is corrected, so that the adaptor 26 can always keep correct time information.

Figure 24:
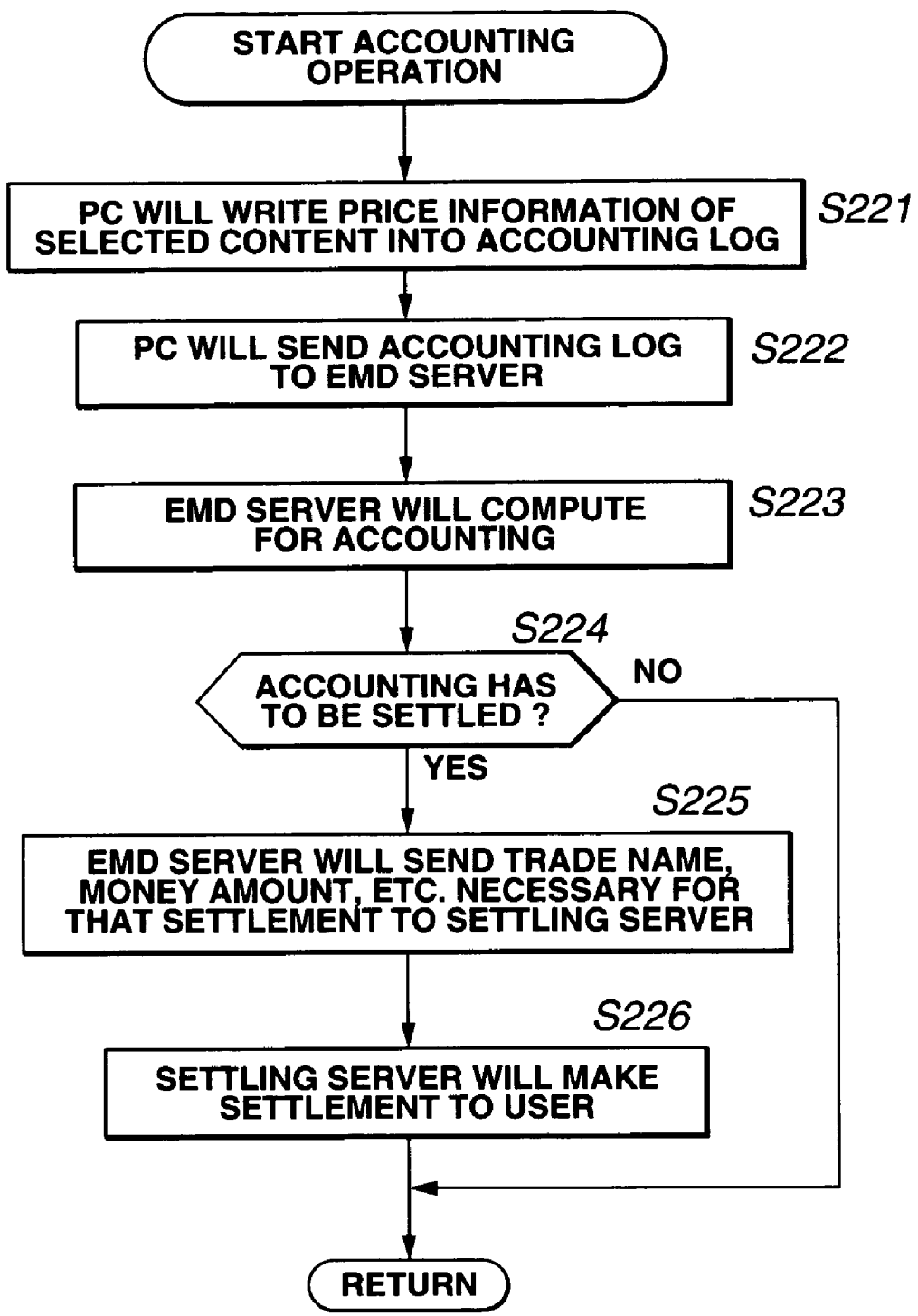
FIG. 24 is a flow chart of operations effected in accounting at step S204 in the flow chart shown in FIG. 23.

Next, accounting effected at step S204 in FIG. 23 by the EMD server 4 and CPU 11 which executes the content management program 111, will be described herebelow with reference to the flow chart in FIG. 24. At step S221, the purchase program 144 read price information for the selected content designated at step S202 from price information transmitted from the EMD server 4 at step S201, and write it into an accounting log in the HDD 21. FIG. 25 shows an example of such accounting log. In this example, the user has copied items 1 to 3 from the EMD server 4, and the price for the items 1 and 2 is 50 yens while that for the item 3 is 60 yens. The hash value of this accounting log has been computed by the CPU 32, and registered in the nonvolatile memory 34.

Next at step S222, the purchase program 144 will read the accounting log written at step S221 from the HDD 21, and transfers it to the EMD server 4 via the network 2. At step S223, the EMD server 4 makes an accounting computation based on the accounting log transferred from the personal computer 1. That is, the EMD server 4 adds to a data base provided therein an accounting log transmitted from the user of the personal computer 1 to update the data base. At step S224, the EMD server 4 judges whether the accounting log is to be settle immediately. When it is determined that the accounting log is to be settled immediately, the EMD server 4 goes to step S225 where it will transfer to a settling server (not shown) a trade name, money amount, etc. necessary for the settlement. Then at step S226, the settling server will effect a settlement to the user of the personal computer 1. If it is determined at step S224 that the accounting log is not to be settled immediately, operations at steps S225 and S226 will be skipped over. Namely, these operations will be done periodically, for example, once a month.

Figure 26:
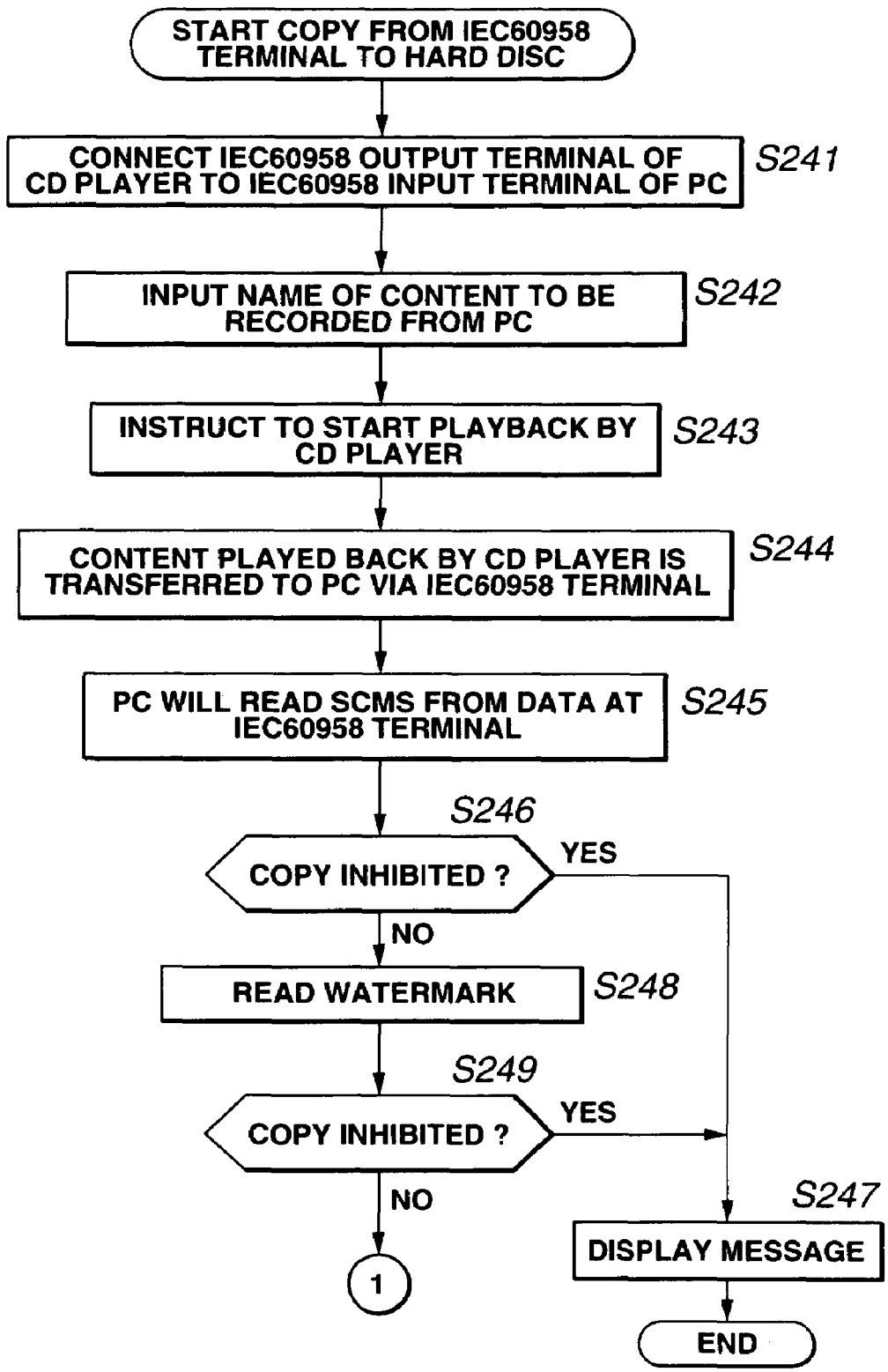
FIG. 26 is a flow chart of operations effected in copying a content to the HDD from an IEC60958 terminal of the personal computer.
Figure 27:
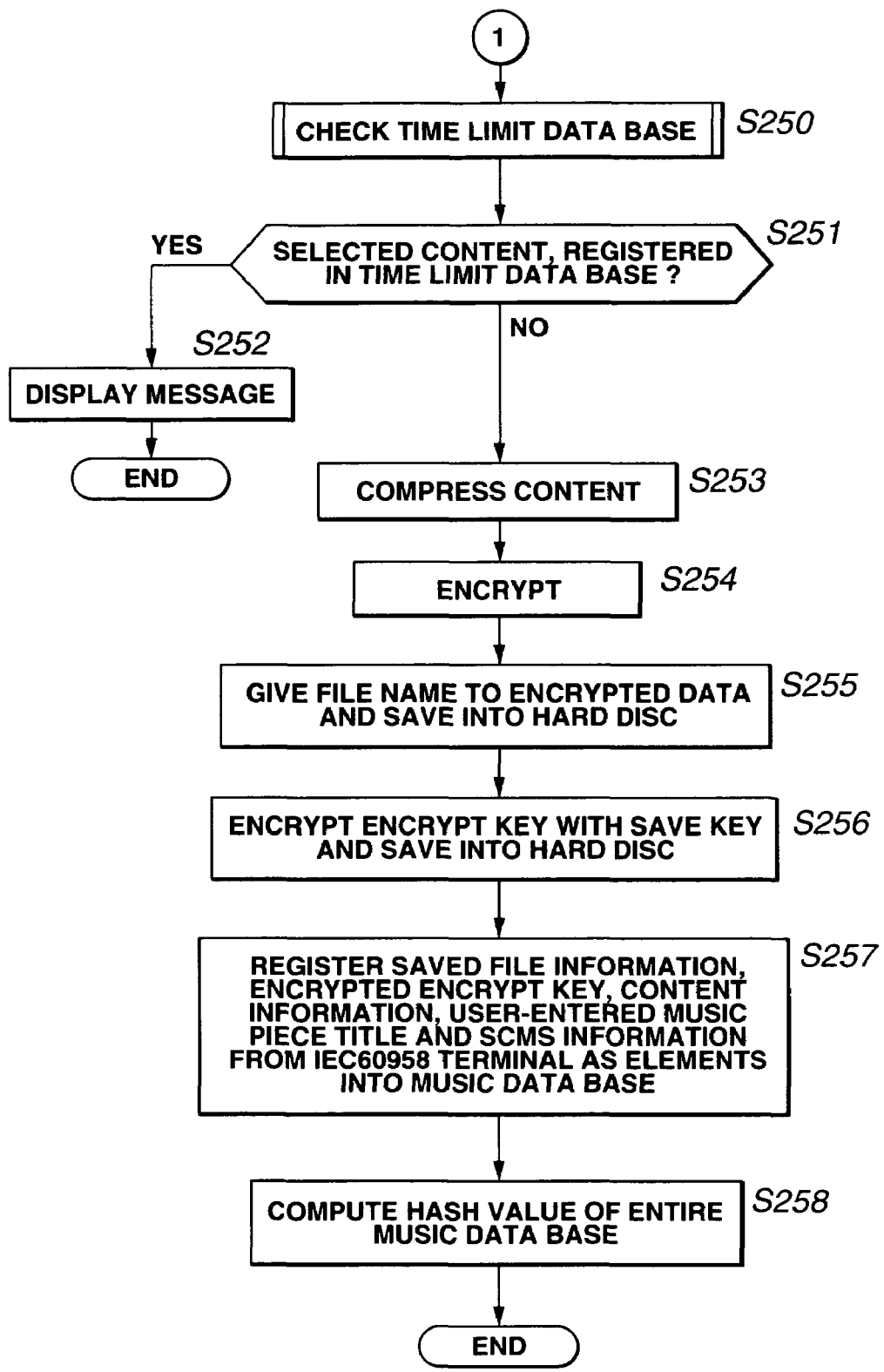
FIG. 27 is a flow chart of operations effected in copying a content to the HDD from an IEC60958 terminal of the personal computer.

Next, copying to the HDD 21 of a content having been played back by a CD player (not shown) and entered from the IEC60958 terminal 24a of the audio input/output terminal 24, effected by the CPU 11 which executes the content management program 111, will be described below with reference to the flow chart shown in FIGS. 26 and 27. At step S241, the user connect the IEC60958 output terminal of the CD player to the IEC60958 terminal 24a of the audio input/output interface 24 of the personal computer 1. At step S242, the user operates the keyboard 18 or mouse 19 to enter the music piece title of a content to be copied from the CD player (or a number for the content). Then at step S243, the user operate a button on the CD player to start playing the CD player. In case a control signal transmission/reception line is connected between the CD player and personal computer 1, the user may operate the keyboard 18 or mouse 19 of the personal computer 1 to enter a playback start instruction for making the CD player start playing the CD.

When the CD player starts playing the CD, a content read out of the CD is transferred, at step S244, to the personal computer 1 via the IEC60958 terminal 24a. At step S245, the copy management program 133 reads SCMS (serial copy management system) data from the data entered via the IEC60958 terminal 24a. The SCMS data includes copying condition information such as inhibition of copy, permission of one copy, permission of free copy, etc. At step S246, the CPU 11 judges whether the SCMS data indicates inhibition of copy. If the SCMS data indicates the copy inhibition, the copy management program 133 goes to step S247 where it will make the display/operation-instructive program 112 display a message like "Copy is inhibited" on the display unit 20, and terminate the copy operation. In this case, copy to the HDD 21 is inhibited.

At step S246, when it is determined by the CPU 11 that the SCMS information read at step S245 does not indicate any copy inhibition, the copy management program 133 will go to step S248 where it reads a watermark code, and at step S249, it will judge whether the watermark code indicates inhibition of copy. When the watermark code indicates the copy inhibition, the copy management program 133 goes to step S247 where it will make the display/operation-instructive program 112 display a predetermined message as in the above and terminate the copy operation.

If it is determined at step S249 that the watermark code does not indicate any copy inhibition, the copy management program 133 goes to step S250 where it will check the time limit data base. If the selected content is found already been registered as the result of the checking of the time limit data base, the operation is ended with operations at steps S251 and S252. These operations are similar to those at steps S13 and S14 shown in FIG. 7.

If the selected content is not a content having not yet been registered in the HDD 21, it will be registered at steps S253 to S258. The operations at steps S253 to S258 are similar to those at steps S19 to S24 in FIG. 7 except that the SCMS information supplied from the IEC60958 terminal 24a is also registered in the music data base at step S257. Therefore, the operations will not be described any further, Next, output (playback) of a content from the HDD 21 to the IEC60958 terminal 24a, effected by the CPU 11 which executes the content management program 111, will be described herebelow with reference to the flow chart shown in FIGS. 28 and 29. At steps S271 to S273, the hash value of the entire music data base is computed as at steps S111 to S113 in FIG. 18, and it is judged whether the hash value coincides with a one previously saved to check whether the music data base has been falsified or altered. If it is determined that the music data base has not been falsified, the display/operation-instructive program 112 goes to step S274 where it will make, via the content management program 111, the content data base 114 access the music data base in the HDD 21, read information on music pieces registered in the music data base, and display it on the display unit 20. Watching the display, the user operates the keyboard 18 or mouse 19 in an appropriate manner to select a content which the user wants to play back. At step S275, the display/operation-instructive program 112 checks the playback conditions for the selected content. The check of the playback conditions will further be described later with reference to the flow chart in FIG. 30.

Next at step S276, the display/operation-instructive program 112 makes, via the content management program 111, the content data base 114 read from the music data base an encryption key for the content selected at step S274, and the decryption program 142 decrypt the encryption key with the save key. At step S277, the display/operation-instructive program 112 makes, via the content management program 111, the content data base 114 reads from the music data base SCMS information of the selected content, and determines SCMS information to be outputted from the IEC60958 terminal 24a according to the rule for the SCMS system. For example, when the number of times a content can be played back is limited (namely, as a playback limit), the playback counter is incremented by one. The playback count thus incremented is taken as new SCMS information. At step S278, the display/operation-instructive program 112 will further make, via the content management program 111, the content data base 114 read ISRC for the selected content from the music data base.

Next at step S279, the display/operation-instructive program 112 will make, via the content management program 111, the content data base 114 read the file name form the selected content from the music data base, and then read the content from the HDD 21 based on the file name. Further the display/operation-instructive program 112 will further make, via the content management program 111, the content data base 114 read an encryption key for the content from the music data base, and the decryption program 142 decrypt the encryption key with the save key and then decrypt the encrypted content with the decrypted encryption key. The compression/expansion program 138 will further decrypt (expand) the compression code for the content. At step S280, the display/operation-instructive program 112 makes the driver 117 output, at the IEC60958 24a, the decrypted content (digital data) read at step S279 along with the SCMS information determined at step S277 and ISRC information read at step S278 according to the IEC60958 rule. Furthermore, the display/operation-instructive program 112 will put a program such as real player (trade mark; not shown) into run to convert the content being a digital data to an analog data and output it at the analog output terminal of the audio input/output interface 24.

At step S281, the display/operation-instructive program 112 will make, via the content management program 111, the content data base 114 increment the playback counter in the music data base by one. At step S282, it is judged whether the selected content has playback accounting conditions added thereto. If the selected content has the playback accounting conditions added thereto, the display/operation-instructive program 112 goes to step S283 where it will make, via the content management program 111, the content data base 114 write a corresponding fee into the accounting log. At step S284, the display/operation-instructive program 112 makes, via the usage rule management program 140, the CPU 32 compute the hash value of the entire music data base and store it into the nonvolatile memory 34. If it is determined at step S282 that the selected content has no playback accounting conditions added thereto, the display/operation-instructive program 112 will skip over operations at steps S283 and S284.

Figure 28:
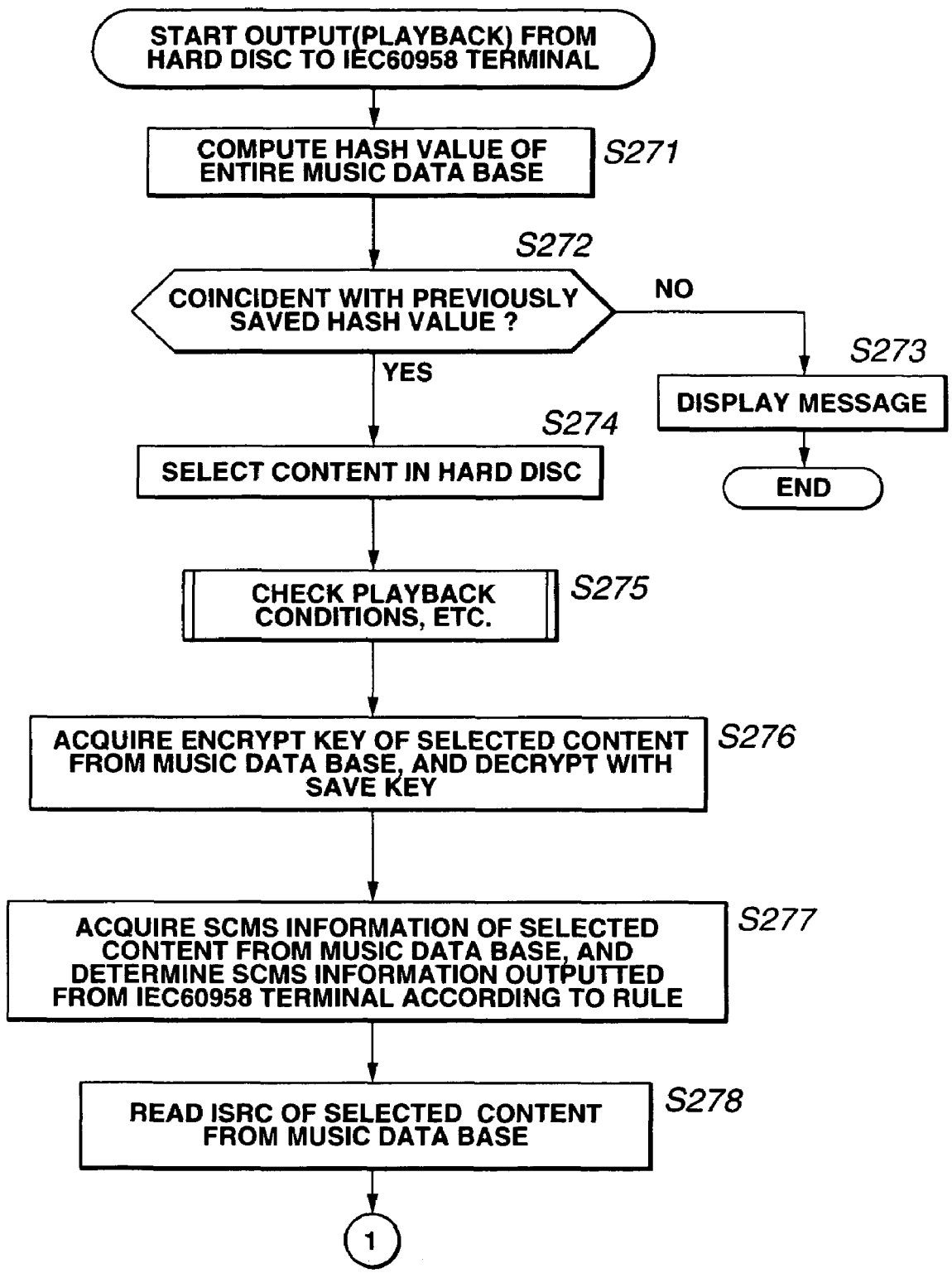
FIG. 28 is a flow chart of operations effected in outputting a content from the HDD to the IEC60958 terminal.
Figure 29:
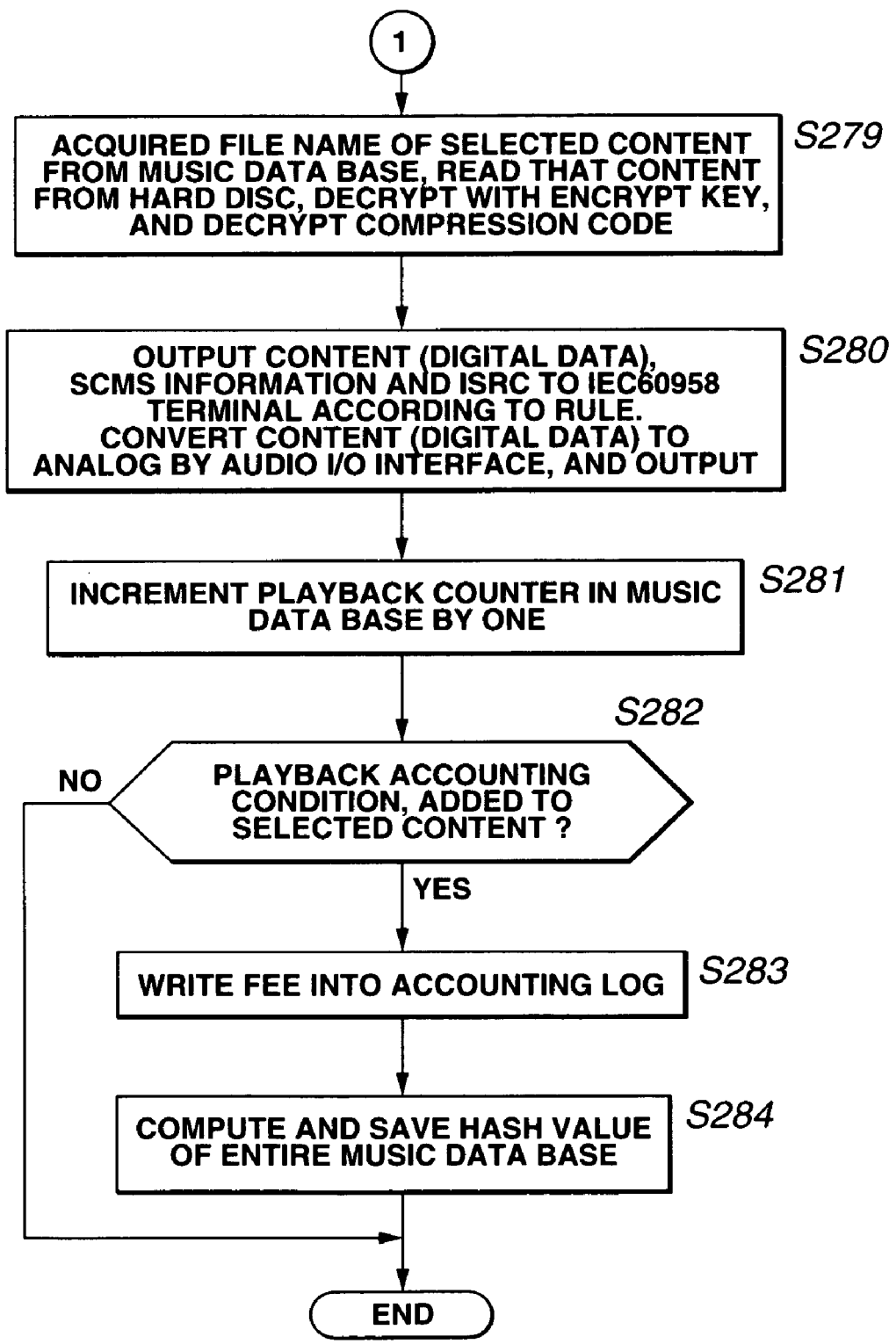
FIG. 29 is a flow chart of operations effected in outputting a content from the HDD to the IEC60958 terminal.
Figure 30:
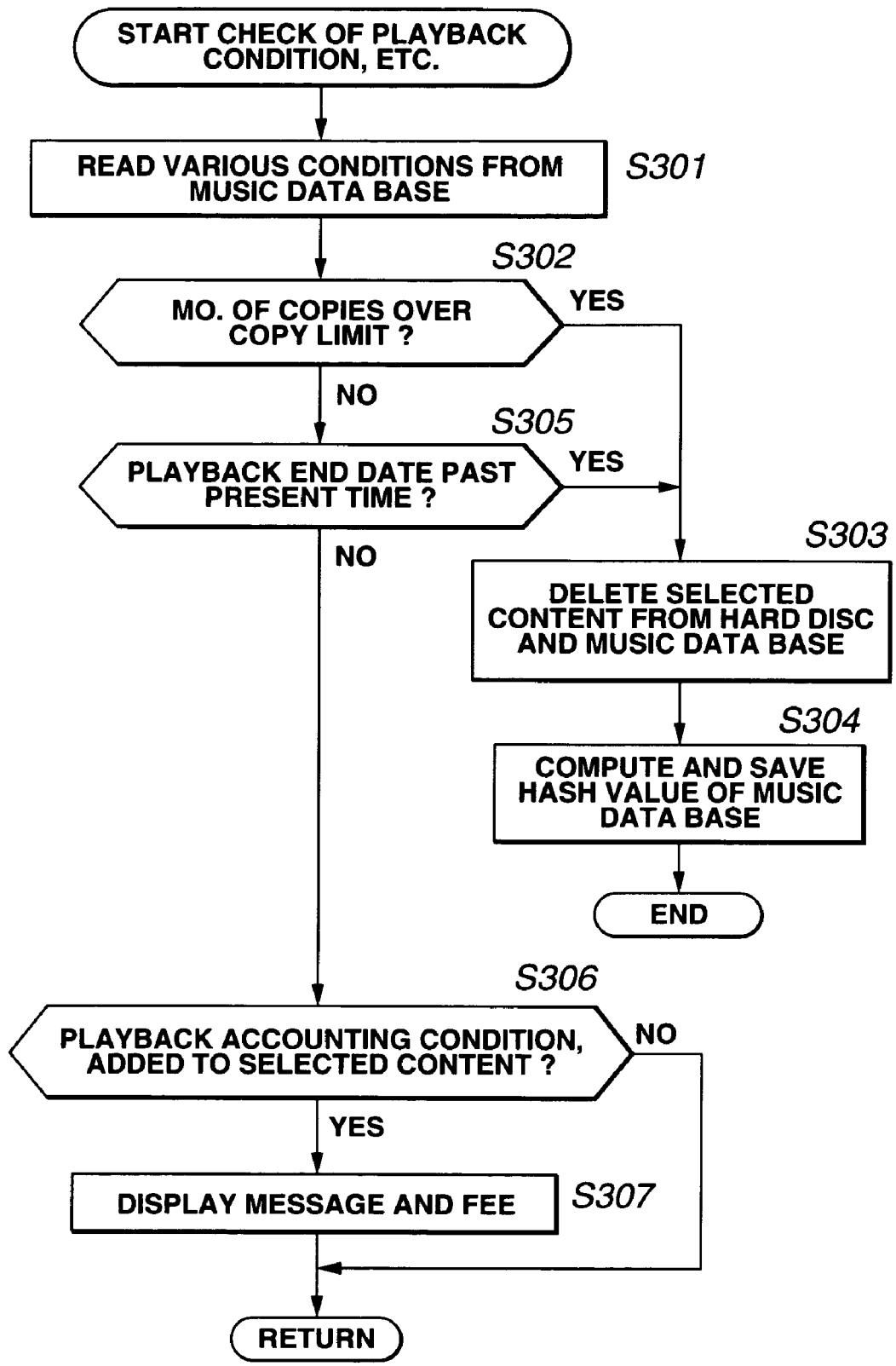
FIG. 30 is a flow chart of operations in checking playback conditions at step S275 in the flow chart shown in FIG. 28.

Next, checking of playback conditions at step S275 in FIG. 28, effected by the CPU 11 which executes the content management program 111, will be described below in detail with reference to the flow chart shown in FIG. 30. At step S301, the display/operation-instructive program 112 will make, via the content management program 111, the content data base 114 read various conditions in the music data base. At step S302, the usage rule management program 140 judges whether the playback count in the conditions read from the music data base is over the playback limit. If the playback count is over the playback limit, the usage rule management program 140 goes to step S303 where it will make, via the content management program 111, the content data base 114 delete the selected content from the HDD 21 and the information on the selected content from the music data base. At step S304, the display/operation-instructive program 112 will further make, via the usage rule management program 140, the CPU 32 compute a new hash value of the music data base and save it into the nonvolatile memory 34. In this case, the playback (output) is inhibited.

If it is determined at step S302 that the playback count is not over the playback limit, the usage rule management program 140 goes to step S305 where it will judge whether the playback end date is past the present date. If the playback end date is past the present date, the display/operation-instructive program 112 will make, at step S303, the usage rule management program 140 delete the selected date from the HDD 21 and also from the music data base as in the above. At step S304, a new hash value of the music data base is computed and saved. Also in this case, the playback (output) is inhibited.

If it is determined at step S305 that the playback end date is not past the present date, the CPU 32 goes to step S306 where it will judge whether the selected content has the playback accounting conditions added thereto. If the selected content has the playback accounting conditions added thereto, the display/operation-instructive program 112 goes to step S307 where it will make the display unit 20 display a message of the addition of the playback accounting conditions and a fee. If it is determined at step S306 that the selected content has no playback accounting conditions added thereto, operation at step S307 will be skipped over.

Figure 31:
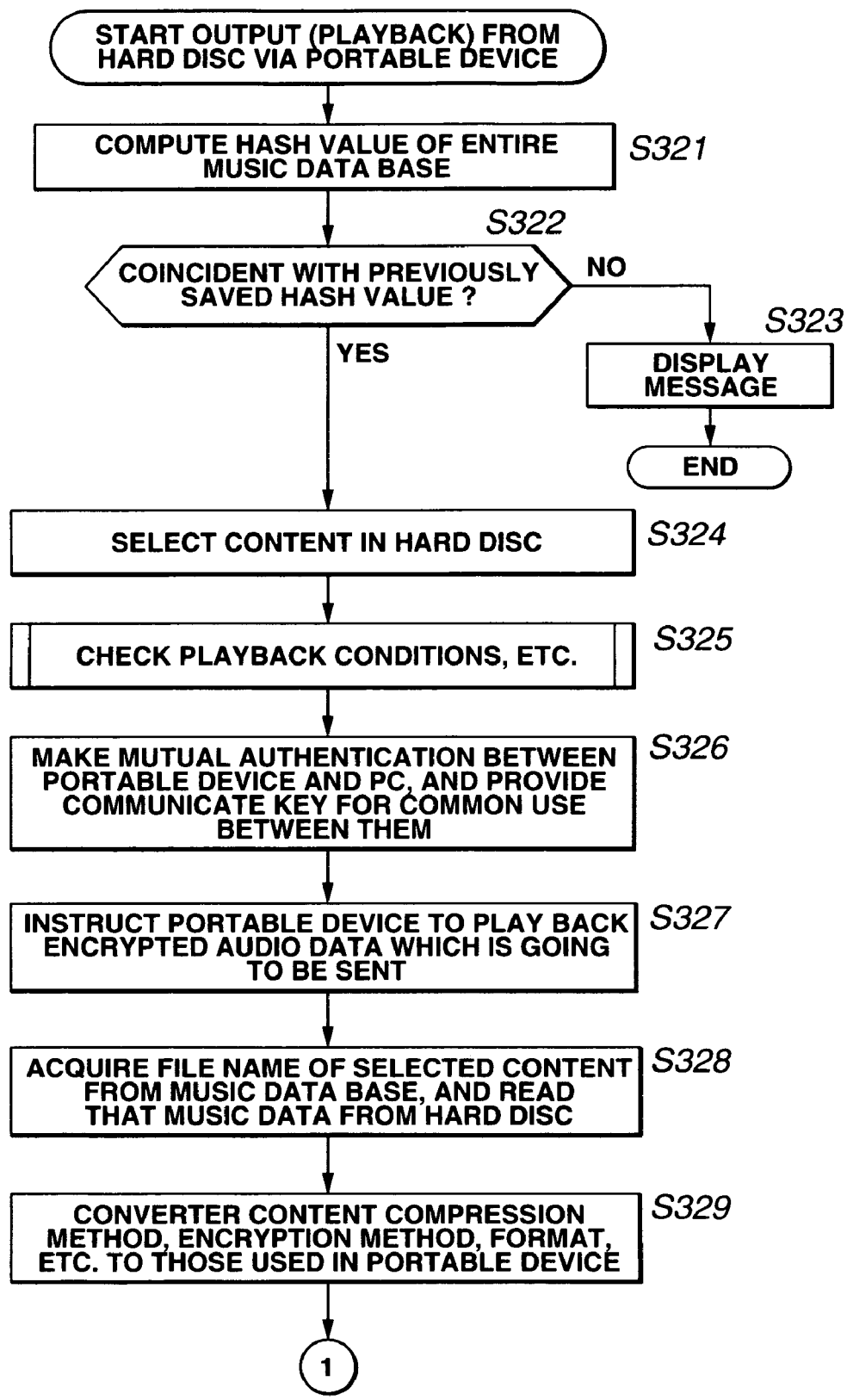
FIG. 31 is a flow chart of operations effected in outputting a content from the HDD via the portable device.
Figure 32:
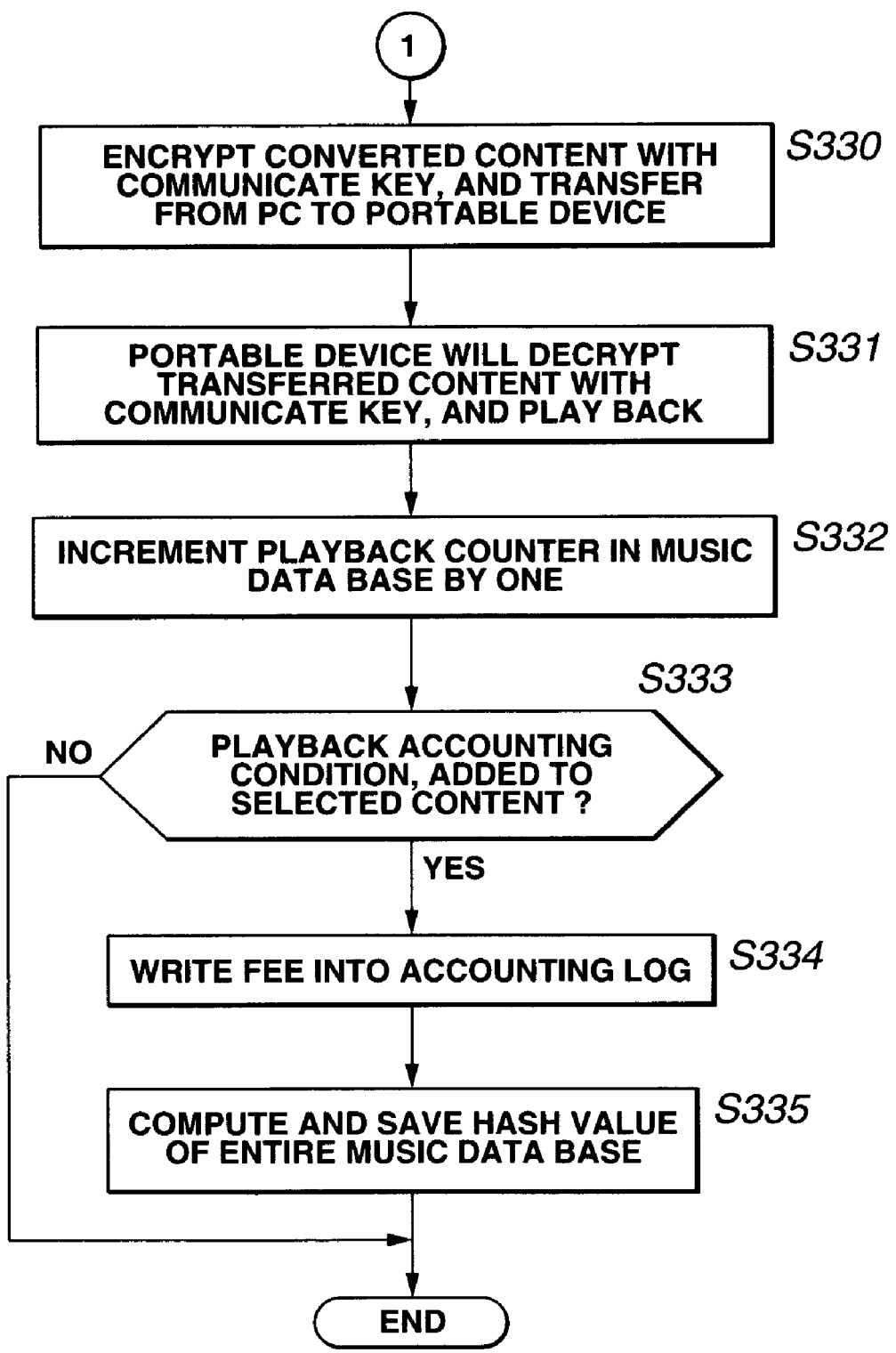
FIG. 32 is a flow chart of operations effected in outputting a content from the HDD via the portable device.

Next, playback (output) of a content from the HDD 21 via the portable device 6, effected by the CPU 11 which executes the content management program 111 and CPU 53 which executes the main program, will be described below with reference to the flow chart shown in FIGS. 31 and 32. At steps S321 to S325, the music data base is checked for any falsification or alteration, the selected content is designated, and playback conditions for the selected content are checked. These operations are similar to those at steps S271 to S275 in FIG. 28, and so will not be described any longer.

At step S326, a mutual authentication is effected between the portable device 6 and personal computer 1 to generate a communication key for common use between them. At step S327, the display/operation-instructive program 112 instructs the portable device 6 to play back an encrypted content which is going to be supplied. At step S328, the display/operation-instructive program 112 will make, via the content management program 111, the content data base 114 read S324 from the music data base the designated file name of the content selected at step, and the content having the file name from the HDD 21. At step S329, the display/operation-instructive program 112 will make the content management program 111 convert the content compression method, encryption method and format to those used in the portable device 6. Further at step S330, the display/operation-instructive program 112 makes the encryption program 137 encrypt the content converted at step S329 with the communication key, and transfer it to the portable device 6.

At step S331, the CPU 53 of the portable device 6 responds to an instruction transferred from the personal computer 1 at step S327 to decrypt each transferred data with the communication key and play it back. At step S332, the display/operation-instructive program 112 will make, via the content data base 114, the content management program 111 increment the playback counter in the music data base by one. Further at step S333, the display/operation-instructive program 112 will judge whether the selected content has playback accounting conditions added thereto. If the selected content has the playback accounting conditions added thereto, the display/operation-instructive program 112 makes, via the content management program 111 at step S334, the content data base 114 write a fee for the playback into an accounting log. At step S335, the display/operation-instructive program 112 will make the CPU 32 compute and save a new hash value of the entire music data. If the selected content has no such playback conditions added thereto, operations at steps S334 and S335 will be skipped over.

The present invention provides various arrangements for prevention of a content from fraudulently being copied. For example, the program to operate the CPU 11 is a so-called tamper-resistant software of which the executing sequence varies at each operation of the CPU 11.

Further, the function of the CPU 11 is partially shared by the adaptor 26 as a hardware so that both the CPU 11 and adaptor 26 work together to execute a variety of operations. Thus, a higher date security is ensured.

For example, the hash value of the music data base is not saved in the music data base itself as in the above, but in the nonvolatile memory 34 of the adaptor 26. Namely, in the comparison with the hash value previously saved as at steps S32 and S33 in FIG. 8 for example, the previous hash value for comparison is stored in the nonvolatile memory 34. Thereby, all the records including a content saved in the HDD 21 can be backed up before they are copied or moved to any other recording medium. After a content saved in the HDD 21 is copied or moved from the HDD 21 to any other recording medium, a content included in the records backed up in the HDD 21 can be restored again, whereby it is made possible to prevent the content from being copied or moved substantially limitlessly disregarding the usage rule.

Figure 33:
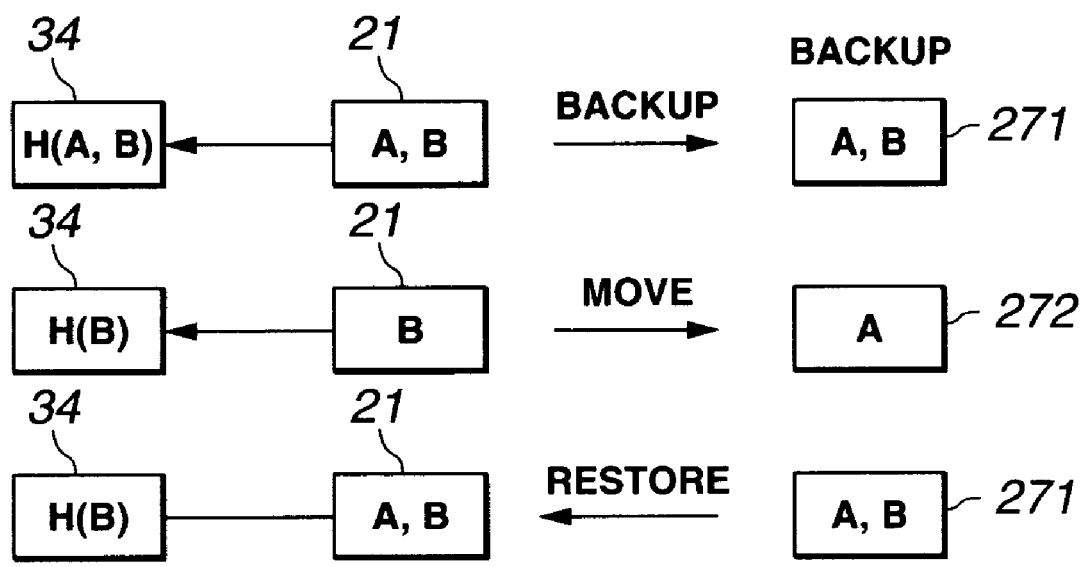
FIG. 33 explains the function of a nonvolatile memory.

For example, when contents A and B are saved in the HDD 21 as shown in FIG. 33, hash values for the contents A and B are saved in the nonvolatile memory 34. It is assumed here that in this condition, a part or all of recorded data including the contents A and B in the HDD 21 are backed up in other recording medium 271. When the content A in the HDD 21 is moved to a further recording medium 272 after that, only the content B will remain in the content recorded in the HDD 21, so that the hash value in the nonvolatile memory 34 is also changed to a one for the content B.

When a part or all of the recorded data in the HDD 21, backed up in the recording medium 271, is restored in the HDD 21 thereafter and the contents A and B are saved again into the HDD 21, a hash value computed from information of the content B will be found stored in the nonvolatile memory 34 while the hash value computed from the information of the contents A and B will not be found stored in the C) nonvolatile memory 34. Thus, the hash value computed based on the contents A and B stored on the HDD 21 will not coincident with the previous hash value stored in the nonvolatile memory 34, and it will be detected that the music data base has been falsified. As a result, the usage of the contents A and B saved in the HDD 21 will be limited thereafter.

Further, as having been described in the above, the adaptor 26 incorporates the RTC 35. The RTC 35 has the time information corrected based on a time data transferred from any other device (e.g., EMD server 4) which could correctly be authenticated. A present date outputted from the RTC 35, not any one managed by the personal computer 1, is used. Therefore, the user will not be able to intentionally edit the present data in the personal computer 1 to any past time for avoiding that the present time is judged to be past the playback end date included in the playback conditions.

Figure 34:
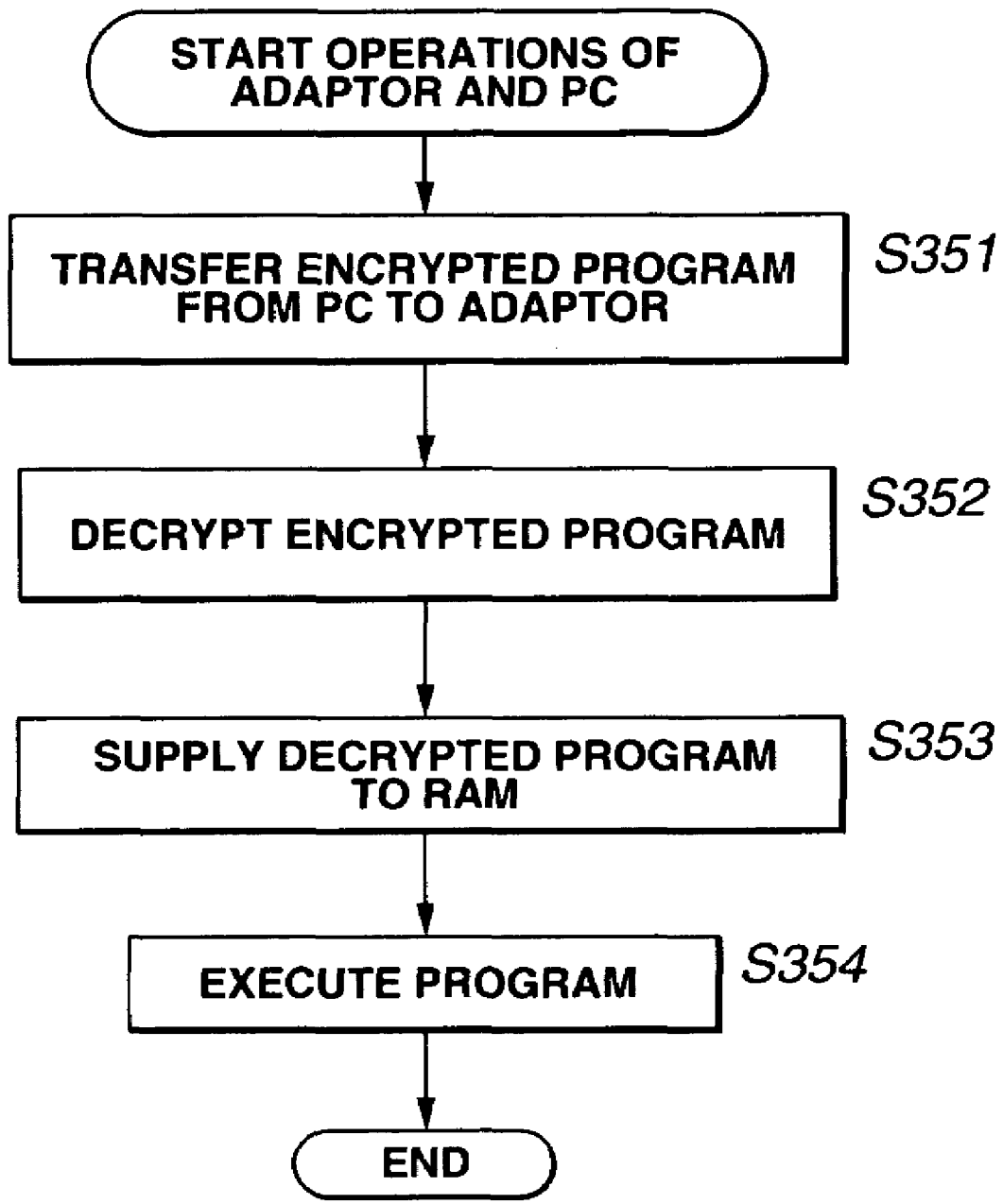
FIG. 34 is a flow chart of operations of the adaptor.

Also the adaptor 26 is designed to decrypt a transferred encrypted program according to a program previously stored in the ROM 36 and execute the program, so that a higher data security can be assured. This will further be described below with reference to the flow chart shown in FIG. 34.

More specifically, when the personal computer 1 is going to execute a predetermined operation for the adaptor 26, it will encrypt, at step S351, a program to be executed by the adaptor 26 with an encryption key previously stored in the RAM 13, and transfer it to the adaptor 26. The RAM 13 of the adaptor 26 has previously stored therein a program transferred from the personal computer 1 and intended to decrypt and execute the encrypted program. The CPU 32 follows this program stored in the RAM 36 to decrypt at step S352 the encrypted program stored in the RAM 36. The CPU 32 will develop the decrypted program to the RAM 33 at step S313, and execute it at step S354.

As having been described in the foregoing, when the adaptor 26 is made to compute a hash value of the music data base in the HDD 21 for example, the CPU 11 of the personal computer 1 will encrypt the data in the music data base with the encryption key and transfer it to the CPU 32 of the adaptor 26. The CPU 32 will apply the hash function to the transferred data in the music data base to compute a hash value. The hash value thus computed is stored into the nonvolatile memory 34. Alternatively, the CPU 32 compares the hash value with a previous one having been stored in advance, and transfer the result of computation to the CPU 11 of the personal computer 1.

Figure 35:
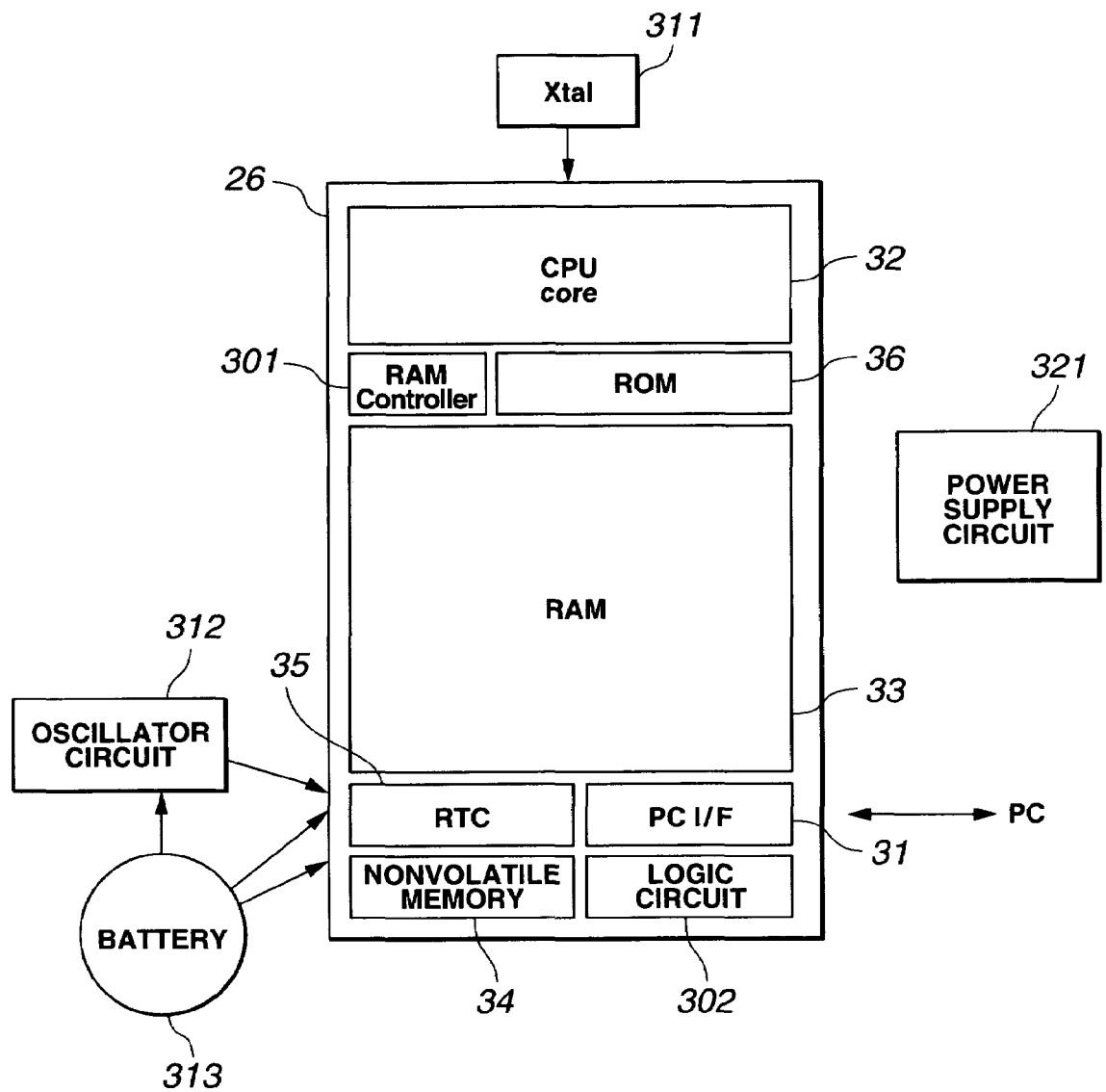
FIG. 35 shows the internal construction of the adaptor.

FIG. 35 shows in detail the internal construction of the adaptor 26. The adaptor 26 is formed as a semiconductor IC. As shown in FIG. 35, the adaptor 26 includes, in addition to the interface 31, CPU 32, RAM 33, nonvolatile memory 34, RTC 35, ROM 36 as shown in FIG. 2, a RAM controller 301 to control write and read to and from the RAM 33, and a logic circuit 302 provided for use to output directly from the adaptor 26 an encrypted content having been decrypted as in the above.

The blocks from the interface 31 to ROM 36, RAM controller 301 and logic circuit 302 are integrally built in the semiconductor IC in such a manner that they cannot be disassembled from outside.

Further, a crystal oscillator 311 is provided to generate a clock for a reference in execution of various operations by the adaptor 6. Also an oscillator circuit 312 is provided to put the RTC 35 into operation. The adaptor 26 further includes a battery 313 which supplies backup power to the oscillator circuit 312, nonvolatile memory 34 and RTC 35. In addition, the component circuits of the adaptor 26 are supplied with a power from a power supply circuit 321 of the personal computer 1.

Figure 36A:
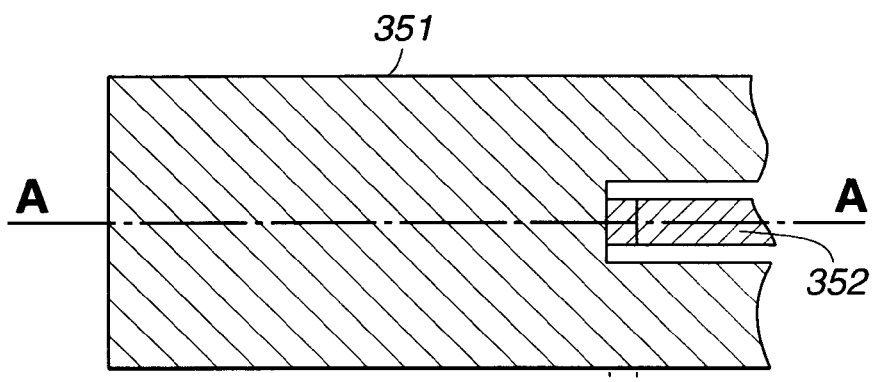
FIGS. 36A and 36B show examples, respectively, of the internal construction of the nonvolatile memory.
Figure 36B:
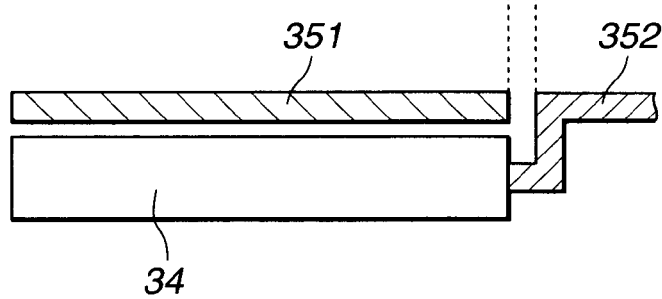

The nonvolatile memory 34 may be composed of an erasable ROM. In case it is composed of a RAM backed up by the backup power from the battery 313, however, a protective aluminum layer 351 may be formed on the nonvolatile memory 34 and a power source pattern 352 to supply the nonvolatile memory 34 with the power from the battery 313 be formed flush with the protective aluminum layer 351, as shown in FIGS. 36A and 36B for example. Thus, if the user tries to remove the protective aluminum layer 351 in order to alter the nonvolatile memory 34, the power source pattern 352 flush with the nonvolatile memory 34 will also be removed, power supply to the nonvolatile memory 34 will be shut off, and data stored in the memory 34 will be erased. In this way, the tamper-resistance can further be improved.

Figure 37:
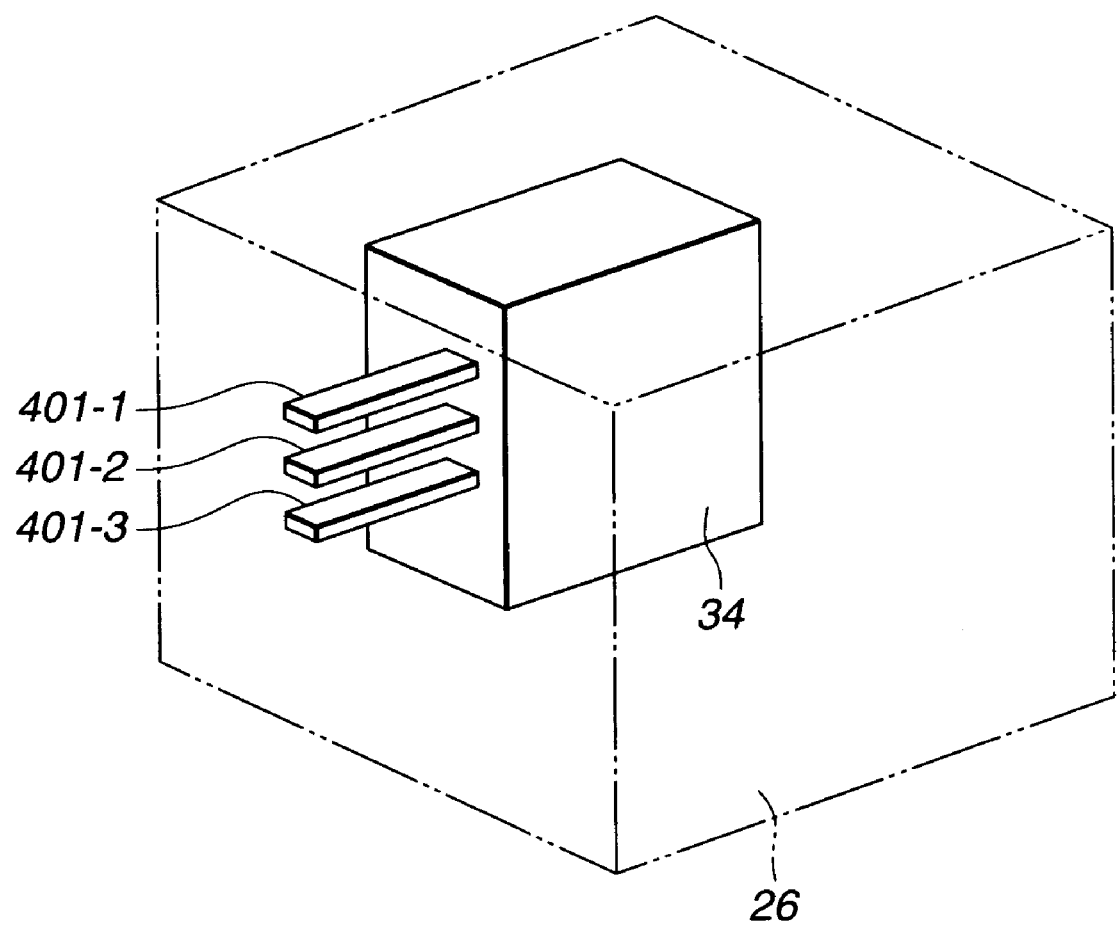
FIG. 37 shows an example of the internal construction of the nonvolatile memory.

Further, the adaptor 26 has wires 401-1 to 401-3 provided to write or read date to or from the nonvolatile memory 34. The wires 401-1 to 401-3 are formed to vertically overlap each other as shown in FIG. 37. Thus, for reading data from the lowest wire 401-3, the wires 401-1 and 401-2 above the wire 401-3 have to be removed. Thus, data cannot be read simultaneously from the wires 401-1 to 401-3.

Also, the wires 401-1 to 401-3 of the nonvolatile memory 34 may be formed redundantly. For example, when the wires 401-1 to 401-3 formed inside the nonvolatile memory 34 are used to connect elements such as transistors forming the nonvolatile memory 34, paths for them are formed not linearly even if the elements can be connected linearly by wires but they are formed to have a predetermined length. Thus, the wires 401-1 to 401-3 will be longer than required and have a larger parasitic capacitance than that which would be when the wires are a minimum necessary length.

The dedicated circuit (incorporated in the adaptor 26 being a semiconductor IC) designed for data read from the nonvolatile memory 34 can normally read data stored in the nonvolatile memory 34 when an impedance matching its parasitic capacitance is set. However, when a probe is connected to the wires 401-1 to 401-3 in order to read data from the nonvolatile memory 34, the combination of the parasitic capacitance and probe capacitance will result in an influence due to which data cannot normally be read from the nonvolatile memory 34.

In the foregoing, the portable device 6 has been used to explain the recording medium, but it should be noted that the present invention is applicable in data move or copy to any other recording medium.

The content may be image and other data in addition to the musical sound data such as music or audio data.

As having been described in the foregoing, the present invention is advantageous as will be described below:

(1) According to the present invention, data is encrypted for recording into the HDD 21 and the encryption key is encrypted with the save key for recording into the HDD 21. Thus, even if a content recorded in the HDD 21 is copied, it cannot be decrypted so that it cannot be copied in large volume for distribution.

(2) According to the present invention, when a predetermined music piece is copied once, its title and recording date are registered in the music data base in order to prevent the music piece from being copied for a predetermined period of time (48 hours in the aforementioned example). Thus, the number of times the music piece can be copied can be limited to prevent the music piece from being copied in a large volume for distribution.

Further according to the present invention, each time the data base is updated, the hash data of the data is computed and saved. Thus, it is easy to prevent the data base from being falsified or altered.

(3) According to the present invention, once a content is passed to an external device, a corresponding one in the HDD 21 is erased. Thus, the content being an original digital data will not remain n the HDD 21 and it cannot be copied in a large amount for distribution.

(4) According to the present invention, the music data base is provided in the HDD 21 to check the hash value of the entire music data vase at each time. Thus, even if a content in the HDD 21 is backed up before being moved and the backed-up data is restored into the HDD 21 just after the content is moved, it is possible to positively erase the data in the content source.

(5) According to the present invention, before data is passed from the personal computer 1 to an external device, a mutual authentication is done between the personal computer 1 and external device. Thus, the data can be prevented from being passed to any wrong device.

(6) According to the present invention, before data is passed from any external device to the personal computer 1, it is confirmed by a mutual authentication between the external device and personal computer 1 whether the software of the personal computer 1 is a legal one. Thus, it is possible to prevent a content from being passed to any wrong software.

(7) According to the present invention, ISRC is used to identify a music piece, and if no ISRC is available, TOC is used. Thus, even when no ISRC is available for a music piece, it is possible to identify the music piece.

(8) According to the present invention, a predetermined part of the software function of the personal computer 1 is performed by the adaptor 26 provided as an external device connected to the personal computer 1. Thus, just with analysis of the software of the personal computer 1, it is not possible to know how the software as a whole works. Therefore, it is impossible to add any intended function to the software by falsifying or altering.

Note that the operations which are to be conducted by the adaptor 26 may be done by the CPU 11 according to a security program. In this case, save keys having the same value are generated by the content management program 111 when a save key becomes necessary, for example. Similarly, the hash value is concealed for saving by the content management program 111.

Also, when an operation which is to be conducted by the adaptor 26 is done by the CPU 11 according to the security program, the personal computer 1 downloads a present time data from a predetermined server (e.g., EMD registration server 3) connected to the network 2 instead of a present time supplied from the RTC 35 of the adaptor 26, and effects a judgement based on the present time data. Also, the personal computer 1 may be designed, for this purpose, to store present times at predetermined time intervals and display an error when a time before a stored present time is set, thereby accepting any intentional time setting.

The aforementioned series of operations may be conducted by the hardware and also by the software. In the latter case, a program forming the software will be installed from a program storage medium into a computer incorporated in a dedicated hardware or a general-purpose personal computer, for example, in which a variety of functions can be performed according to various programs installed therein.

As shown in FIG. 2, the program storage medium which stores a program installed in a computer and made executable by the computer includes the magnetic disc 41 (including a floppy disc), optical disc 42 (CD-ROM (=compact disc-read-only memory)), DVD (digital versatile disc), magneto-optical disc 43 (MD (=mini-disc)), package medium formed from the semiconductor memory 44, ROM 12 in which the program is stored provisionally or permanently, or HDD 21. The program is stored into the program storage medium via the interface such as the communications block 25 as necessary by using the network 2 such as a local area network (LAN) or Internet, cable or radio communications media such as digital satellite broadcasting.

Note that the operations of writing a program for storage into the program storage medium, referred to herein, include those which are done time-serially along a described sequence and those which are not effected time-serially but in parallel or individually.

Also note that the "system" referred to herein means an assembly of a plurality of devices.

As having been described in the foregoing, the semiconductor IC according to the present invention integrally includes means for interfacing with the information processor, means for holding a program which processes a program transferred from the information processor, means for developing the program processed according to the program held in the program holding means, means for executing the program developed by the program developing means, and a nonvolatile storage means for storing data resulted from the program execution by the program executing means and which is to be used by the information processor. Thus, it is possible to more positively prevent data from fraudulently being read.

Also, according to the present invention, the semiconductor IC, information processing method and program storage medium are adapted to decrypt and execute the encrypted first program transferred from the information processor according to the second program, and transfer the result of the program execution to the information processor. Thus, it is possible to more positively prevent data from fraudulently being read.

Also, according to the present invention, the semiconductor IC, information processing method and program storage medium are adapted to correct the present time based on the time information from the information processor. Thus, it is possible to more positively prevent data from fraudulently being read.

Also according to the present invention, the information processor, information processing method and program storage medium are adapted to correct the time information of the semiconductor IC based on the time information received from other device. Thus, it is possible to more positively prevent data from fraudulently being read.

Also according to the present invention, the means for supplying the backup power to the data storing means, provided in the semiconductor IC, is formed in the nearly same plane as the protecting means. Therefore, if the protecting means is removed to expose the storing means, the backup power supplying means will also be removed. The backup power supply to the storing means will thus be shut off so that the data stored in the storing means will be erased. As a result, the data stored in the storing means can positively be protected.

Also according to the present invention, the semiconductor IC has the plurality of transferring means laminated at overlapping positions in the direction of depth. Thus it is difficult to discompose the semiconductor IC for fraudulent reading of the data stored in the storing means. Therefore, it is possible to more positively prevent the fraudulent data reading.

The invention claimed is:

1. A semiconductor IC in an information processing apparatus, comprising:
   means for receiving an encrypted program and a present date transferred from the information processing apparatus;
   means for holding a second program which processes the encrypted program received by the means for receiving;
   means for decrypting and executing the encrypted program based on the second program held in the means for holding;
   means for transferring an execution result of the second program to the information processing apparatus;
   means for time-keeping to determine a date internal to the semiconductor IC, said date being editable by a user of the semiconductor IC; and
   means for replacing the date determined by the means for time-keeping with the present date received from the information processing apparatus, wherein the present date received from the information processing apparatus is correctly authenticated as being accurate and cannot be edited by the user of the semiconductor IC, wherein the received program is executed, if the execution result of the second program provides a success result, in accordance with the present date which replaced the date determined by the means for time-keeping.

2. The semiconductor IC according to claim 1, further comprising a nonvolatile storage means for storing data used by the information processing apparatus.

3. An information processing method for a semiconductor IC for use in an information processing apparatus, comprising steps of:
- receiving a first program and a present date transferred from the information processing apparatus;
- holding a second program which processes the first program received at the program receiving step;
- executing the first program based on the second program held in the program holding step;
- transferring an execution result to the information processing apparatus made at the program executing step;
- time-keeping to determine a date internal to the semiconductor IC, said date being editable by a user of the semiconductor IC;
- replacing the date determined by the time-keeping with the present date received from the information processing apparatus, wherein the present date received from the information processing apparatus is correctly authenticated as being accurate and cannot be edited by the user of the semiconductor IC; and
- executing the received program, if the execution result of the second program provides a success result, in accordance with the present date which replaced the date determined by the time-keeping.

4. A program storage medium having recorded therein a computer-readable information processing program for a semiconductor IC for use in an information processor, the program comprising steps of:
- receiving a first program and a present date transferred from the information processing apparatus;
- holding a second program which processes the first program received at the program receiving step;
- executing the first program based on the second program held in the program holding step;
- transferring an execution result to the information processing apparatus made at the program executing step;
- time-keeping to determine a date internal to the semiconductor IC, said date being editable by a user of the semiconductor IC;
- replacing the date determined by the time-keeping with the present date received from the information processing apparatus, wherein the present date received from the information processing apparatus is correctly authenticated as being accurate and cannot be edited by the user of the semiconductor IC; and
- executing the received program, if the execution result of the second program provides a success result, in accordance with the present date which replaced the date determined by the time-keeping.

5. A semiconductor IC for an information processing apparatus comprising:
- an interface configured to receive an encrypted program and a present date transferred from the information processing apparatus;
- a CPU configured to decrypt and then execute the encrypted program and transfer a result of the program execution by the CPU to the information processing apparatus via the interface; and
- a clock circuit configured to determine a date internal to the semiconductor IC, said data being editable by a user of the semiconductor IC,
- wherein the CPU is configured to replace the date determined by the clock circuit with the present date received from the information processing apparatus, wherein the present date received from the information processing apparatus is correctly authenticated as being accurate and cannot be edited by the user of the semiconductor IC,
- wherein the received program is executed, if the execution result of the second program provides a success result, in accordance with the present date which replaced the date determined by the clock circuit.

* * * * *